United States Patent
Irisawa et al.

(10) Patent No.: US 8,446,477 B2
(45) Date of Patent: May 21, 2013

(54) IMAGING APPARATUS, ABERRATION CORRECTING METHOD, AND PROGRAM

(75) Inventors: Gentaro Irisawa, Kanagawa (JP); Atsuo Kikuchi, Kanagawa (JP); Takuya Kato, Tokyo (JP); Atsuo Minato, Kanagawa (JP); Kenichi Nishio, Kanagawa (JP); Hiroyuki Kinoshita, Tokyo (JP)

(73) Assignee: Sony Corporation, Tokyo (JP)

( * ) Notice: Subject to any disclaimer, the term of this patent is extended or adjusted under 35 U.S.C. 154(b) by 3 days.

(21) Appl. No.: 13/190,900

(22) Filed: Jul. 26, 2011

(65) Prior Publication Data

US 2012/0044369 A1 Feb. 23, 2012

(30) Foreign Application Priority Data

Aug. 20, 2010 (JP) ................................ 2010-184674

(51) Int. Cl.
*H04N 5/228* (2006.01)
*H04N 9/64* (2006.01)

(52) U.S. Cl.
USPC .............. 348/208.11; 348/208.12; 348/222.1; 348/242

(58) Field of Classification Search
None
See application file for complete search history.

(56) References Cited

U.S. PATENT DOCUMENTS

| 7,221,793 | B2 * | 5/2007 | Stavely et al. | 382/167 |
| 7,321,685 | B2 * | 1/2008 | Okada et al. | 382/167 |
| 7,783,128 | B2 * | 8/2010 | Kurata et al. | 382/275 |
| 8,085,626 | B2 * | 12/2011 | Takahashi et al. | 369/44.23 |
| 2006/0067663 | A1 * | 3/2006 | Kita | 396/72 |

FOREIGN PATENT DOCUMENTS

JP 2006-135805 * 5/2006

OTHER PUBLICATIONS

U.S. Appl. No. 13/226,978, filed Sep. 7, 2011, Kikuchi, et al.
U.S. Appl. No. 13/096,438, filed Apr. 28, 2011, Nishio, et al.

* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

An imaging apparatus includes: a shift lens driven to be shifted; a uniform aberration correction data storing unit storing uniform aberration correction data for correcting uniform aberration; a shift amount calculating unit calculating an amount of aberration correction shift of the shift lens for correcting uniform aberration using the uniform aberration correction data; a shift lens driving unit driving the shift lens to be shifted according to an amount of driving shift based on the amount of aberration correction shift; a concentric aberration correction amount calculating unit calculating an amount of concentric aberration correction for correcting concentric aberration with respect to a process target pixel of an input image signal; and a pixel value correcting unit correcting a pixel value of the process target pixel on the basis of the calculated amount of concentric aberration correction.

10 Claims, 26 Drawing Sheets

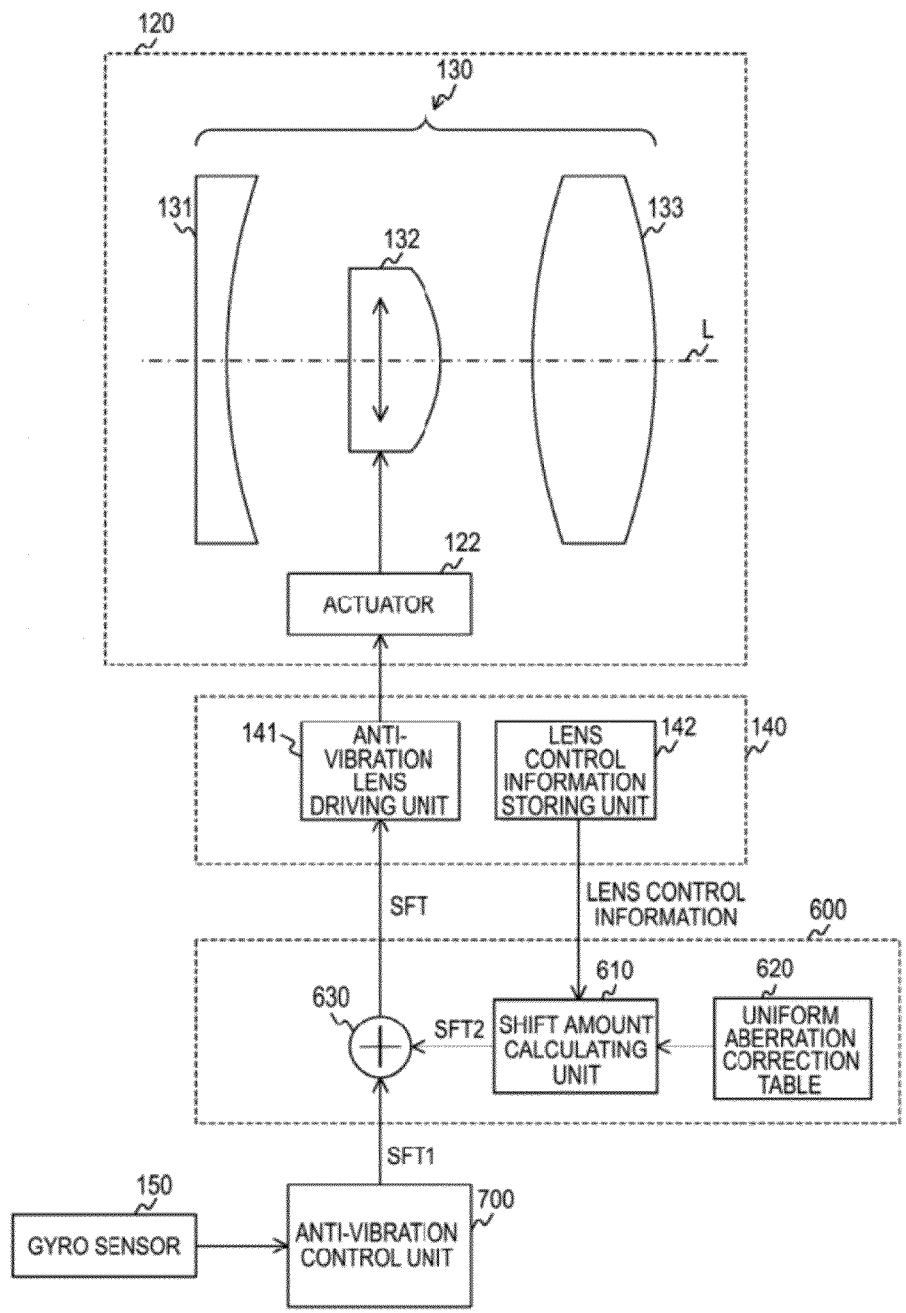

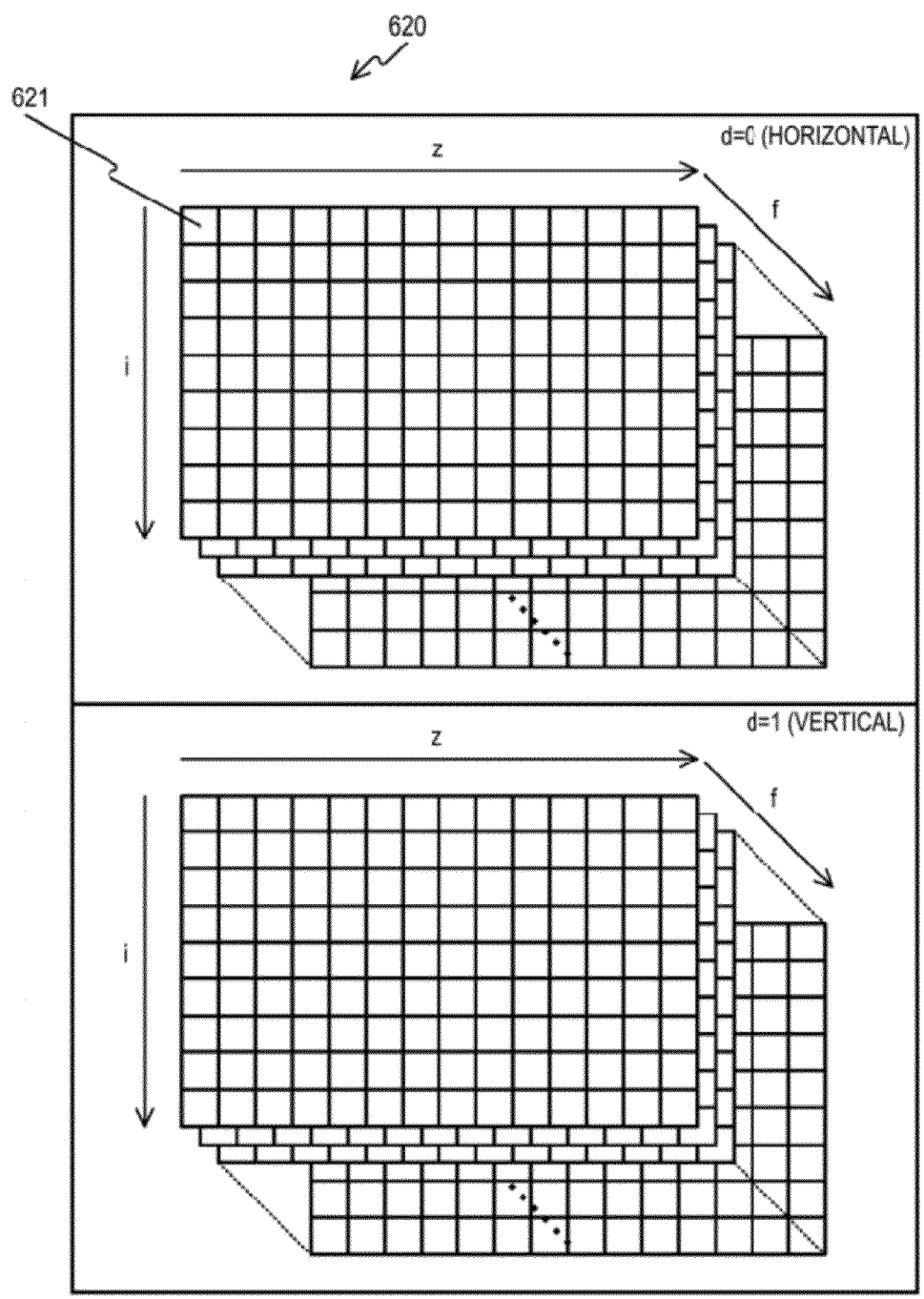

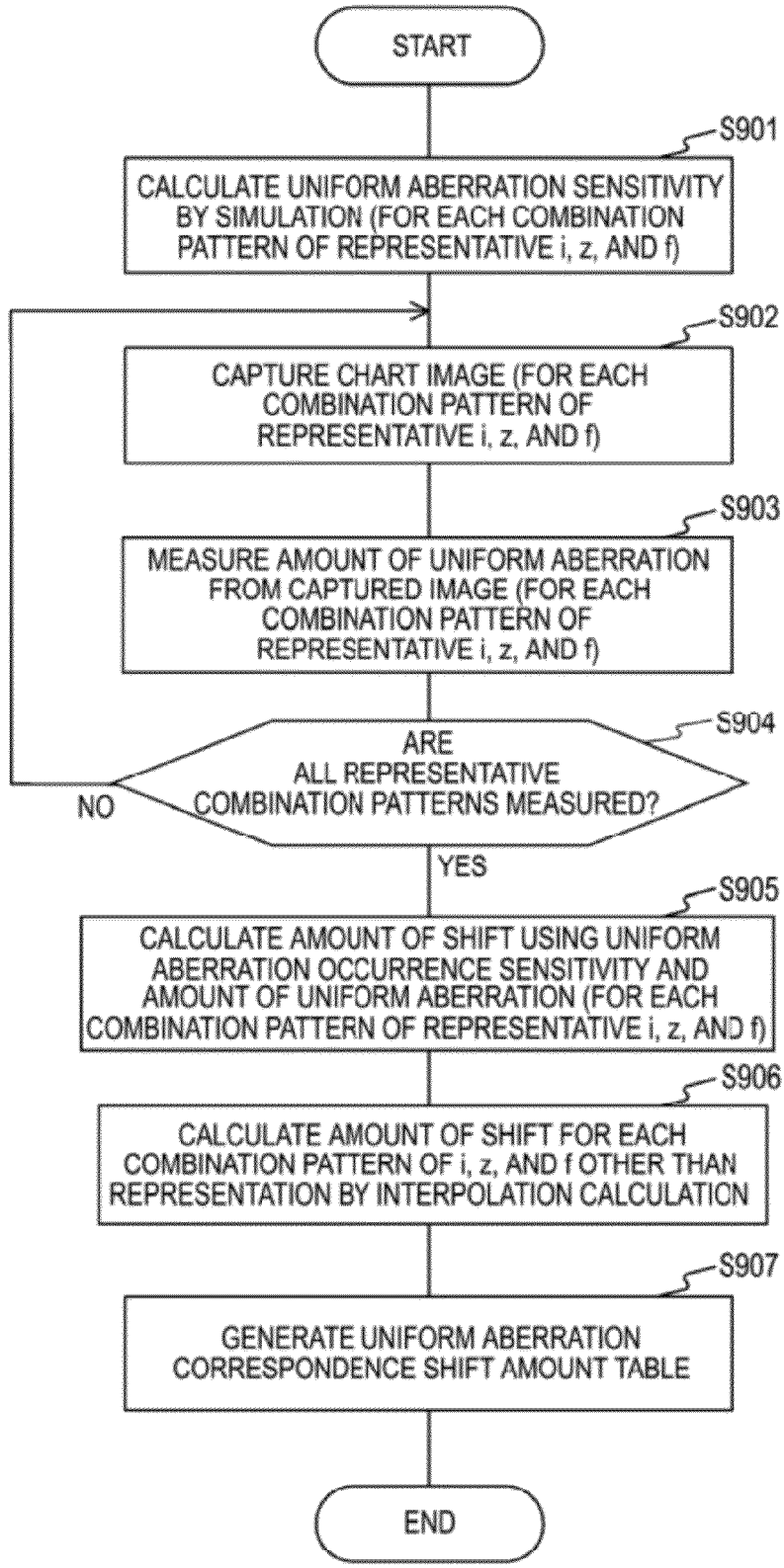

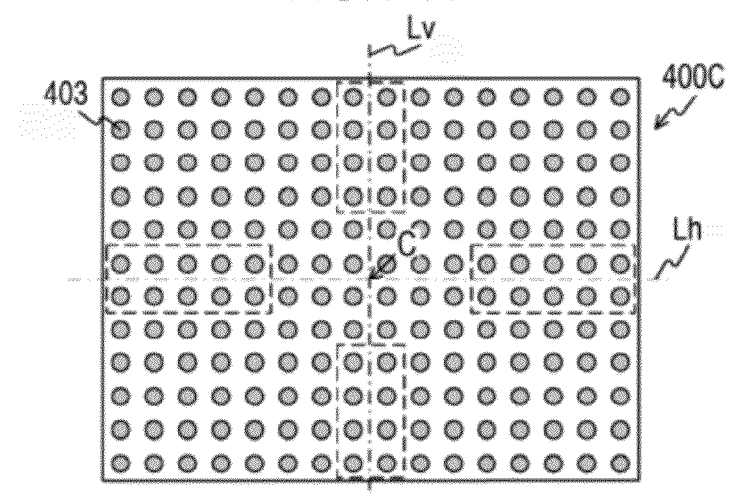
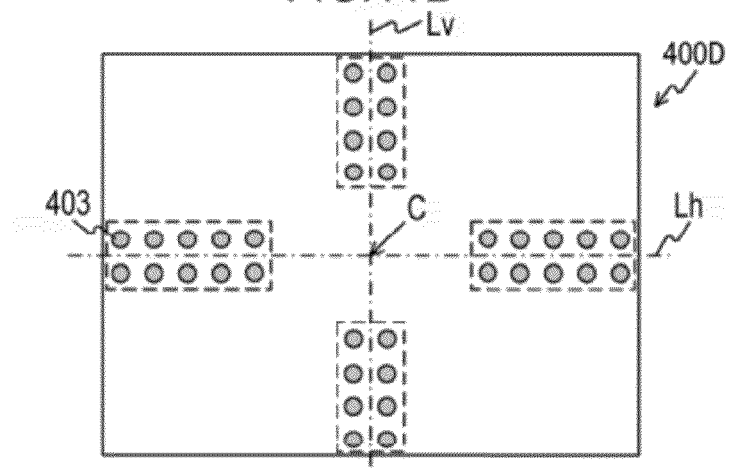
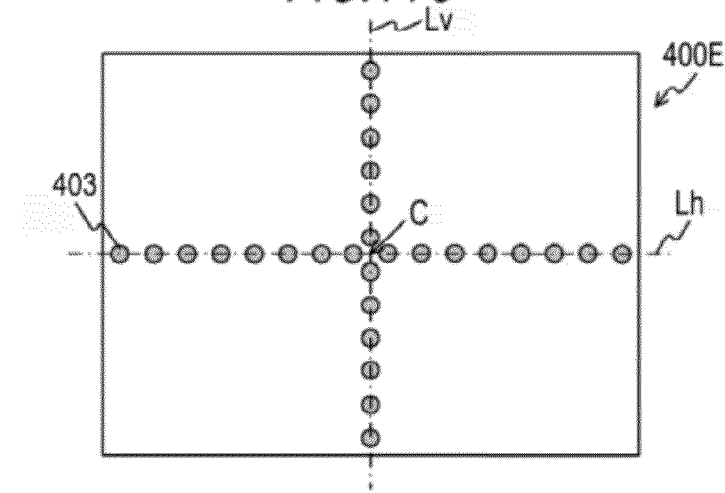

IMAGING APPARATUS, ABERRATION CORRECTING METHOD, AND PROGRAM

FIELD

The present disclosure relates to an imaging apparatus, and more particularly, to an imaging apparatus having a function of correcting chromatic aberration of magnification, an aberration correcting method thereof, and a program for causing a computer to execute the method.

BACKGROUND

It is known that light passing through a lens causes chromatic aberration of magnification. The chromatic aberration of magnification occurs due to difference in image magnification for each color of light, which is caused because the refractive index of a lens is different according to the wavelength of light. For example, when an image of a white point light source is captured, conditions where the color changes to be iridescent extending in the radiated direction from a position corresponding to the optical axis taken as the center are observed in the captured image.

Since such chromatic aberration of magnification is represented as blurring of the colors of the captured image and causes deterioration of image quality, it is necessary to correct the chromatic aberration of magnification. In the related art, an imaging apparatus has a function of correcting chromatic aberration of magnification by a signal process on the signal of a captured image. As the first related art, for example, the input image is divided into 8 radial areas, and a radial edge is detected for each divided area. Then, the amount of color deviation of the detected edge part is calculated, and a difference in magnification of a different color image face is calculated for each edge from the aberration amount. The pixel value of a position changed from a process target pixel by chromatic aberration of magnification is calculated on the basis of the difference in magnification with the highest frequency of appearance, and the pixel value is a pixel value of the process target pixel (e.g., see JP-A-2006-20275, FIG. 1).

As the second related art, a difference in magnification in the four directions up, down, left, and right is calculated using the difference in magnification calculated for each of the 8 divided areas. A method of acquiring a shift vector of color deviation for each of the four screens divided in the directions up, down, left, and right is known (e.g., see JP-A-2006-20275, FIG. 1).

As the third related art, a configuration of correction of chromatic aberration of magnification described as follows is known. That is, a movement amount of each pixel position is calculated in advance, and data of such movement amounts are associated with lens parameters and are stored as correction data in an imaging apparatus. At the time of a correction process, a correction amount is acquired for each pixel selected as a process target using the correction data. Then, the pixel value of a position changed from the process target pixel by chromatic aberration of magnification is calculated on the basis of the correction amount, and the pixel value is a pixel value of the process target pixel (e.g., see JP-A-2006-135805, FIG. 5).

SUMMARY

Theoretically, chromatic aberration of magnification occurs concentrically around an optical axis, a change amount of magnification is the same at a position where an image height corresponding to the distance from the optical axis is the same. However, in an actual captured image, a pattern of chromatic aberration of magnification, which is not an accurate concentric shape but a state where the center thereof is likely to be eccentric, may occur. That is, point symmetry as a concentric circle is not maintained, and chromatic aberration of magnification occurs such that the change amount of magnification is different along the radial direction even in the same image height. The concentric chromatic aberration of magnification in the state where such point symmetry is not maintained occurs due to an installation error of the lens of the imaging apparatus. Since the degree of the lens installation error is different according to the product, individual variation occurs. Accordingly, individual variation occurs even in the state of occurrence of eccentricity in the concentric aberration in which the point symmetry is not maintained.

In the first related art described above, the center of the captured image coincides with the optical axis, and it is a precondition that chromatic aberration of magnification occurs point-symmetrically. For this reason, it is difficult to cope with the chromatic aberration of magnification occurring in the state where the point symmetry is not maintained as described above.

In the second related art, it is possible to cope with the chromatic aberration of magnification in which the center of the captured image does not coincide with the optical axis. However, for example, a magnification difference in four directions up, down, left, and right is further calculated from the result of calculating the magnification difference for each of 8 divided areas, it is necessary to acquire the shift vector, and the amount of calculation increases considerably.

From this viewpoint, in the third related art, the previously stored correction data is used, and thus the amount of calculation may be small. However, as the correction data, it is necessary to associate and store data of a horizontal movement amount and a vertical movement amount for all pixels with lens parameters, and there is a disadvantage in that the amount of data to be stored for correction of chromatic aberration of magnification is large. Since the correction data is uniformly determined in advance, the point that it is difficult to cope with the individual variations in the lenses is the same as the first related art. However, for example, when the amount of occurrence of chromatic aberration of magnification is measured for each imaging apparatus at the time of production and the correction data acquired from the measurement result is stored, it is possible to cope with the individual variations in the lenses. However, it is not pragmatic to perform such a work at the time of production since it causes deterioration in mass production. In practice, the correction data acquired by providing a certain reference is stored, for example, in the same kinds of imaging apparatus. Even if the correction data based on the measurement result of the amount of occurrence of the chromatic aberration of magnification for each imaging apparatus is stored to cope with the individual variations in the lenses as described above, the problem of increasing the amount of data is not solved.

As described above, in the first related art, it is difficult to correct the chromatic aberration of magnification corresponding to the individual variations in the lenses. However, when trying to cope with the individual variations in the lenses by the second and third related arts, the amount of calculation or the amount of correction data to be stored increases.

Thus, it is desirable to perform correction of chromatic aberration of magnification corresponding to an aberration occurrence pattern in which point symmetry is broken up by individual variations in the lenses, with a small amount of correction data and calculation.

According to an embodiment of the present disclosure, there is provided an imaging apparatus including: shift lens that is driven to be shifted; a uniform aberration correction data storing unit that stores uniform aberration correction data for correcting uniform aberration that is a component of chromatic aberration of magnification in which the direction of color deviation and an amount of color deviation uniformly occur over the entire image; a shift amount calculating unit that calculates an amount of aberration correction shift of the shift lens for correcting uniform aberration using the uniform aberration correction data; a shift lens driving unit that drives the shift lens to be shifted according to an amount of driving shift based on the amount of aberration correction shift; a concentric aberration correction amount calculating unit that calculates an amount of concentric aberration correction for correcting concentric aberration that is a component of chromatic aberration of magnification causing a concentric color deviation from the center of the image, with respect to a process target pixel of an input image signal; and a pixel value correcting unit that corrects the pixel value of the process target pixel on the basis of the calculated amount of concentric aberration correction. With such a configuration, the uniform aberration component is corrected by driving the correction lens, and the chromatic aberration of magnification is corrected by correcting the concentric aberration component in the image signal process.

In the embodiment, the imaging apparatus may further include: an anti-vibration control unit that generates an amount of anti-vibration shift of the shift lens for canceling vibration of the captured image corresponding to movement of the imaging apparatus; and an addition unit that adds the amount of anti-vibration aberration shift to the amount of aberration correction shift and outputs the added value as the driving shift. With such a configuration, the uniform aberration is corrected using the configuration which performs anti-vibration by driving the lens.

In the embodiment, the uniform aberration correction data storing unit may store the uniform aberration correction data corresponding to each uniform aberration condition completed from the combination of predetermined lens control information representing a control state for a predetermined movable portion in a lens unit including the shift lens, and the shift amount calculating unit may select the uniform aberration correction data corresponding to the uniform aberration condition completed from the combination of the current lens control information, from the uniform aberration correction data, and may calculate the amount of aberration correction shift on the basis of the selected uniform aberration correction data. With such a configuration, the correction is performed according to the uniform aberration which changes according to the lens control state.

In the first embodiment, the uniform aberration correction data may represent an amount of uniform aberration condition correspondence shift of the shift lens for correcting uniform aberration occurring under the corresponding uniform aberration condition, and the shift amount calculating unit may calculate the amount of aberration correction shift on the basis of the uniform aberration condition correspondence shift indicated by the selected uniform aberration correction data. With such a configuration, the amount of aberration correction shift is calculated on the basis of the uniform aberration correction data (the amount of uniform aberration condition correspondence shift) based on the same amount of shift.

In the embodiment, the amount of uniform aberration condition correspondence shift may be calculated on the basis of sensitivity to the uniform aberration of the lens calculated by a simulation based on characteristics of the lens and an amount of color deviation based on the uniform aberration measured using the captured image. With such a configuration, the amount of uniform aberration condition correspondence shift is calculated using both simulation and measurement.

In the embodiment, the imaging apparatus may further include a concentric aberration correction data storing unit that stores concentric aberration correction data representing an amount of correction corresponding to each concentric aberration condition at least including combination of a light color and an image height, and the concentric aberration correction amount calculating unit may select the concentric aberration correction data corresponding to the concentric aberration condition for the process target pixel, from the concentric aberration correction data, and may calculate the amount of concentric aberration correction using the selected concentric aberration correction data. With such a configuration, the correction of the concentric aberration is performed using the concentric aberration correction data stored in advance.

In the embodiment, the imaging apparatus may further include an edge detecting unit that detects an edge corresponding to the concentric aberration from the input image signal, the concentric aberration correction amount calculating unit may calculate the concentric aberration correction amount for the process target image on the basis of the amount of color deviation generated by the concentric aberration in each edge detected by the edge detecting unit. With such a configuration, the amount of concentric aberration correction is calculated on the basis of the detection result of the edge of the input image signal generated from the imaging, to perform the correction of the concentric aberration.

According to another embodiment of the present disclosure, there is provided an imaging apparatus including: an optical lens unit that includes a shift lens driven to be shifted, in which chromatic aberration of magnification is corrected; a uniform aberration correction data storing unit that stores uniform aberration correction data for correcting uniform aberration that is a component of chromatic aberration of magnification in which the direction of color deviation and an amount of color deviation uniformly occur over the entire image; a shift amount calculating unit that calculates an amount of aberration correction shift for shifting the shift lens to correct uniform aberration using the uniform aberration correction data; and a shift lens driving unit that drives the shift lens to be shifted according to an amount of driving shift based on the amount of aberration correction shift. With such a configuration, the uniform aberration component is corrected by driving the correction lens, and the concentric aberration component is corrected by the lens itself, to correct the chromatic aberration of magnification.

According to the embodiments of the present disclosure, it is possible to correct chromatic aberration of magnification of an aberration occurrence pattern in which point symmetry is broken, with a small amount of correction data and calculation.

BRIEF DESCRIPTION OF THE DRAWINGS

FIG. 7 is a diagram illustrating units related to uniform aberration correction of the embodiment of the present disclosure.

FIG. 8 is a diagram illustrating an example of a structure of a uniform aberration correction table.

FIG. 9 is a flowchart illustrating an example of sequence for generating the uniform aberration correction table.

FIGS. 11A to 11C are diagrams illustrating an example of a chart image used to measure the amount of chromatic aberration caused by uniform aberration when acquiring uniform aberration correction data of the uniform aberration correction table.

DETAILED DESCRIPTION

Hereinafter, embodiments of the present disclosure will be described. The description is in the following order.

1. First Embodiment (correction of chromatic aberration of magnification: an example of correcting uniform aberration by driving an anti-vibration lens and correcting concentric aberration by an image process using a correction data table)

2. Second Embodiment (correction of chromatic aberration of magnification: an example of correcting uniform aberration by driving an anti-vibration lens and correcting concentric aberration by an image process on the basis of an amount of correction acquired from a captured image signal)

3. Third Embodiment (correction of chromatic aberration of magnification: an example of correcting uniform aberration by driving an anti-vibration lens and correcting concentric aberration by the lens itself)

4. Modified Example

1. First Embodiment

Example of Configuration of Video Camera

Figure 1:
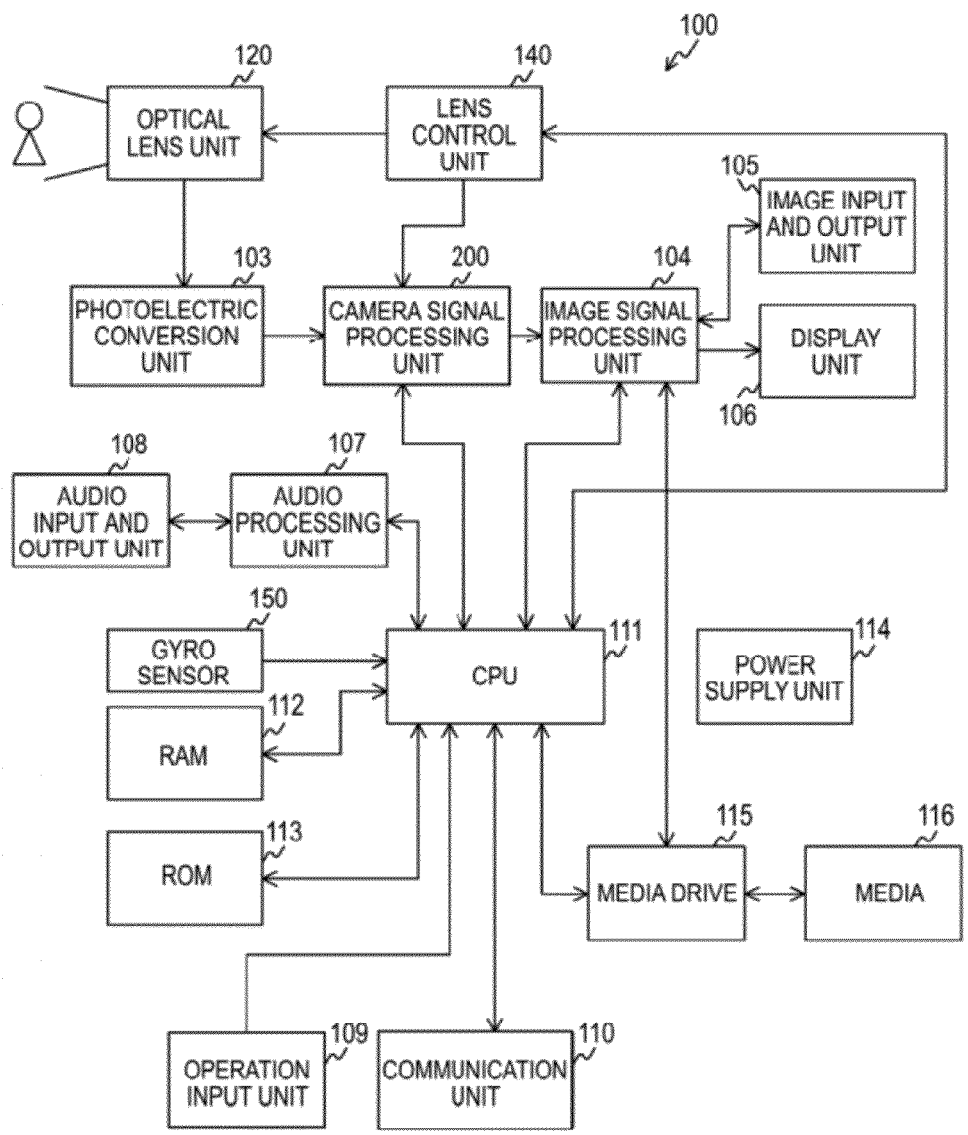
FIG. 1 is diagram illustrating an example of a configuration of a video camera of an embodiment of the present disclosure.

FIG. 1 is a diagram illustrating an example of a configuration of a video camera 100 as an example of an image processing device according to an embodiment of the present disclosure. The video camera 100 includes an optical lens unit 120, a lens control unit 140, a photoelectric conversion unit 103, a camera signal processing unit 200, an image signal processing unit 104, an image input and output unit 105, a display unit 106, an audio processing unit 107, and an audio input and output unit 108, an operation input unit 109, a communication unit 110, a CPU (Central Processing Unit) 111, a RAM (Random Access Memory) 112, a ROM (Read Only Memory) 113, a media drive 115, a power supply unit 114, and a gyro sensor 150.

The optical lens unit 120 is provided therein with a lens group for capturing an image of a photographic subject, an iris adjusting mechanism, a focus adjusting mechanism, a zoom mechanism, a shutter mechanism, and a mechanism for correcting hand tremor. The lens control unit 140 receives a control signal from the CPU 111, and generates a control signal to be supplied to the optical lens unit 120. The lens control unit 140 supplies the generated control signal to the optical lens unit 120, and performs various controls such as a zoom control, a focus control, a shutter controls, an exposure control, and a camera shake correction control. In the embodiment of the present disclosure, the control for a predetermined part in the optical lens unit 120 as described above is called a lens control. Hereinafter, of the word "anti-vibration" may be used with the same meaning as "camera shake correction."

The photoelectric conversion unit 103 is configured by an imaging device, and an image is formed on an image forming face thereof through the optical lens unit 120. A CCD (Charge Coupled Device) sensor, a CMOS (Complementary Metal Oxide Semiconductor) sensor, or the like may be employed as the imaging device. The photoelectric conversion unit 103 converts the image of the photographic subject formed on the image formed face into an image signal, and supplies the image signal to the camera signal processing unit 200.

The image signal input to the camera signal processing unit 200 is a form of RAW image data before performing a color interpolating process such as demosaicing. The camera signal processing unit 200 is a unit performing a necessary image signal process such as the color interpolating process and various corrections on the image signal of the RAW data form. In the embodiment of the present disclosure, the image signal process for correction of chromatic aberration of magnification is performed by the camera signal processing unit 200. The image signal subjected to the process performed by the camera signal processing unit 200 is supplied to the image signal processing unit 104.

The image signal processing unit 104 is a unit performing an image signal process, for example, mainly related to displaying, recording, or reproducing, on the supplied image signal. For example, the image signal processing unit 104 may perform an image compressing process based on a compression form such as MPEG (Moving Picture Experts Group) on the input image signal.

The image signal processing unit 104 may generate an image signal of a predetermined form and may output the image signal from the image input and output unit 105 to the outside. The image input and output unit 105 may receive an image signal of a predetermined form from the outside. The image signal processing unit 104 may perform size conversion or the like on the image signal input from the image input and output unit 105 by the image signal processing unit 104, and may display the converted image on the display unit 106. The image signal processing unit 104 may convert the image signal input by the image input and output unit 105 into recording image data, and for example, may supply the recording image data to the media drive 115 through the CPU 111.

The video camera 100 is provided with the audio processing unit 107 and the audio input and output unit 108, and may input and output an audio signal. The audio input and output unit 108 is a unit for inputting and outputting the audio signal. First, the audio signal input from the audio input and output unit 108 is subjected to a necessary audio signal process in the audio processing unit 107. For example, a compression process or the like based on a predetermined audio compression encoding form is performed. The audio input and output unit 108 may output the audio signal of the predetermined form supplied from the audio processing unit 107, to the outside.

In this case, the CPU 111 may form an image audio file of a predetermined form by the compression image signal supplied from the image signal processing unit 104 and the compression image signal data supplied from the audio signal processing unit 107. The image audio file is a moving picture file of, for example, a form in which audio synchronizes with a moving picture and the moving picture is reproduced.

For example, data of the image audio file is supplied as writing data to the media drive 115 by control of the CPU 111. The media drive 115 may perform writing and reading of data, for example, in a physical layer level on media (recording medium) 116 in combination with the CPU 111. The media 116 may be, for example, a magnetic disk, an optical disc, a magneto-optical disc, and a semiconductor memory. For example, the media 116 may be fixedly built in the video camera 100. The media 116 may be a removable type based on a predetermined standard, which can be attachable to and detachable from the video camera 100.

The media drive 115 performs a process of writing to the media 116 selected considering recording data as a control target, according to transmission of the recording data for recording files. For example, the data recorded on the media 116 is managed by a unit of file by a predetermined file system form.

For example, when the image audio file is reproduced as reproducing of the file recorded on the media 116, the CPU 111 and the media drive 115 access to the media on which the designated image audio file is recorded, and perform reading. The image audio file read as described above is divided into compression image signal data and compression audio signal data, for example, by a process of the CPU 111. The compression image signal data is transferred to the image signal processing unit 104, and the compression audio signal data is transferred to the audio processing unit 107.

In this case, the image signal processing unit 104 and the audio processing unit 107 perform a necessary reproduction signal process including a decoding process on the compression audio signal data and the compression image signal data transmitted as described above, respectively. Accordingly, an image obtained by reproducing the compression video data may be displayed on the display unit 106. Synchronizing with a reproduction time period of the image, an audio signal obtained by reproducing the compression audio signal data may be output as audio by a speaker included in the audio input and output unit 108 or may be output from a headphone terminal.

The CPU 111 performs various control processes for the video camera 100 by executing a program. The RAM 112 is used as a work area (work memory) when the CPU 111 performs a process based on the program. The ROM 113 is a unit where various kinds of setting information used for the CPU 111 to perform the process are stored in addition to the various programs performed by the CPU 111.

The gyro sensor 150 is provided according to the anti-vibration control, and is a unit detecting movement of the body of the video camera 100 using angular velocity. The CPU 111 acquires an amount of shift of the anti-vibration lens on the basis of the angular velocity detected by the gyro sensor 150, and outputs the amount of shift to the lens control unit 140. The lens control unit 140 performs a driving control to shift the anti-vibration lens in the optical lens unit 120 by the input amount of shift. Accordingly, the vibration of the captured image caused by the camera shake is canceled.

In this case, the operation input unit 109 generally indicates various operators which may be provided in the video camera 100. For example, the operators in the operation input unit 109 includes a recording button operated according to the starting or stopping of recording of the captured image, an operator which selects an imaging mode and the like, and an operator for changing various parameters.

The communication unit 110 is a unit for communicating with an external device in a predetermined data communication method according to the control of the CPU 111. The data communication method of the communication unit 110 is not particularly limited regarding wired and wireless, and the number of the corresponding data communication methods is not also limited. In the current state, the data communication method may be a wired network such as Ethernet (registered trademark). It may be a data interface standard such as USB (Universal Serial Bus) and IEEE (Institute of Electrical and Electronic Engineers) 1394. If wireless, it may be an inter-device short-distance radio communication such as Bluetooth (registered trademark), and a wireless LAN (Local Area Network) standard such as IEEE 802.11a/b/g.

The power supply unit 114 supplies operation power to various hardware devices in the video camera 100, and for example, is provided with a power supply circuit operating with power supplied from a battery or a power adaptor.

The embodiment may be embodied by, for example, a digital still camera in addition to the video camera 100 shown in FIG. 1.

[Chromatic Aberration of Magnification]

Figure 2A:
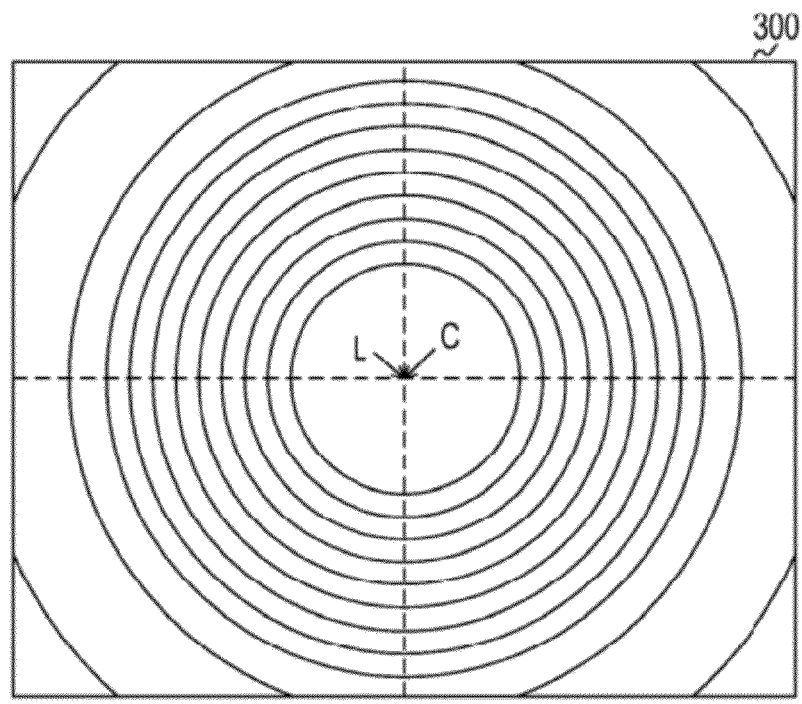
FIGS. 2A and 2B are diagrams illustrating a basic pattern of chromatic aberration of magnification.
Figure 2B:
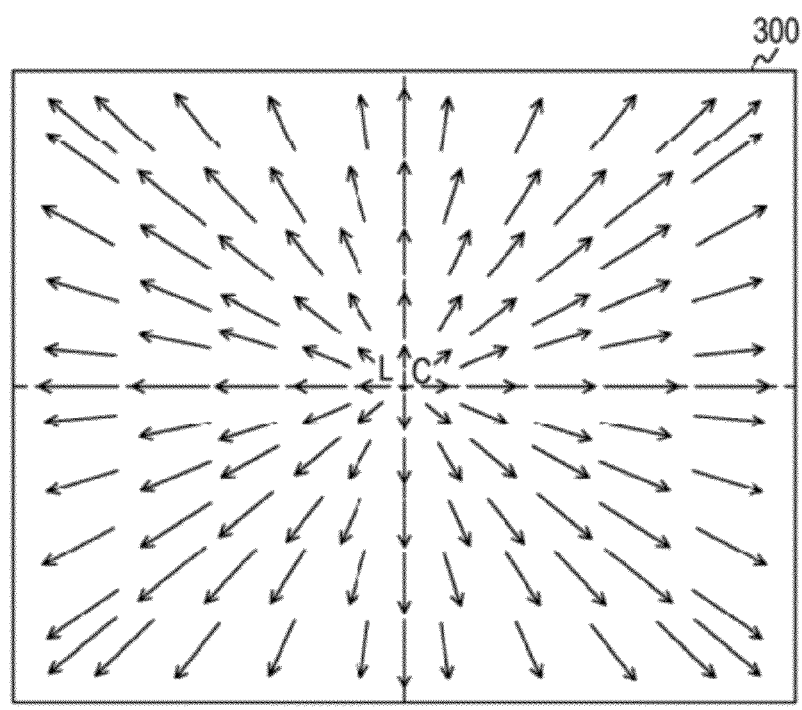

The video camera 100 of the embodiment of the present disclosure with such a configuration performs correction of chromatic aberration of magnification to be described hereinafter. First, the chromatic aberration of magnification will be described. The chromatic aberration of magnification means a phenomenon in which color deviation occurs due to difference in magnification of an image according to the color of light since the refractive index of a lens is different according to the wavelength of light. FIGS. 2A and 2B schematically show a state of chromatic aberration of magnification shown on an image face 300 of a captured image. FIG. 2A is a state of chromatic aberration of magnification shown on the image face 300, and shows magnification of color deviation by contour lines. FIG. 2B is magnification and direction of the color deviation by vectors in the occurrence state of the same chromatic aberration of magnification shown in FIG. 2A. In FIGS. 2A and 2B, a center C (intersection of lines passing through vertical and horizontal middles of the image face 300) of the image face 300 and an optical axis L of the lens coincide with each other. As shown in FIGS. 2A and 2B, in the chromatic aberration of magnification, originally the color deviation occurs in a concentric shape around the optical axis. For example, the amount of color deviation increases according to an increase of an image height from the optical axis.

As shown in FIGS. 2A and 2B, the chromatic aberration of magnification is aberration in which the optical axis L of the lens and the center C of the image face 300 coincide with each other, and color deviation occurs to be a concentric circle with the center that is the optical axis L, that is, point symmetry. However, in the actual imaging device, chromatic aberration of magnification may occur in which the color deviation pattern is eccentric, for example, the optical axis L of the lens deviates from the center C of the image face 300 or the point symmetry of the amount of color deviation disappears by the installation error of the lens in the imaging optical system.

Figure 3A:
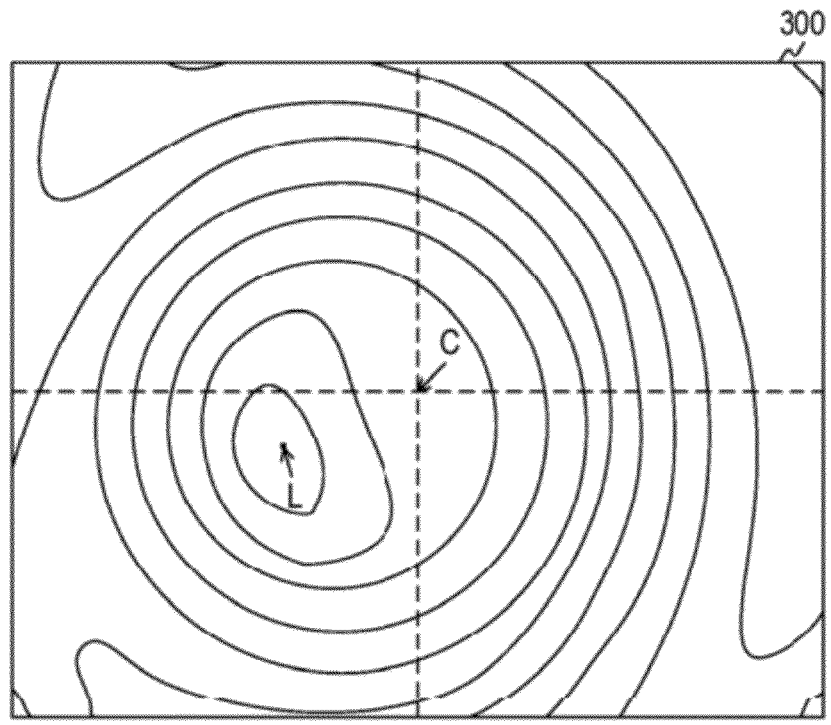
FIGS. 3A and 3B are diagrams illustrating a pattern of an actual chromatic aberration of magnification generated according to individual variation in the lenses.
Figure 3B:
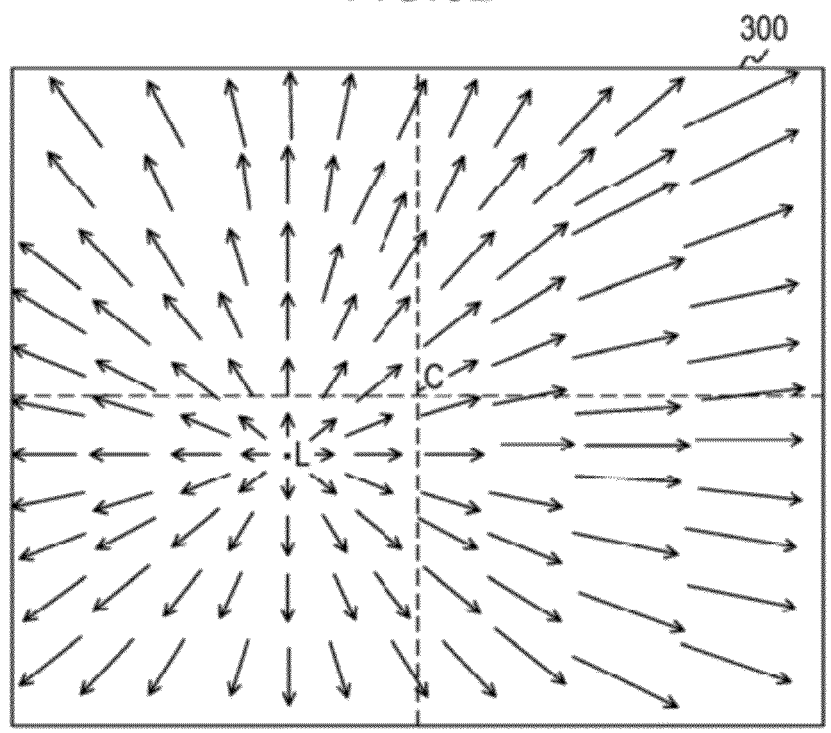

FIGS. 3A and 3B show an example of the occurrence state of chromatic aberration of magnification in which the color deviation pattern is eccentric. The chromatic aberration of magnification shown in FIGS. 3A and 3B is in a state where the optical axis L deviates from the center C of the image. This means that, for example, the image height varies at the image position at the same distance from the center C in the image face 300. For example, as can be seen from FIG. 3A, the concentric shape of the contour lines representing the amount of deviation around the optical axis L is broken up. That is, the point symmetry of the amount of color deviation based on the chromatic aberration of magnification disappears. In the embodiment of the present disclosure, for example, as shown in FIGS. 3A and 3B, the chromatic aberration of magnification is corrected also corresponding to the state where the color deviation pattern is eccentric. Hereinafter, this point will be described.

[Method of Representing Chromatic Aberration of Magnification in Embodiment of Present Disclosure]

Figure 4A:
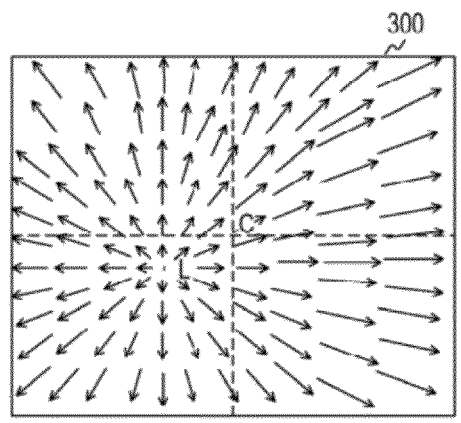
FIGS. 4A to 4C are diagrams illustrating a concentric aberration component and a uniform aberration component of forming chromatic aberration of magnification of the embodiment of the present disclosure.

First, in the embodiment of the present disclosure, the chromatic aberration of magnification is approximately represented as follows. In FIG. 4A, the amount and direction of color deviation are represented by vectors on the image face 300 in which the chromatic aberration of magnification with the eccentric color deviation pattern is generated, in the same manner as FIG. 3B. In the embodiment of the present disclosure, the chromatic aberration of magnification in which the color deviation pattern shown in FIG. 4A is eccentric is approximately represented by dividing it into an aberration component shown on the image face 300 of FIG. 4B and an aberration component shown on the image face 300 of FIG. 4C.

Figure 4B:
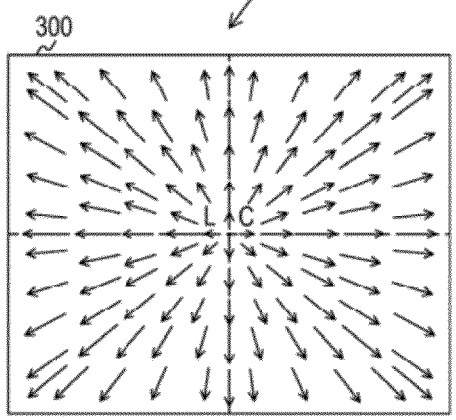

The aberration component shown in FIG. 4B is an aberration component represented such that the amount of color deviation is point-symmetric about the optical axis L in the state where the center C of the image face 300 and the optical axis L coincide with each other. The amount of color deviation is changed, for example, to increase, as the image height (distance from the optical axis L) becomes higher. This may be considered as an aberration component represented depending only on characteristics of the lens, to the exclusion of an individual variation factor such as an installation error. In the specification, hereinafter, the aberration shown in FIG. 4B is referred to as "concentric aberration".

Figure 4C:
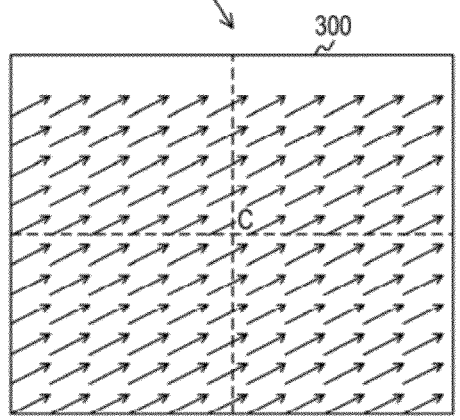

The aberration component shown in FIG. 4C is an aberration component represented such that the vectors of color deviation are the same on the whole of the image face 300. That is, in the aberration components, the amounts of color deviation are the same at any part of the image face 300, and the directions of color deviation are the same. This may be considered as an aberration component which is uniformly represented on the whole screen without depending on the image height or the position of the optical axis L. This aberration component is an aberration component represented according to the existence of the variation factor such as an installation error. In the specification, hereinafter, the aberration shown in FIG. 4C is referred to as "uniform aberration".

[Occurrence of Uniform Aberration Component]

The chromatic aberration of magnification is a phenomenon in which the amount of color deviation is changed according to the image height due to the difference in thickness between the center and the edge of the lens, and intrinsically, concentrically occurs. However, as described above, in the chromatic aberration of magnification in which the color deviation pattern is eccentric, when only the concentric aberration component is simply corrected, it is difficult to obtain a sufficient correction effect. The inventors assumed that the chromatic aberration of magnification in which the color deviation pattern is eccentric is generated from the occurrence of the uniform aberration component shown in FIG. 4C in addition to the concentric aberration shown in FIG. 4B, and performed a test. That is, a test of performing correction of chromatic aberration of magnification was performed by a configuration of using both correction of a concentric aberration component and correction of a uniform aberration component. As a result of the test, it was confirmed that it is possible to obtain a correction effect, for example, enough to be acceptable in practical use.

The occurrence of the uniform aberration component may be described as follows. This point will be described with reference to FIG. 5 and FIG. 6. It is conceivable that the installation error causing variation in the lens has an eccentricity factor by which the optical axis of the lens deviates from the original position in the planar direction of the lens, and an inclination factor by which the optical axis of the lens deviates from the original angle.

Figure 5:
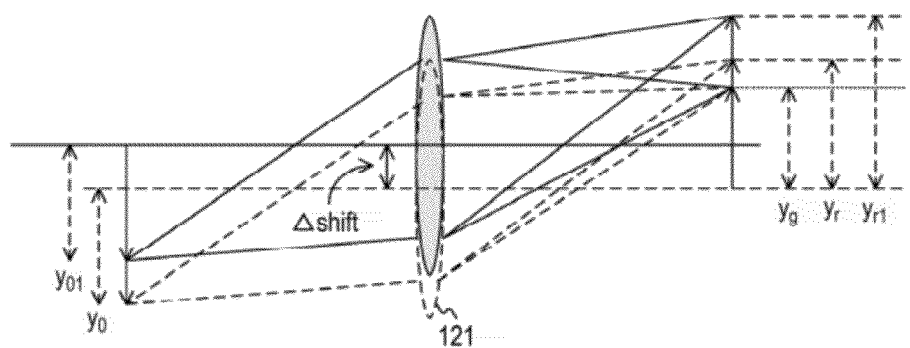
FIG. 5 is a diagram illustrating generation of the uniform aberration component.

First, the occurrence of the uniform aberration component corresponding to the eccentricity of the lens will be described with reference to FIG. 5. In FIG. 5, the position of the lens 121 represented by a broken line corresponds to a reasonable position state where, for example, there is no eccentricity. In this state, image heights of G (green) and R (red) light obtainable corresponding to an object height $y_0$ are $y_g$ and $y_r$, respectively. Lateral magnifications $\beta_g$ and $\beta_r$ in the G light and the R light of the lens 121 are approximated in a paraxial region to be represented by the following formulas.

$$\beta g = y_g/y_0$$

$$\beta r = y_r/y_0$$

In the formulas, the image heights $y_g$ and $y_r$ of the G light and the R light may be represented by the following formulas.

$$y_g = y_0 \cdot \beta g$$

$$y_r = y_0 \cdot \beta r$$

Then, a difference in two formulas shown in above is acquired, and an amount of color deviation (an amount of chromatic aberration of magnification) $\Delta y_1$ of the R light with respect to the G light with no eccentricity may be acquired by the following formula.

$$\Delta y_1 = y_r - y_g = y_0(\beta r - \beta g)$$

The formula is a function with respect to the object height $y_0$. The image heights $y_g$ and yr are changed with variation of the object height $y_0$. Accordingly, the formula indicates that the amount of color deviation in the state with no eccentricity changes according to the distance from the image height.

Then, the lens 121 is moved from the position represented by the broken line to the position represented by the solid line, and a state where eccentricity based on an amount of movement $\Delta$shift is applied is assumed. In this case, the object height $y_{01}$ in which the image forming position of the G light is the same as the state before eccentricity is acquired by the following formulas on the basis of the formulas representing the image heights $y_g$ and $y_r$.

$$y_g - \Delta\text{shift} = (y_{01}) \cdot \beta g$$

$$y_{01} = (y_g - \Delta\text{shift})/\beta g$$

In this case, the image forming position $Y_{r1}$ of the R light is acquired by the following formulas from the formulas representing the image heights $y_g$ and $y_r$ and the above formulas.

$$y_{r1} - \Delta\text{shift} = y_{01} \cdot \beta r$$

$$y_{r1} = \beta r(y_g - \Delta\text{shift})/\beta g + \Delta\text{shift}$$

Accordingly, the amount of color deviation $\Delta y_2$ of the R light with respect to the G light after eccentricity is represented by the following formula.

$$\Delta y_2 = y_{r1} - y_g$$
$$= (y_g \cdot (\beta r - \beta g)/\beta g) - (\beta r \cdot \Delta\text{shift})/\beta g + \Delta\text{shift}$$
$$= (\beta r - \beta g) \cdot y_0 + ((\beta g - \beta r)/\beta g) \cdot \Delta\text{shift}$$

Similarly to the formula of calculating the amount of color deviation $\Delta y_1$ before eccentricity, the above formula is a function of the object height $y_0$, and thus the amount of color deviation $\Delta y_2$ after eccentricity is also changed depending on the image height.

A difference with respect to the amount of color deviation between before eccentricity and after eccentricity, that is, an amount of change in color deviation may be represented by the following formula.

$$\Delta y_2 - \Delta y_1 = ((\beta g - \beta r)/\beta g) \cdot \Delta\text{shift}$$

Herein, in the right side in the above formula, a term in which the object height $y_0$ is a coefficient is eliminated. That is, according to the above formula, the amount of change in color deviation between before eccentricity and after eccentricity does not change depending on the image height, but changes depending only on the amount of eccentricity ($\Delta$shift). This represents that the same direction of color deviation and the same amount of color deviation uniformly occur on the whole screen according to the eccentricity of the lens. That is, it is indicated that the uniform aberration component occurs.

Next, the occurrence of the uniform aberration component corresponding to the inclination of the lens will be described with reference to FIG. 6. The position of the lens 121 represented by the broken line corresponds to a reasonable position state, for example, with no inclination. In this state, the amount of color deviation $\Delta y_1$ of the R light with respect to the G light is represented by the formula of calculating the amount of color deviation $\Delta y_1$.

Then, it is assumed that inclination is applied such that the optical axis is inclined at an angle $\theta$ from the optical axis of the position represented by the broken line 121. In this case, the object height $y_{01}$ in which the image forming position of the G light is the same as the state before eccentricity is acquired by the following formula on the basis of the formulas representing the image heights $y_g$ and $y_r$, as a distance s from the lens 121 to the image face.

$$y_{01} = (y_g \cos\theta - s \cdot \sin\theta)/\beta g$$

In this case, the image forming position $y_{r1}$ of the R light is acquired by the following formulas from the formulas representing the image heights $y_g$ and $y_r$ and the above formula.

$$y_{r1} \cdot \cos\theta - s \cdot \sin\theta = (\beta r/\beta g) \cdot (y_g \cos\theta - s \cdot \sin\theta)$$

$$y_{r1} = (\beta r/\beta g) \cdot y_g + ((\beta g - \beta r)/\beta g) \cdot (s \cdot \tan\theta)$$

Accordingly, the amount of color deviation $\Delta y_2$ of the R light with respect to the G light after inclination is represented by the following formula.

$$\Delta y_2 = y_{r1} - y_g$$
$$= (\beta r - \beta g) \cdot y_0 + ((\beta g - \beta r)/\beta g) \cdot (s \cdot \tan\theta)$$

The above formula is a function of the object height $y_0$, and thus the amount of color deviation $\Delta y_2$ after inclination is also changed depending on the image height.

The amount of change in color deviation between before inclination and after inclination may be represented by the following formula.

$$\Delta y_2 - \Delta y_1 = ((\beta g - \beta r)/\beta g) \cdot (s \cdot \tan\theta)$$

In the above formula, a term in which the object height $y_0$ is a coefficient is eliminated. Accordingly, the amount of change in color deviation does not change depending on the image height, but changes depending only on the inclination angle $\theta$ of the optical axis. That is, the uniform aberration component occurs even according to the inclination of the lens.

Figure 6:
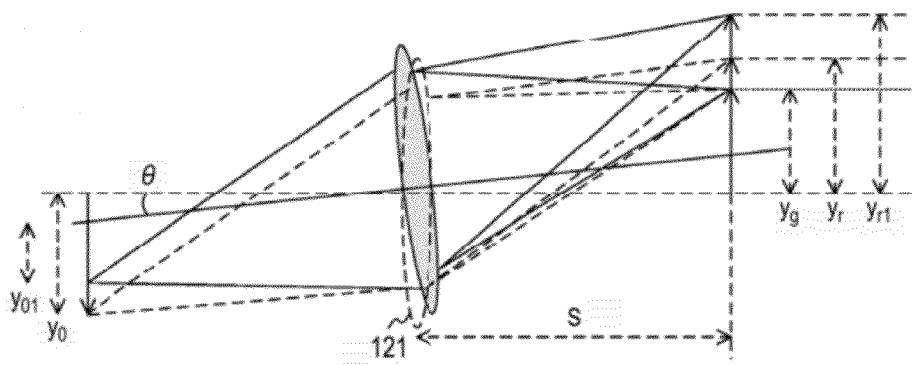
FIG. 6 is a diagram illustrating generation of the uniform aberration component.

On the basis of the description with reference to FIG. 5 and FIG. 6, even when both the eccentricity and the inclination of the lens occur together due to the actual lens installation error or the like, it can be said that the uniform aberration component occurs such that the amount of color deviation is determined according to the amount of eccentricity and the inclination angle. In addition, it is possible to recognize the uniform aberration component actually occurring in the imaging device as the sum of the uniform aberration components occurring due to the eccentricity or inclination of the lenses in the lens group.

[Outline of Correction of Chromatic Aberration of Magnification in First Embodiment]

Hereinafter, correction of chromatic aberration of magnification in the first embodiment will be described. In the first embodiment of the present disclosure, it is assumed that the chromatic aberration of magnification can be divided into the concentric aberration component and the uniform aberration component as described above, and correction of the concentric aberration component and correction of the uniform aberration component are separately performed.

In the first embodiment of the present disclosure, the correction of the uniform aberration component is performed by shifting a specific lens in the optical lens unit 120. As can be understood from the above description, the uniform aberration component in the chromatic aberration of magnification occurs due to the installation error of the lens. That is, the uniform aberration component occurs since the lens is mounted to be eccentric or inclined from the ideal posture. From this viewpoint, when the lens is intentionally shifted to be eccentric or inclined, the eccentricity caused by the installation error or the deviation in the optical axis caused by the inclination is amended and thus it is possible to correct the uniform aberration.

Meanwhile, since the concentric aberration component occurs due to characteristics of the lens itself, it does not depend on the installation error of the lens. Accordingly, the correction of the concentric aberration is performed by an image process.

[Configuration for Uniform Aberration Correction]

First, an example of a configuration for correcting the uniform aberration in the first embodiment will be described. In FIG. 7, the optical lens unit 120, the lens control unit 140, a uniform aberration correcting unit 600, an anti-vibration control unit 700, and the gyro sensor 150 are shown as units related to the correction of the uniform aberration.

In FIG. 7, the optical lens unit 120 is provided with a lens group 130 and an actuator 122 as units related to the correction of the uniform aberration. The lens group 130 is a group including lenses constituting the optical system, and is provided with a lens 131, an anti-vibration lens group 132, and a lens 133. In practice, more lenses may be provided. However, for convenience of simplification in showing, a simple configuration is shown herein. The anti-vibration lens group 132 is a lens used for anti-vibration control, and is formed in a combination of a predetermined number of one or more lenses.

The anti-vibration lens group 132 among the lens 131, the anti-vibration lens group 132, and the lens 133 is supported to be horizontally and vertically shifted along a planar direction perpendicular to the optical axis L. That is, the anti-vibration lens group 132 is horizontally and vertically moved (shifted) in a state where the optical axis thereof is substantially parallel, on the optical axis L set for the lens group. The actuator 122 is provided for the support mechanism of the anti-vibration lens group 132, and shifts the anti-vibration lens group 132 according to a supplied driving signal. The anti-vibration lens group 132 is an example of the shift lens described in the appended claims.

The lens control unit 140 shown in FIG. 7 is provided with an anti-vibration lens driving unit 141 and a lens control information storing unit 142 as units related to the correction of the uniform aberration. The anti-vibration lens driving unit 141 is a unit driving the anti-vibration lens group 132 to be shifted. For this reason, the anti-vibration lens driving unit 141 receives an input of an amount of driving shift SFT for shifting the anti-vibration lens group 132, generates a driving signal corresponding to the input amount of driving shift SFT, and outputs the driving signal to the actuator 122. The anti-vibration lens driving unit 141 is an example of the shift lens driving unit described in the appended claims.

The lens control information storing unit 142 is a unit storing the current lens control information. The lens control unit 140 controls driving of a predetermined movable unit in the optical lens unit 120, such as an iris, a zoom lens, a focus lens, and the anti-vibration lens group 132. The lens control information is information representing a state of such a movable unit.

The anti-vibration control unit 700 is a unit performing an anti-vibration (camera shake correction) control. For this reason, the anti-vibration control unit 700 generates an amount of anti-vibration shift SFT1 on the basis of the angular velocity detected by the gyro sensor 150. The amount of anti-vibration shift SFT1 is an shift amount component for shifting the anti-vibration lens group 132 to cancel vibration of the captured image corresponding to movement of the video camera 100 indicated by the angular velocity. The anti-vibration control unit 700 has a function realized by execution of a program of the CPU 111, corresponding to FIG. 1.

The uniform aberration correcting unit 600 is a unit that controls driving of the anti-vibration lens group 132 for uniform aberration correction. The uniform aberration correcting unit 600 is provided with a shift amount calculating unit 610, a uniform aberration correction table 620, and an addition unit 630. The uniform aberration correcting unit 600 has a function realized by execution of a program of the CPU 111, corresponding to FIG. 1.

The shift amount calculating unit 610 is a unit for calculating an amount of aberration correction shift SFT2. For this reason, the shift amount calculating unit 610 receives an input of the lens control information from the lens control information storing unit 142 of the lens control unit 140. In this case, the lens control information is information of an iris value, a zoom position, and a focus position.

The iris value in the lens control information represents an iris value set for the iris of the optical lens unit 120. The zoom position represents a position of the zoom lens of the optical lens unit 120. The focus position represents a position of the focus lens of the optical lens unit 120. The lens control unit 140 performs the exposure control, or the like, the zoom control, the focus control as described above. As a result of the control, the lens control unit 140 calculates and stores the iris value, zoom position, and focus position.

The shift amount calculating unit 610 selects the uniform aberration correction data corresponding to the combination of the iris value, zoom position, and focus position from the uniform aberration correction table 620. The amount of aberration correction shift SFT2 is calculated using the selected uniform aberration correction data.

The uniform aberration correction table 620 is a table in which the uniform aberration correction data is stored corresponding to the combination of the iris value, zoom position, and focus position. An example of a structure of the uniform aberration correction table 620 and an example of a method of acquiring the correction data stored therein will be described later. The uniform aberration correction table 620 is stored in the ROM 113 or the like, corresponding to FIG. 1. The ROM 113 is an example of the uniform aberration correction data storing unit described in the appended claims.

The addition unit 630 adds the amount of anti-vibration shift SFT1 output from the anti-vibration control unit 700 to the amount of aberration correction shift SFT2 output from the uniform aberration correcting unit 600, and outputs the added value as the amount of driving shift SFT to the anti-vibration lens driving unit 141.

As described above, in the embodiment of the present disclosure, the anti-vibration lens group 132 is shifted by the amount of driving shift SFT based on the components of the amount of anti-vibration shift SFT1 and the amount of aberration correction shift SFT2. First, an offset for a middle point position of the anti-vibration lens group 132 is given by the amount of aberration correction shift SFT2. For example, in a stop state where no vibration is detected, it is possible to obtain a state where the uniform aberration is appropriately corrected by the offset. In the state where the offset is given, the anti-vibration lens group 132 is driven to cancel the vibration of the image caused by the camera shake, by the component of the amount of anti-vibration shift SFT1. Accordingly, it is possible to obtain a state where the uniform aberration is appropriately corrected while maintaining the state of appropriately performing the anti-vibration control. As described above, in the embodiment of the present disclosure, the uniform aberration correction is performed using the anti-vibration lens group 132.

For example, instead of the configuration shown in FIG. 7, a lens for uniform aberration correction may be provided individually from the anti-vibration lens group 132 to control driving of the lens for uniform aberration correction by the uniform aberration correcting unit 600. However, with such a configuration, the lens for uniform aberration correction is further provided individually from the anti-vibration lens group 132, and there is a disadvantage in costs of components or miniaturization of the optical lens unit 120.

The anti-vibration lens group 132 is shifted in a planar direction perpendicular to the optical axis L. This means that it is possible to generate the uniform aberration caused by the eccentricity described with reference to FIG. 5 by the shift of the anti-vibration lens group 132. In other words, that it is possible to generate the uniform aberration means that it is possible to correct the uniform aberration by shifting the anti-vibration lens group 132. Paying attention to this point in the embodiment of the present disclosure, the anti-vibration lens group 132 is used for the uniform aberration correction. Accordingly, the increase in cost of components for uniform aberration correction does not occur.

When the anti-vibration lens group 132 is used for the uniform aberration correction, it is necessary to perform the anti-vibration control together. However, also in this regard, as described with reference to FIG. 7, the anti-vibration lens group 132 is driven by the amount of driving shift SFT obtained by adding the amount of aberration correction shift SFT2 to the amount of anti-vibration shift SFT1. That is, the anti-vibration control and the uniform aberration correction can be performed together by a simple control of adding the amount of aberration correction shift SFT2 to the amount of anti-vibration shift amount SFT1.

In the example shown in FIG. 7, the anti-vibration lens group 132 is moved to apply eccentricity in the planar direction perpendicular to the optical axis L. Accordingly, the amount of anti-vibration shift SFT1 and the amount of aberration correction shift SFT2 represent the amount of eccentricity. The amount of shift as the amount of eccentricity is represented by horizontal and vertical vector components. A tilt-structure anti-vibration lens is known in which the lens is shifted to apply an inclination with respect to the original optical axis. When the anti-vibration lens group 132 has such a tilt structure, the amount of shift represents an amount of inclination (tilt angle). The anti-vibration lens group 132 may be controlled by combining the shift amounts of both the amount of eccentricity and the tilt angle. However, it is possible to sufficiently correct the uniform aberration occurring due to the inclination of the lens by making the anti-vibration lens group 132 eccentric, and the reverses thereof is possible. Accordingly, it is satisfactory to control the anti-vibration lens group 132 by any one of the amount of eccentricity and the tilt angle.

[Example of Structure of Uniform Aberration Correspondence Shift Table]

Subsequently, an example of a structure of the uniform aberration correction table 620 will be described with reference to FIG. 8. FIG. 8 schematically shows a structure of the uniform aberration correction table 620. In the description of FIG. 8, a variable i ($0 \leq i < ni$) represents an iris value, a variable z ($0 \leq z < nz$) represents a zoom position, and a variable f ($0 \leq f \leq nf$) represents a focus position. For example, the value as actual iris value, zoom position, and focus position may take a decimal. However, all of the iris value, zoom position, and focus position represented by the variables i, z, and f are integers.

In the uniform aberration correction table 620 shown in FIG. 8, (ni×nz) uniform aberration correction data 621, which can be acquired corresponding to a matrix (combination) of the iris value i from "0" to "ni−1" and the zoom position z from "0" to "nz−1", are first stored. The (ni×nz) uniform aberration correction data 621 have a 2-dimensional table structure.

The uniform aberration correction data 621 in the 2-dimensional table are values corresponding to one focus position. As shown in FIG. 8, of 2-dimensional tables are provided, in which the uniform aberration correction data 621 acquired corresponding to each focus position f from "0" to "nf−1" are stored. Accordingly, it is possible to obtain a 3-dimensional table in which the uniform aberration correction data 621 corresponding to the combination of the iris value i, zoom position z, and focus position f are stored.

As described above, the amount of shift for shifting the anti-vibration lens group 132 is formed of horizontal and vertical vector components, that is, shift amount components. In the uniform aberration correction table 620, parameters in a shift amount component direction d corresponding to the horizontal direction and the vertical direction are given. In the shift amount component direction d, the horizontal direction is designated by "0", and the vertical direction is designated by "1". Two 3-dimensional tables are provided in which the uniform aberration correction data 621 corresponding to each shift amount component direction d of "0" and "1" is stored.

As described above, the uniform aberration correction data 620 has a structure as a 4-dimensional table in which the uniform aberration correction data 621 acquired corresponding to each combination of the iris value i, zoom position z, focus position f, and the shift amount component direction d are stored. Accordingly, the number of uniform aberration correction data 621 constituting the uniform aberration correction table 620 is (ni×nz×nf×nd). The uniform aberration correction data 621 represent the horizontal components and the vertical components of the amount of shift (amount of eccentricity) of the anti-vibration lens group 132 necessary to correct the uniform aberration occurring at the time of any one combination of the iris value i, zoom position z, and focus position f. The amount of shift as the uniform aberration correction data 621 is acquired from the amount of color deviation occurring due to uniform aberration to be described later. From this, it is understood that the amount of color deviation occurring due to the uniform aberration changes depending on conditions of the optical system such as the iris, zoom position, and focus position. Hereinafter, the amount of color deviation occurring due to the uniform aberration is also referred to as "amount of uniform aberration".

The amount of uniform aberration is changed, also depending on a color of light in addition to the iris, zoom position, and focus position. For example, in R (red) and B (blue), the amount of uniform aberration is different in the same condition of the iris, zoom position, and focus position. However, in a case of the amount of shift of the lens, the difference in the amount of uniform aberration according to the color of light can be recognized as a difference in the amount of uniform aberration which occurs corresponding to a unit shift amount of the lens. That is, it can be recognized as a difference in sensitivity of the lens with respect to the uniform aberration. Hereinafter, the sensitivity is also referred to as "uniform aberration sensitivity".

It is assumed that the lens is shifted from a certain position in an eccentricity state to a position where the uniform aberration is corrected. In this case, the amounts of uniform aberration of the R light and the B light are different from each other at the eccentric position. However, the difference in the amounts of uniform aberration depends on the uniform aberration sensitivity. Accordingly, the difference gets smaller as the lens gets closer to the position where the uniform aberration is corrected, and all the amounts of the uniform are "0" at the position where the uniform aberration is corrected. From this viewpoint, the uniform aberration correction data 621 corresponding to each color of light is not necessary as the uniform aberration correction table 620.

As an example, when trying to correct the uniform aberration component by the image process, it is assumed that a table storing correction amount data representing the amount of correction for color deviation of pixels is used on the basis of the structure shown in FIG. 8. In this case, it is necessary to individually correct the different amounts of color deviation for each color of light. Accordingly, it is necessary to form a 4-dimensional table corresponding to a total of 5 combinations, by classification of the iris, zoom position, focus position, the color of light, and the horizontal and vertical correction amount components. That is, the amount of data in the uniform aberration correction table 620 shown in FIG. 8 is ½, as compared with the case of correcting the uniform aberration component by the image process.

[Example of Generating Uniform Aberration Correction Table]

Next, sequence of generating the uniform aberration correction table 620 will be described. The flowchart shown in FIG. 9 shows an example of sequence of generating the uniform aberration correction table 620.

First, the uniform aberration sensitivity is calculated by simulation to generate the uniform aberration correction table 620 (Step S901). The uniform aberration sensitivity represents the amount of uniform aberration occurring when shifting the lens by a certain unit shift amount. As a specific example, when the amount of color deviation based on the uniform aberration component is 2 pixels when shifting the lens by 1 µm, the uniform aberration sensitivity is 2=2 pixel/1 µm. That is, the uniform aberration sensitivity is acquired from (amount of uniform aberration/amount of shift).

In the embodiment of the present disclosure, optical characteristics of the anti-vibration lens group 132 used for uniform aberration correction are as already known. Accordingly, the amount of uniform aberration which occurs according to the amount of shift of the anti-vibration lens group 132 from the optical axis of the lens optical system can be calculated by simulation. The uniform aberration sensitivity is acquired from (amount of uniform aberration/amount of lens shift) as described above. That is, the uniform aberration sensitivity can be also acquired by simulation.

The uniform aberration sensitivity is changed according to the combination pattern of the lens control information, in the same manner that the occurrence amount of uniform aberration is changed according to the combination pattern of the lens control information (iris value, zoom position z, and focus position f).

When the uniform aberration sensitivity is calculated, mi values, mz values, and mf values are representatively determined in advance for the iris value i, zoom position z, and focus position f. The uniform aberration sensitivity is calculated for each combination pattern based on mi, mz, and mf iris values i, zoom positions z, and focus positions f. The mi, mz, and mf representative iris values i, zoom positions z, and focus positions f are selected from ni, nz, and of iris values i, zoom positions z, and focus positions f designating the uniform aberration correction data 621, respectively.

Herein, the amount of uniform aberration is the amount of color deviation based on the uniform aberration components of the R light and the B light with respect to the G light after considering the G light as reference. The chromatic aberration of magnification including the uniform aberration component occurs not only in the R light and the B light, but also occurs in the G light. However, it is preferable to perform the correction of aberration such that differences of the relative image formation positions among R, G, and B are the same. In the correction of chromatic aberration of magnification of according to the present disclosure, the G light is selected as reference.

The amount of uniform aberration is different between the R light and the B light in the condition of the same lens control information (iris value i, zoom position z, and focus position f, etc.). This means that the uniform aberration sensitivity is different between the R light and the B light. In Step S901, each uniform aberration sensitivity of the R light and the B light is calculated in one combination of the iris value i, zoom position z, and focus position f.

The uniform aberration sensitivity can be acquired on the basis of optical characteristics of the anti-vibration lens group 132, and the optical characteristic are common for a product as the anti-vibration lens group 132. Accordingly, the uniform aberration sensitivity calculated by the step S901 can be commonly used for a product as the video camera 100.

Step S902 and the subsequent steps to be described hereinafter are performed corresponding to each product as the video camera 100. The sequence of Step S902 and the subsequent steps is sequence for measuring the amount of uniform aberration which actually occurs in the video camera 100 and for generating the uniform aberration correction table 620 using the measurement result. The amount of actually occurring uniform aberration is different according to video cameras 100 by the lens installation error, and thus the amount of shift as the finally obtainable uniform aberration correction data 621 is different according to products as the video camera 100.

First, a chart image is captured by the video camera 100 that is a measurement target to measure the amount of uniform aberration (Step S902). In this case, the chart image is an image having a predetermined pattern provided to measure the uniform aberration from the captured image. A specific example of the chart image will be described later. The capturing of the chart image in Step S902 is performed in a state where one combination pattern selected from mi, mz, and mf representative iris values i, zoom positions z, and focus positions f is set for the optical lens unit 120.

Then, the amount of uniform aberration actually occurring is measured using the image obtainable by capturing the chart image in Step S902 (Step S903). The measured amount of uniform aberration corresponds to the combination pattern of the iris value i, zoom position z, and focus position f set when the chart image is captured in Step S902. As described above, the amount of uniform aberration in the combination pattern of the same iris value i, zoom position z, and focus position f is different between the R light and the B light. In Step S903, the amount of uniform aberration in each of the R light and the B light is acquired.

The sequence of Step S903 is repeatedly performed until the amount of uniform aberration for every combination pattern based on mi, mz, and mf representative iris values i, zoom positions z, and focus positions f (Step S904). That is, when there is a combination pattern for which the amount of uniform aberration has not been measured yet, the sequence of Step S902 and Step S903 is repeated by combination patterns of new representative iris values i, zoom positions z, and focus positions f. Finally, the amounts of uniform aberration corresponding to all combination patterns for the representative iris values i, zoom positions z, and focus positions f are measured (Step S904), and subsequently, the following sequence is performed.

First, the amount of shift of the anti-vibration lens group 132 is calculated using the uniform aberration sensitivities of the R light and the B light calculated in Step S901, and the amounts of uniform aberration of the R light and the B light measured in Step S903 (Step S905). In Step S905, (mi×mz×mf) amounts of shift corresponding to the combination patterns of the representative iris values i, zoom positions z, and focus positions f are acquired.

An example of calculation of the amount of shift corresponding to one combination pattern of the iris value i, zoom position z, and focus position f in Step S905 will be described. Among the uniform aberration sensitivities calculated in Step S901, the uniform aberration sensitivity corresponding to the R light is $\epsilon_r$, and the uniform aberration sensitivity corresponding to the B light is $\epsilon_b$. Among the amounts of uniform aberration acquired in Step S903, the amount of uniform aberration corresponding to the R light is $\delta_r$, and the amount of uniform aberration corresponding to the B light is $\delta_b$.

According to the sequence of calculation of the uniform aberration sensitivity in Step S901, the uniform aberration sensitivity is represented by (amount of uniform aberration/amount of shift). Accordingly, the amounts of shift $\gamma_r$ and $\gamma_b$ of the lens corresponding to the amounts of actual uniform aberration $\beta_r$ and $\beta_b$ measured in Step S903 may be acquired by the following formulas using the uniform aberration sensitivities $\epsilon_r$ and $\epsilon_b$ acquired by simulation.

$$\gamma_r = \delta_r / \epsilon_r$$

$$\gamma_b = \delta_b / \epsilon_b$$

It is natural that the amounts of shift $\gamma_r$ and $\gamma_b$ corresponding to the R light and the B light acquired by the above formulas are ideally the same value. However, the uniform aberration sensitivities $\alpha_r$ and $\alpha_b$ are acquired by simulation, but the amounts of uniform aberration $\beta_r$ and $\beta_b$ may be acquired by actual measurement. For this reason, in the embodiment of the present disclosure, it is assumed that there is an error between the uniform aberration sensitivities $\alpha_r$ and $\alpha_b$ and the amounts of uniform aberration $\beta_r$ and $\beta_b$, and the amounts of shift $\gamma_r$ and $\gamma_b$ with the same value are not calculated. In the assumption, in the embodiment, the average value of the amounts of shift $\gamma_r$ and $\gamma_b$ corresponding to the R light and the B light acquired in the above formulas is acquired, and thus the amount of shift γ corresponding to one combination pattern of the iris value i, the zoom position z, the focus position f is acquired. The amount of shift γ acquired as described above has a more accurate value where the error is reduced.

For example, when the error is within a permissible range, any one of the amounts of $\gamma_r$ and $\gamma_b$ corresponding to any one of the R light and the B light may be considered as the amount of shift γ. In this case, it is preferable to perform calculation of the uniform aberration sensitivity and measurement of the amount of uniform aberration corresponding to only any one of the R light and the B light in Step S901 and Step S903.

As described above, the mi, mz, and mf representative iris values i, zoom positions z, and focus positions f are selected from ni, nz, and nf iris values i, zoom positions z, and focus positions f in the uniform aberration correction table 620. Accordingly, at a stage of completing the sequence of Step S905, the amounts of shift corresponding to the combination patterns of (ni−mi), (nz−mz), and (nf−mf) iris values i, zoom positions z, and focus positions f other than the representative iris values i, zoom positions z, and focus positions f have not been acquired yet. In Step S906, the amounts of shift corresponding to the combination patterns of the iris values i, zoom positions z, and focus positions f other than the representation are calculated. For this reason, it is preferable to perform predetermined interpolation calculation using a necessary amount of shift of the combination pattern selected from the amounts of shift corresponding to the combination patterns of the representative iris values i, zoom positions z, and the focus positions f calculated in Step S905.

When the sequence to Step S906 is completed, the amounts of shift corresponding to the combination patterns of ni, nz, and nf iris values i, zoom positions z, and focus positions f are acquired. In Step S907, the uniform aberration correction data 621 is generated on the basis of the amounts of shift acquired as described above, the uniform aberration correction data 621 is stored, and the uniform aberration correction table 620 is generated.

The amounts of shift acquired in Step S905 and Step 906 represent the movement direction and the amount of movement of the anti-vibration lens for causing the uniform aberration. On the other hand, it is conceivable that the amounts of shift as correction values for correcting the uniform aberration are the uniform aberration correction data 621. The amounts of shift as the correction values may be generated by inverting values indicated by horizontal and vertical vector components as the amount of shift acquired in Step S905 and Step S906. The amounts of shift acquired in Step S905 and Step S906 may be the uniform aberration correction data 621. In this case, it is possible to acquire the amounts of shift for correction by performing a calculation inverting the horizontal and vertical vector components as the uniform aberration correction data 621.

[Example of Chart Image for Uniform Aberration Measurement]

Subsequently, an example of the chart image for uniform aberration measurement captured in Step S902 shown in FIG. 9 will be described.

Figure 10A:
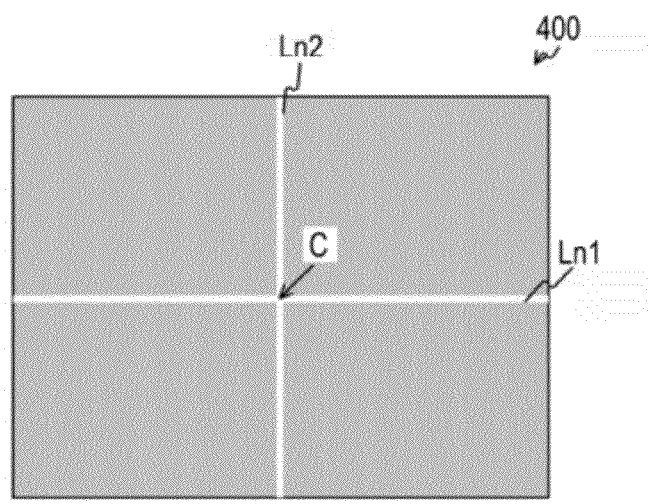
FIGS. 10A to 10C are diagrams illustrating an example of a chart image used to measure the amount of chromatic aberration caused by uniform aberration when acquiring uniform aberration correction data of the uniform aberration correction table.

First, a chart image 400 shown in FIG. 10A will be described. In the chart image 400 shown in FIG. 10A, a line Ln1 passing through the center C of the screen in the horizontal direction, and a line Ln2 passing through the center C in the vertical direction are shown. For example, in practice, a predetermined color different from the background color is set for the two lines Ln1 and Ln2.

The amounts of color deviation of the R light and the B light with respect to the G light occurring in the vertical direction with respect to the horizontal line Ln1 are measured. The color deviation occurs such that the concentric aberration components concentrically spread out from the screen center, and thus the vertical color deviation does not occur in the horizontal line Ln1. Accordingly, the measuring the vertical color deviation occurring in the horizontal line Ln1 means that it is possible to measure the vertical vector components of the amounts of color deviation based on the uniform aberration components in the state where the color deviation based on the concentric aberration components does not occur.

In this case, the measuring the amount of color deviation may be performed along each row in arrangement of pixels, and may be performed at a regular interval. For example, it is possible to shorten the time for measurement by setting the interval of measuring the amount of color deviation as large as possible within the scope in which reliability of the measurement result is not lost. The average value of the vertical vector components measured as described above is calculated for each of the R light and the B light.

Similarly, the amounts of color deviation of the R light and the B light with respect to the G light occurring in the horizontal direction with respect to the vertical line Ln2 are measured, and the average value of the measured amounts of color deviation is calculated for each of the R light and the B light. For the same reason, the measuring the amount of vertical color deviation occurring in the vertical line Ln2 means that it is possible to measure the horizontal vector components of the amounts of color deviation based on the uniform aberration components in the state where the color deviation based on the concentric aberration components does not occur. The calculated vertical and horizontal vector components corresponding to the R light and the B light are the amounts of uniform aberration.

Next, a chart image 400A shown in FIG. 10B will be described. In the chart image 400A, horizontal bars 401 and 401 are drawn at positions on both left and right sides of a virtual horizontal line Lh passing through the center C of the image. Similarly, vertical bars 402 and 402 are drawn at positions on both upside and downside of a virtual vertical line Lv passing through the center C of the image. In this case, the vertical vector components of the amounts of uniform aberration are measured by measuring the amounts of color deviation of the R light and the B light with respect to the G light occurring in the vertical direction with respect to the horizontal bars 401 and 401. In addition, the horizontal vector components of the amounts of uniform aberration are measured by measuring the amounts of color deviation of the R light and the B light with respect to the G light occurring in the horizontal direction with respect to the vertical bars 402 and 402.

Figure 10B:
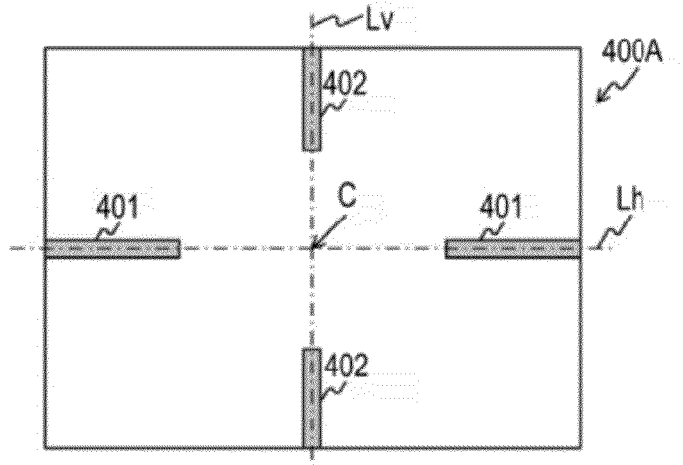
Figure 10C:
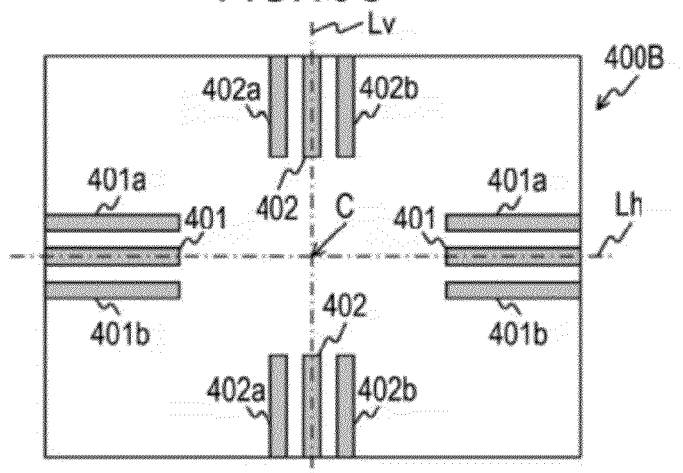

A chart image 400B shown in FIG. 10O is an example of adding horizontal bars 401a and 401b to the upside and the downside of each of the left and right horizontal bars 401 and 401 shown in FIG. 10B further at a predetermined interval. In this case, the amount of color deviation occurring in the vertical direction is measured for each of the left and right horizontal bars 401, 401a, and 401b of the chart image 400B. Similarly, the amount of color deviation occurring in the horizontal direction is measured for each of the up and down vertical bars 402, 402a, and 402b of the chart image 400B. In this case, it is possible to increase the number of pixels which can be measured around the horizontal center and the vertical center of the image, and thus it is possible to expect improvement of measurement repeatability (noise resistance).

In a chart image 400C shown in FIG. 11A, dots 403 are arranged in a predetermined number of lines and rows on the whole of the image. At the time of measurement, for example, the amounts of color deviation at a part indicated by the broken lines in FIG. 11A are measured. That is, the amounts of vertical color deviation occurring with respect to the dots 403 in the areas on both left and right sides taken along the virtual horizontal line Lh are measured. In addition, the amounts of horizontal color deviation occurring with respect to the dots 403 in areas on upside and downside taken along the virtual vertical line Lv are measured. For example, the chart image 400C is one of images generally used for measurement of aberration, but the amount of uniform aberration may be acquired by measurement using such a general image.

A chart image 400D shown in FIG. 11B is specialized in the amount of uniform aberration of the embodiment of the present disclosure, and for example, is formed by extracting only a pattern formed of dots 403 only shown in the broken line part from FIG. 11A.

A chart image 400E shown in FIG. 11C is, for example, a pattern in which the line Ln1 and the line Ln2 shown in FIG. 11A are shifted in arrangement of the dots 403. Accordingly, a measurement method is the same as that of FIG. 10A. As described above, it is possible to measure the amount of uniform aberration necessary to acquire the amount of shift of the embodiment of the present disclosure even using any of chart images shown in FIGS. 10A to 11C.

[Example of Process Sequence for Uniform Aberration Correction]

Figure 12:
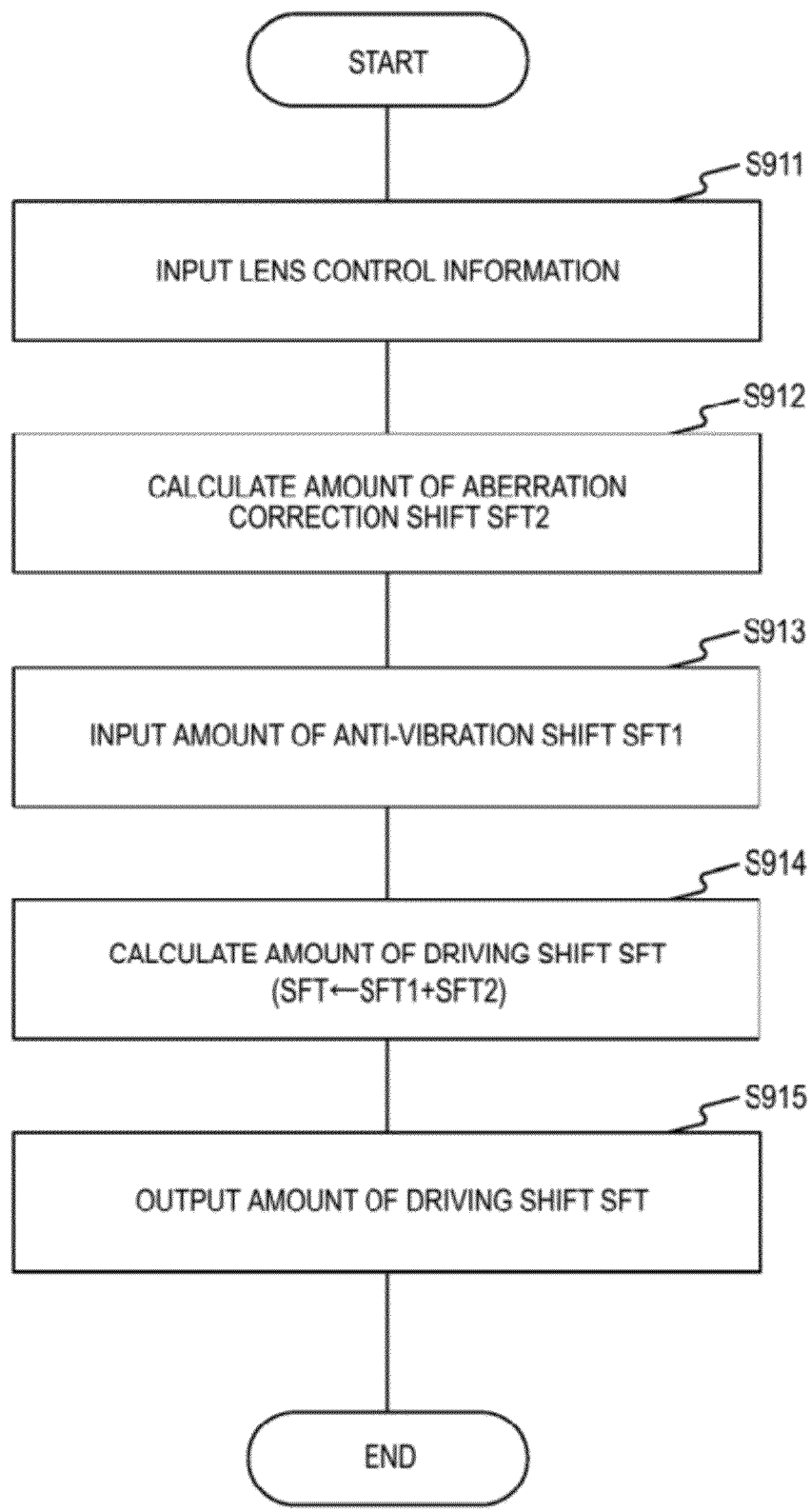
FIG. 12 is a diagram illustrating an example of process sequence for uniform aberration correction performed by a uniform aberration correcting unit.

A flowchart shown in FIG. 12 shows an example of process sequence performed by the uniform aberration correcting unit 600 shown in FIG. 7. For example, the CPU 111 executes a program to realize the processes of steps shown in FIG. 12. The processes may be configured by hardware.

First, the shift amount calculating unit 610 receives an input of the lens control information from the lens control unit 140 (Step S911). As described above, the lens control information is information of iris values, zoom positions, and focus positions set in the optical lens unit 120.

Then, the shift amount calculating unit 610 calculates the amount of aberration correction shift SFT2 corresponding to the lens control information input in Step S911 (Step S912). For example, the amount of aberration correction shift SFT2 may be calculated as follows.

The iris value, zoom position, and focus position that are the lens control information acquired in Step S911 are represented by $p_i$, $p_z$, and $p_f$, respectively. Each of the iris value $p_i$, zoom position $p_z$, and focus position $p_f$ is formed of an integer portion (i) and a decimal portion (f) to predetermined places of decimals, and is represented by the following formulas.

$$p_i = p_{ii} + p_{if}$$

$$p_z = p_{zi} + p_{zf}$$

$$p_f = p_{fi} + p_{ff}$$

The shift amount calculating unit 610 is designated as follows when selecting arbitrary uniform aberration correction data 621 in the uniform aberration correction table 620. That is, it is designated by the combination of the iris value i, zoom position z, and focus position f based on integer. As described above, this corresponds to the uniform aberration correction table 620 storing the uniform aberration correction data 621 corresponding to the combination of the iris value i, zoom position z, and focus position f that are integers. The uniform aberration correction data 621 designated above is represented by Tca1[i][z][f][d].

The shift amount calculating unit 610 accesses the uniform aberration correction data 621 designated by Tca1[$p_{ii}$][$p_{zi}$][$p_{fi}$][d], and performs reading from the uniform aberration correction table 620. The [d] is [0] or [1], and the uniform aberration correction data 621 designated by Tca1[$p_{ii}$][$p_{zi}$][$p_{fi}$][d] is two shift amount components corresponding to the horizontal and vertical directions.

The shift amount calculating unit 610 accesses the uniform aberration correction data 621 designated by Tca1[$p_{ii}$+1][$p_{zi}$+1][$p_{fi}$+1][d], and performs reading from the uniform aberration correction table 620.

Then, the shift amount calculating unit 610 calculates the amount of shift Timg1[d] corresponding to the uniform aberration correction. For this reason, calculation based on the following formula is performed using the uniform aberration correction data 621 represented by the Tca1[$p_{ii}$][$p_{zi}$][$p_{fi}$][d] and Tca1[$p_{ii}$+1][$p_{zi}$+1][$p_{fi}$+1][d].

$$T_{img1}[d] = \sum_{i=0}^{1}\sum_{j=0}^{1}\sum_{k=0}^{1} T_{ca1}[p_{ii}+i][p_{zi}+j][p_{fi}+k][d] \cdot \{(1-i)+(-1)^{j+1} \cdot p_{if}\} \cdot$$
$$\{(i-j)+(-1)^{j+1} \cdot p_{zf}\} \cdot \{(1-k)+(-1)^{k+1} \cdot p_{ff}\}$$

That is, the uniform aberration correction data 621 that is an interpolation source is acquired by the integer values of the iris value $p_i$, zoom position $p_z$, and focus position $p_f$. This is Tca1[$p_{ii}$][$p_{zi}$][$p_{fi}$][d] and Tca1[$p_{ii}$+1][$p_{zi}$+1][$p_{fi}$+1][d]. 3-dimensional linear interpolation is performed using the decimal values $p_{if}$, $p_{zf}$, and $p_{ff}$ of the iris value $p_i$, zoom position $p_z$, and focus position $p_f$ by the uniform aberration correction data 621 that is the interpolation source. The interpolation value acquired above is Timg1[d]. In this case, the value of the amount of shift Timg1[d] is used as the amount of aberration correction shift SFT2. In the embodiment, the amount of aberration correction shift SFT2 is acquired by the linear interpolation, but the other interpolation process or calculation method may be employed.

Then, the addition unit 630 receives an input of the amount of anti-vibration shift SFT1 output from the anti-vibration control unit 700 (Step S913). Then, the addition unit 630 adds the amount of anti-vibration shift SFT1 to the amount of aberration correction shift SFT2 calculated in Step S912 to calculate the amount of driving shift SFT (Step S914). The addition unit 630 outputs the amount of driving shift SFT acquired above to the anti-vibration driving unit 141 (Step S915).

The process sequence described with reference to FIG. 12 is continuously repeated for the video camera 100 set in an imaging mode in which the captured image is recordable. Accordingly, in the imaging mode, it is possible to normally obtain a captured image in which the color deviation caused by the uniform aberration component in the chromatic aberration of magnification is corrected. In addition, it is possible to normally obtain a captured image in which the vibration of the captured image caused by camera shake is canceled out.

[Configuration for Concentric Aberration Correction]

Subsequently, a configuration for concentric aberration correction in the first embodiment will be described. As described above, in the embodiment of the present disclosure, the correction of the uniform aberration is normally performed by the lens control. In this state, the uniform aberration of the captured image is corrected, but the concentric aberration remains. In the first embodiment, the color deviation caused by the concentric aberration is corrected by an image signal process as described later.

Figure 13:
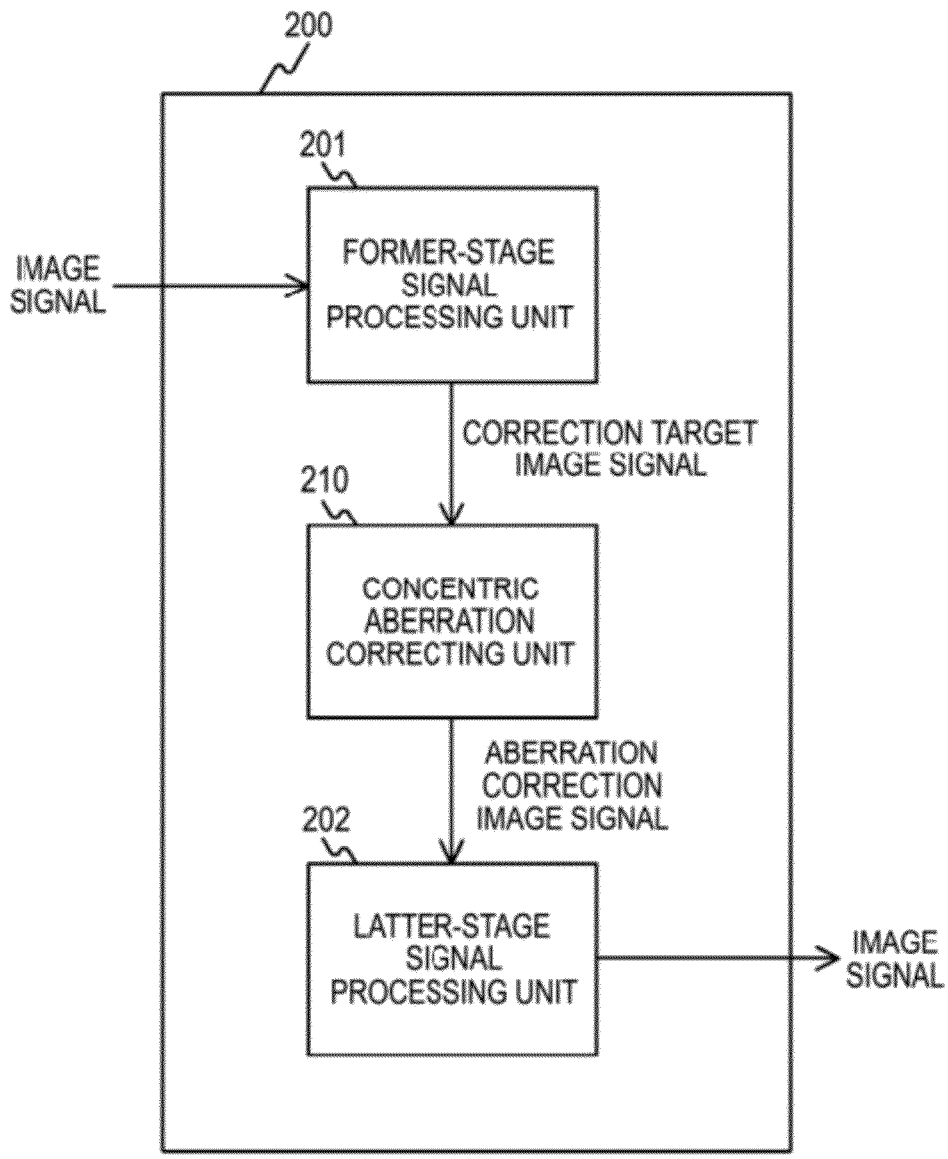
FIG. 13 is diagram illustrating an example of a configuration of a camera signal processing unit corresponding to concentric aberration correction.

FIG. 13 is an example of a configuration of the camera signal processing unit 200 show in FIG. 1. The camera signal processing unit 200 shown in FIG. 13 is provided with a former-stage signal processing unit 201, a concentric aberration correcting unit 210, and a latter-stage signal processing unit 202.

The former-stage signal processing unit 201 is a unit performing a correction process such as black level correction and gain correction on the input image signal of a RAW image data form. The concentric aberration correcting unit 210 is a unit receiving an input of the image signal of the RAW image data form passing through the process in the former-stage signal processing unit 201 as a correction target image signal to perform an image signal process for correction of chromatic aberration of magnification. The latter-stage signal processing unit 202 receives an input of the aberration correction image signal passing through the process in the concentric aberration correcting unit 210 to perform an image signal process such as color conversion, color interpolation process, and gamma correction.

As described above, the correction of the concentric aberration component in the chromatic aberration of magnification is performed on the image signal by the concentric aberration correcting unit 210. That is, the concentric aberration correction is performed by the image process.

Figure 14:
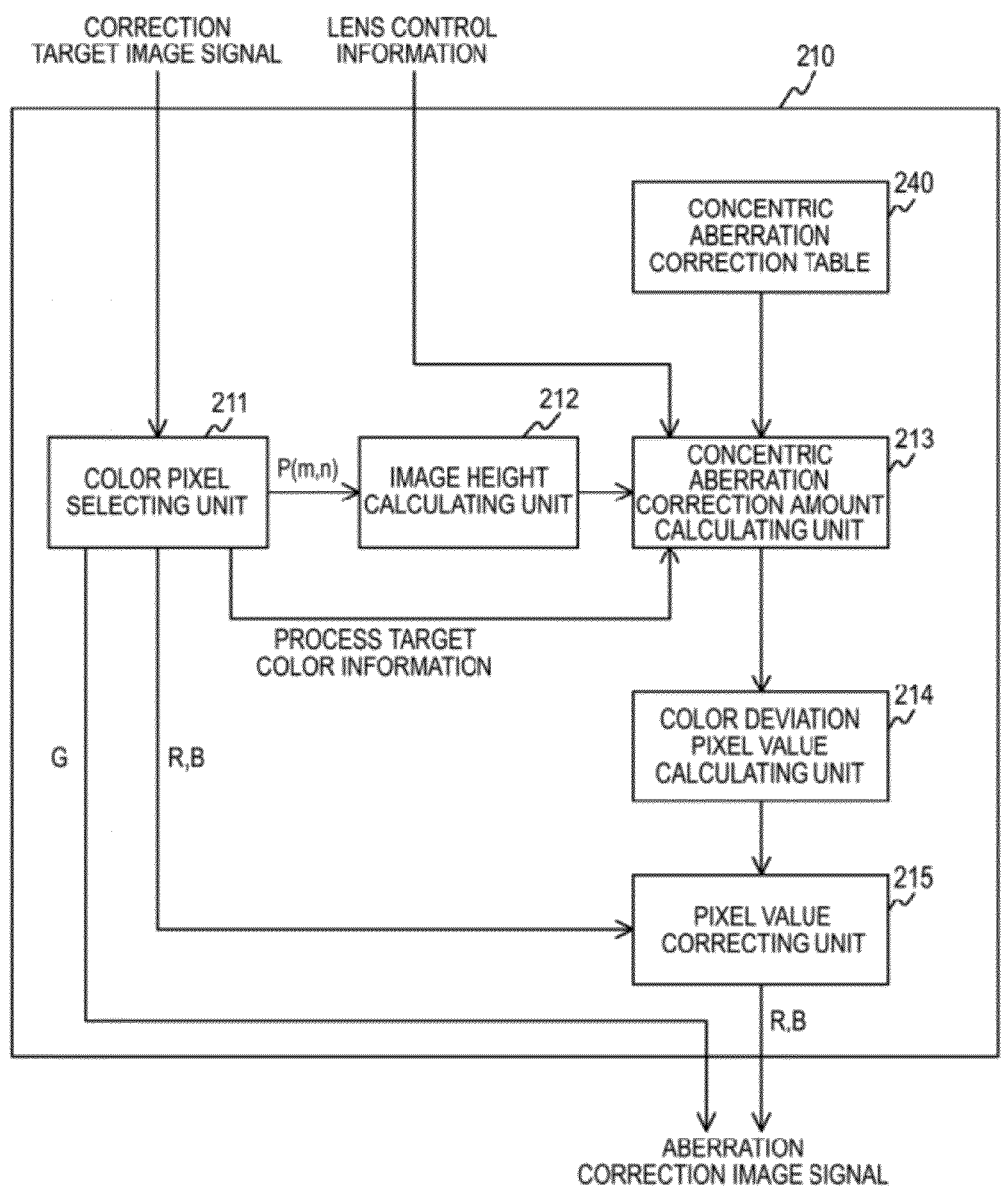
FIG. 14 is a diagram illustrating an example of a configuration of a concentric aberration correcting unit of a first embodiment of the present disclosure.

FIG. 14 shows an example of a configuration of the concentric aberration correcting unit 210 shown in FIG. 13. The concentric aberration correcting unit 210 shown in FIG. 14 is provided with a color pixel selecting unit 211, an image height calculating unit 212, a concentric aberration correction amount calculating unit 213, a color deviation pixel value calculating unit 214, and a pixel value correcting unit 215. The concentric aberration correcting unit 210 has a concentric aberration correction table 240.

The correction target image signal input by the concentric aberration correcting unit 210 is the RAW image data form as described above, and for example, is formed of a color pixel signal corresponding to each color of R (red), G (green), and B (blue) according to arrangement of color filters for pixels of light receiving elements in the photoelectric conversion unit. The color pixel selecting unit 211 selectively extracts an R pixel signal and a B pixel signal from the input correction target image signals, and sequentially outputs, for example, the image signals selected as the process target pixels from such signals to the pixel value correcting unit 215 at a predetermined timing. The color pixel selecting unit 211 selectively extracts a G pixel signal, and outputs the extracted signal as a G signal component of the aberration correction pixel signal output from the concentric aberration correcting unit 210. The concentric aberration correcting unit 210 of the first embodiment performs correction of the pixel value on each of pixels forming an R image face and pixels forming a B image face. The color pixel selecting unit 211 also performs outputting information of coordinates P(m, n) of the process target pixels to the image height calculating unit 212. The color pixel selecting unit 211 recognizes the coordinates of each pixel at the time of the color pixel selecting process. In addition, the color pixel selecting unit 211 outputs process target color information representing whether the color of the pixel selected as the process target pixel is R or G to the concentric aberration correction amount calculating unit 213.

The image height calculating unit 212 is a unit calculating an image height on the image face corresponding to the coordinate P(m, n) of the input process target pixel.

The concentric aberration correction table 240 is a table in which correction data corresponding to the concentric aberration components are stored. An example of a structure of the concentric aberration correction table 240, and an example of a method of acquiring the correction data stored therein will be described later. For example, in practice, the concentric aberration correction table 240 is stored in a memory of the centric aberration correcting unit 210 or in the ROM 113 shown in FIG. 1. Such a memory or ROM 113 is an example of the concentric aberration correction data storing unit described in the appended claims.

The concentric aberration correction amount calculating unit 213 is a unit calculating the amount of correction corresponding to the concentric aberration component. For this reason, the concentric aberration correction amount calculating unit 213 receives an input of the iris value, zoom position, and focus position as the lens control information from the lens control information storing unit 142 (see FIG. 7) of the lens control unit 140, and receives an input of the image height calculated in the image height calculating unit 212. In addition, the concentric aberration correction amount calculating unit 213 receives an input of the process target color information from the color pixel selecting unit 211.

The concentric aberration correction amount calculating unit 213 selects the correction amount data corresponding to the combination of the iris value, zoom position, focus position, image height value, and color indicated by the process target color information, from the concentric aberration correction table 240. The amount of correction corresponding to the concentric aberration component is calculated using the selected correction amount data.

The color deviation pixel value calculating unit 214 is a unit calculating a pixel value of a color deviation pixel using the amount of correction corresponding to the concentric aberration component calculated above. The color deviation pixel means a pixel in which it is considered that light to be originally imaged at the position of the process target pixel be actually imaged with the color deviation caused by the concentric aberration.

The pixel value correcting unit 215 performs a process of correcting the pixel value for each process target pixel. For this reason, the pixel value correcting unit 215 performs a process of rewriting the pixel value of the process target pixel into the pixel value of the color deviation pixel calculated by the color deviation pixel value calculating unit 214.

The color pixel signals of R and B, the pixel value of which can be rewritten by the pixel value correcting unit 215, and the color pixel signal of G passing through the color pixel selecting unit 211 are output as the aberration correction image signal from the concentric aberration correcting unit 210. The color pixel signals of R and B output above are signals in which the color deviation of G pixel caused by the concentric aberration is corrected.

For example, a DSP (Digital Signal Processor) or the like executes a program to realize the units of the concentric aberration correcting unit 210 shown in FIG. 14. The CPU 111 may execute a program to realize at least a part of functions in the concentric aberration correcting unit 210. In addition, it is conceivable that it may be realized by hardware.

[Example of Structure of Concentric Aberration Correction Data Table]

Figure 15:
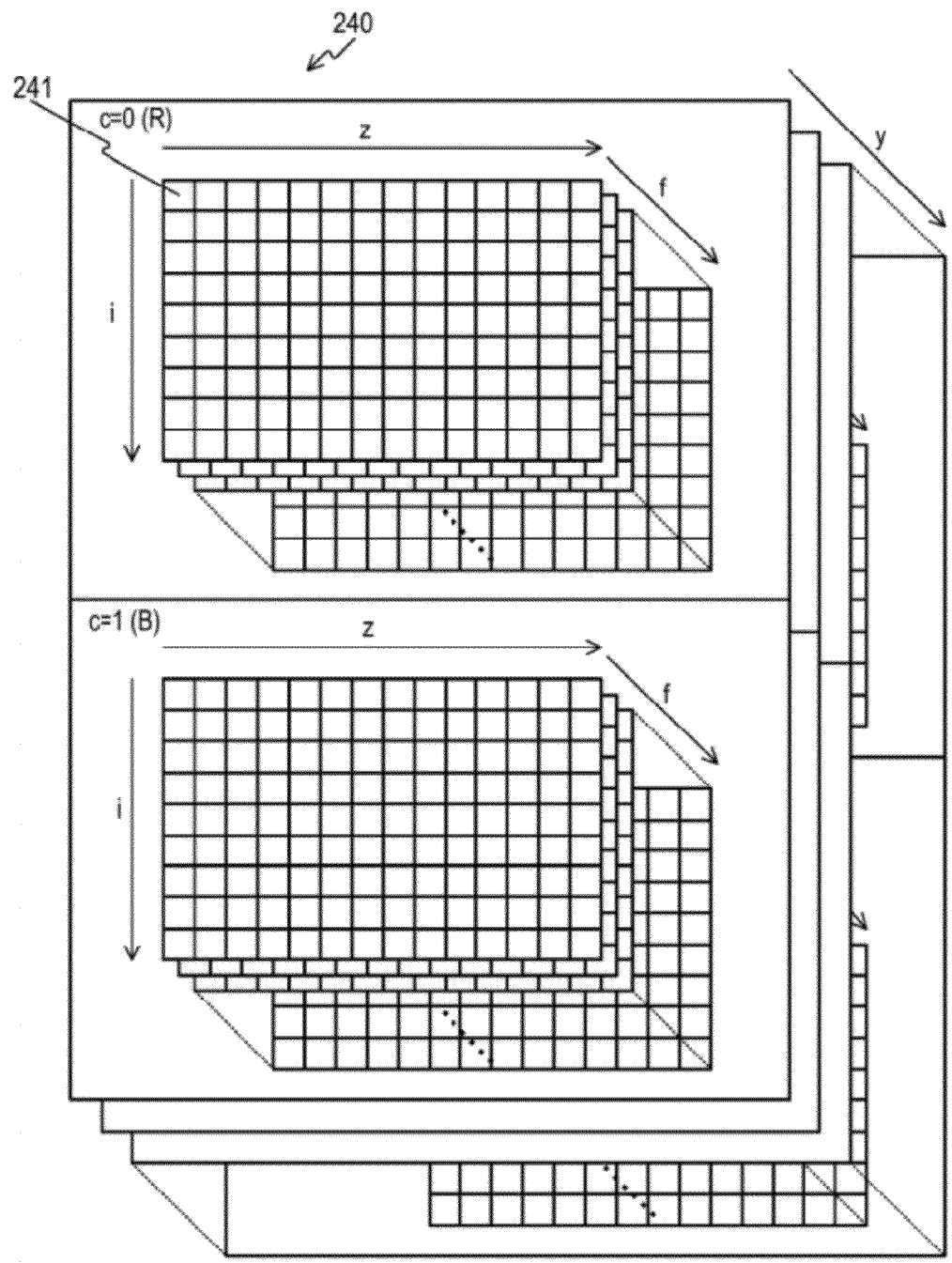
FIG. 15 is a diagram illustrating an example of a structure of a concentric aberration correction table.

Subsequently, an example of a structure of the concentric aberration correction table 240 will be described with reference to FIG. 15. FIG. 15 schematically shows the structure of the concentric aberration correction table 240. Also in the case of FIG. 15, a variable i ($0 \leq i < ni$) represents an iris value, a variable z ($0 \leq z < nz$) represents a zoom position, a variable f ($0 \leq f < nf$) represents a focus position, in the same manner as the case of the uniform aberration correction table 620 of FIG. 8. A variable y ($0 \leq f < ny$) represents an image height value. Also in the case of FIG. 15, all of the iris value, zoom position, focus position, and image height value represented by the variables i, z, f, and y are integers. A variable c ($0 \leq c < 2$) represents a color of light (process target color) that is the correction process target. The process color is two methods for variables R and B. In the embodiment, the color represents R (red) when the variable c is "0", and represents B (blue) when the variable c is "1".

First, the concentric aberration correction table 240 shown in FIG. 15 is mainly divided according to each of the process target colors of R and B indicated by the variable c. First, a 2-dimensional table storing (ni×nz) concentric aberration correction data 241, which can be acquired corresponding to matrix (combination) of the iris value i and the zoom position z is provided corresponding to the process target color of R.

The concentric aberration correction data 241 in the 2-dimensional table are values corresponding to one focus position. As shown in FIG. 15, of 2-dimensional tables are provided, in which the concentric aberration correction data 241 acquired corresponding to each focus position f from "0" to "nf−1" are stored. Accordingly, it is possible to obtain a 3-dimensional table in which the concentric aberration correction data 241 corresponding to the combination of the iris value i, zoom position z, and focus position f are stored.

The 3-dimensional table corresponds to one image height value y. As shown in FIG. 15, ny 3-dimensional tables in which the concentric aberration correction data 241 corresponding to each image height value y of "0" to "ny−1" is stored are provided. Accordingly, it is possible to obtain a 4-dimensional table in which the concentric aberration correction data 241 corresponding to the combination of the iris value i, zoom position z, focus position f, and image height value y is stored. The 4-dimensional table is provided corresponding to the process target color of B (c=1).

As described above, the concentric aberration correction table 240 stores the concentric aberration correction data 241 which can be acquired corresponding to each combination of the iris value i, zoom position z, focus position f, image height value y, and process target color c. That is, the concentric aberration correction table 240 has a structure as a 5-dimensional table. Accordingly, the number of concentric aberration correction data 241 constituting the concentric aberration correction table 240 is (ni×nz×nf×ny×nc). The structure of the concentric aberration correction table 240 means that the amount of color deviation taken along the image height direction as the concentric aberration component changes depending on the condition of the optical system such as the iris, zoom position, and focus position, and each element of the image height and color of light.

[Example of Method of Acquiring Correction Data corresponding to Concentric Aberration Component]

Next, an example of a method of acquiring the concentric aberration correction data 241 in the concentric aberration correction table 240 will be described. Characteristics of the lens employed in the optical lens unit 120 are as the existing. For example, this means that the change in the amount of color deviation corresponding to the image height of the concentric aberration shown in FIGS. 3A and 3B as characteristics of the lens is as known. Herein, it is possible to acquire the concentric aberration correction data 241 constituting the concentric aberration correction table 240 by performing simulation on the basis of the characteristics of the lens. More specifically, for example, the concentric aberration correction data 241 corresponding to the R light is calculated as follows. That is, simulation for the R light and the G light in any one combination condition of parameters of the iris value i, zoom position z, focus position f, and image height y is performed to acquire the amount of color deviation of the R light with respect to the G light obtainable by the simulation. The amount of correction by which the position of the R light can coincide with the G light due to cancelling the amount of color deviation is calculated, and the amount of correction is the concentric aberration correction data 241. The simulation is performed for each combination condition of all the other parameters, and all the concentric aberration correction data 241 corresponding to the R light are calculated. For the B light, similarly, the simulation for the B light and the G light is performed for each combination condition of the parameters, the amount of color deviation of the B light with respect to the G light is acquired, and the concentric aberration correction data 241 is acquired.

As described in FIG. 4B, the concentric aberration component does not depend on individual variations in the imaging optical system but the amount of shift thereof is determined according to only the characteristics of the lens itself. Accordingly, the concentric aberration correction table 240 formed of the concentric aberration correction data 241 acquired by the simulation as described above, which is common for a product as the video camera 100, may be used.

In specification, the "amount of correction" is the "amount of aberration correction" necessary to resolve the color deviation, and the unit thereof is the relative value of the magnification, pixel value, of screen size, or the like. The amount of color deviation is the amount of color deviation occurring due to aberration, and is referred to as "occurrence amount of aberration". The unit thereof is any of the relative value of magnification, pixel value, or screen size.

In the above description, first, the amount of color deviation caused by the concentric aberration is acquired, and the concentric aberration correction data 241 as the amount of correction is acquired from the acquired amount of color deviation, but the amount of color deviation may be stored as the concentric aberration correction data 241. In this case, it is preferable that the concentric aberration correction amount calculating unit 213 converts the amount of color deviation represented as the concentric aberration correction data 241 into the amount of correction, and the amount of correction necessary for the actual process is calculated from the converted amount of correction. Specifically, for example, when magnification is a unit, the relation between the amount of correction and the amount of color deviation is represented by (amount of correction=1/amount of color deviation). When the pixel value or the relative value of screen size is a unit, the relation between the amount of correction and the amount of color deviation is represented by (amount of correction=−amount of color deviation). Further, the two relational formulas are simple, and the conversion between the amount of color deviation and the amount of correction can be easily performed by a very small amount of calculation.

[Example of Process Sequence of Concentric Aberration Correction Unit]

Figure 16:
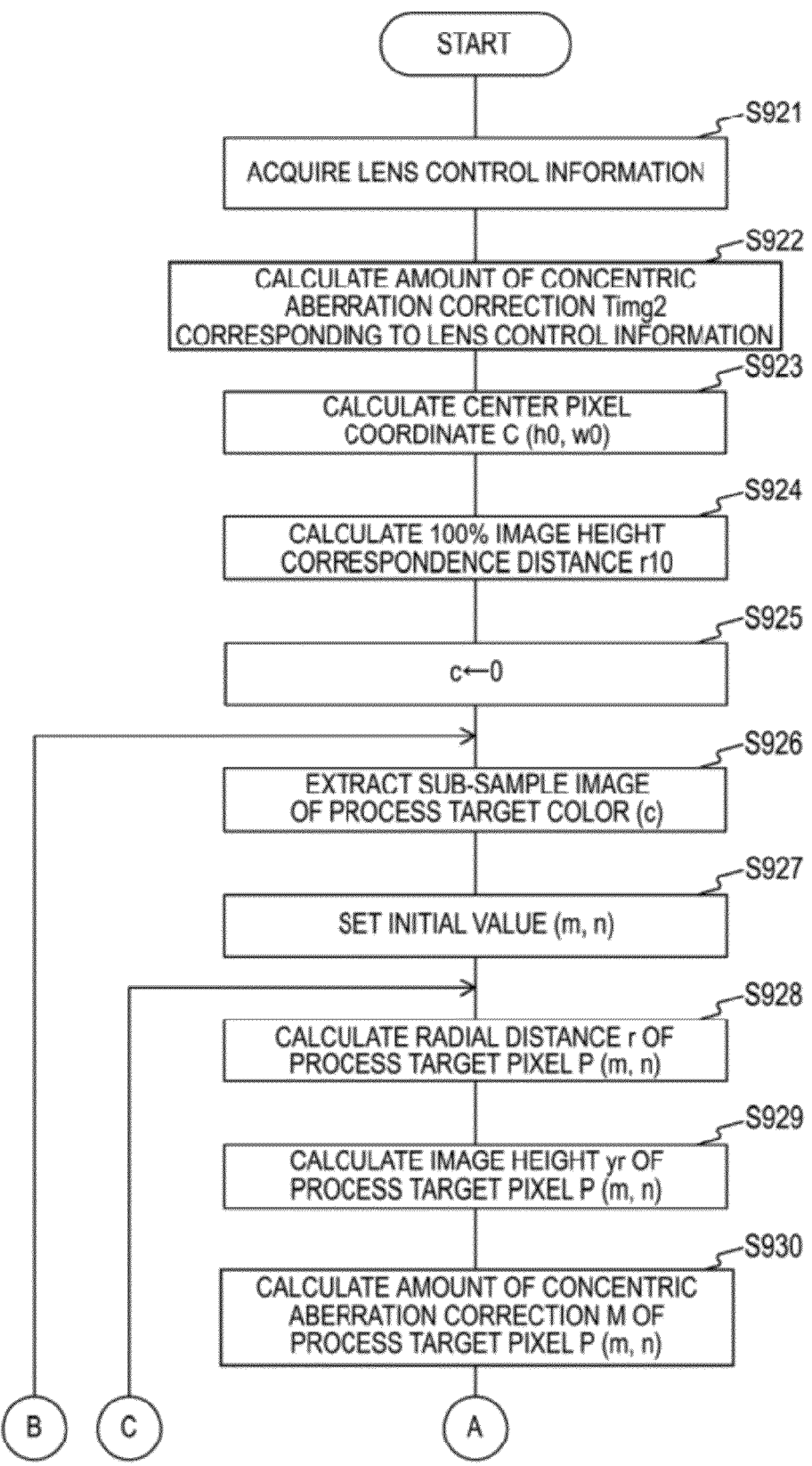
FIG. 16 is a diagram illustrating an example of process sequence performed by the concentric aberration correcting unit.
Figure 17:
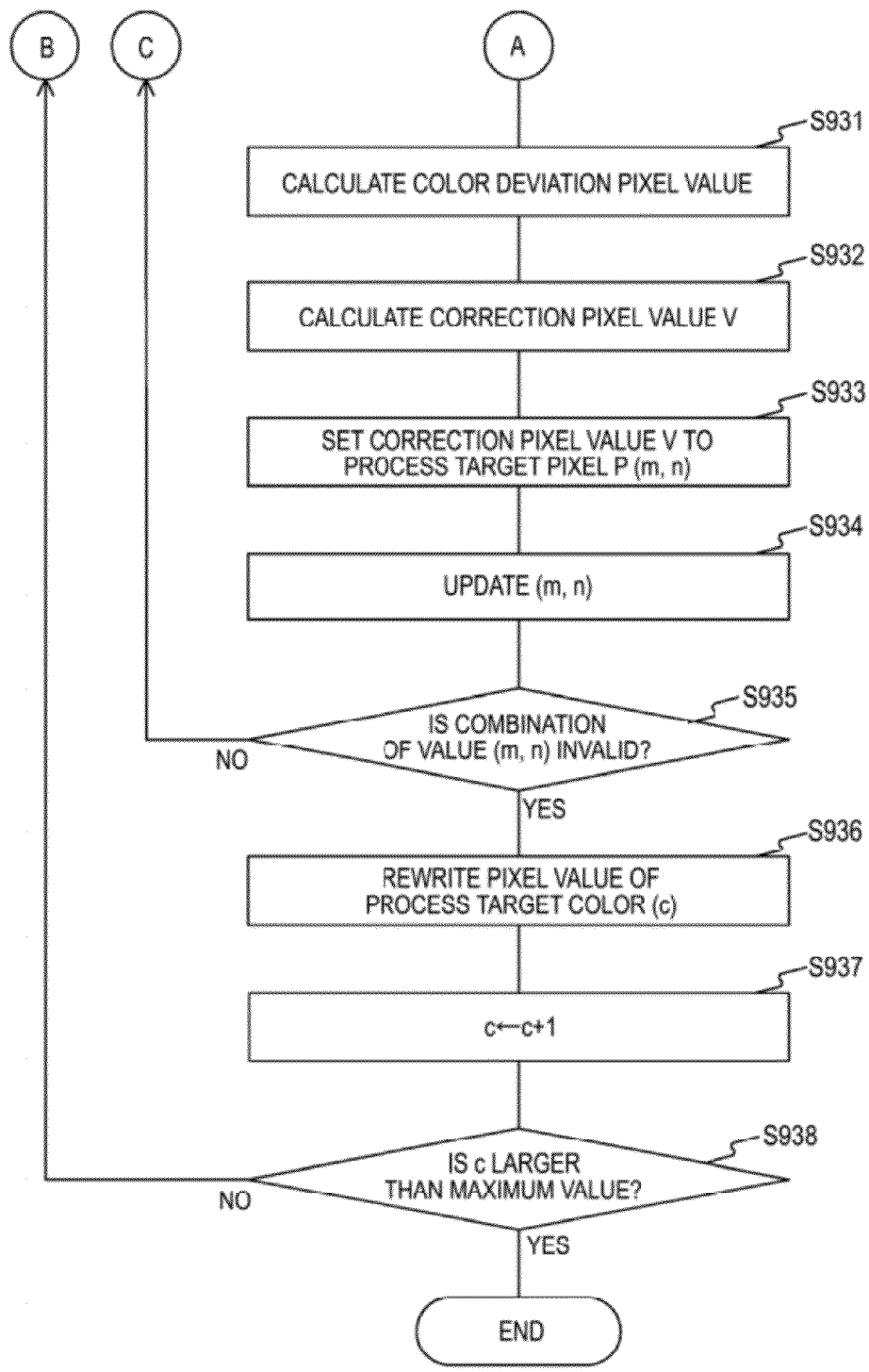
FIG. 17 is a diagram illustrating an example of process sequence performed by the concentric aberration correcting unit.

Flowcharts shown in FIGS. 16 and 17 show an example of a process sequence performed by the concentric aberration correcting unit 210 shown in FIG. 14. The processes as the steps shown in FIG. 16 and FIG. 17 are appropriately performed by any one of units constituting the concentric aberration correcting unit 210. For example, the CPU 111 or a DSP (Digital Signal Processor) executes a program to realize the processes as the steps shown in FIG. 16 and FIG. 17. In addition, the processes may be configured by hardware.

First, the concentric aberration correction amount calculating unit 213 acquires the lens control information from the lens control unit 140 (Step S921). As described above, the lens control information is information of iris values, zoom positions, and focus positions set in the optical lens unit 120 at the current time.

Then, the concentric aberration correction amount calculating unit 213 calculates the amount of concentric aberration correction Timg2 corresponding to the lens control information acquired in Step S921 (Step S922). For example, the amount of concentric aberration correction Timg2 may be calculated as follows.

The iris value $p_i$, zoom position $p_z$, and focus position $p_f$ that are the lens control information acquired in Step S921 are the same as that acquired in Step S911 shown in FIG. 12. Accordingly, each of the iris value $p_i$, zoom position $p_z$, and focus position $p_f$ is formed of an integer portion (i) and a decimal portion (f) to predetermined places of decimals.

The concentric aberration correction amount calculating unit 213 is designated as follows when selecting arbitrary concentric aberration correction data 241 in the concentric aberration correction table 240. That is, it is designated by the combination of the iris value i, zoom position z, focus position f, image height value y, and process target color c based on integer. The concentric aberration correction data 241 designated above is represented by Tca2[i][z][f][y][c].

The concentric aberration correction amount calculating unit 213 accesses all the concentric aberration correction data 241 designated by Tca2[$p_{ii}$][$p_{zi}$][$p_{fi}$][y][c], and performs reading from the concentric aberration correction table 240. In this case, as for each of the image height value y and the process target color c, all the values stored in the concentric aberration correction table 240 are a target. Accordingly, the number of concentric aberration correction data 241 designated by Tca2[$p_{ii}$][$p_{zi}$][$p_{fi}$][y][c] is represented by (ny×nc).

In addition, the concentric aberration correction amount calculating unit 213 accesses all the concentric aberration correction data 241 designated by Tca2[$p_{ii}$+1][$p_{zi}$+1][$p_{fi}$+1][y][c], and performs reading from the concentric aberration correction table 240. The number of concentric aberration correction data 241 designated by Tca2[$p_{ii}$+1][$p_{zi}$+1][$p_{fi}$+1][y][c] is also represented by (ny×nc).

Then, the concentric aberration correction amount calculating unit 213 calculates the amount of concentric aberration correction Timg2[y][c]. For this reason, calculation based on the following formula is performed using the concentric aberration correction data 241 represented by the Tca2[$p_{ii}$][$p_{zi}$][$p_{fi}$][y][c] and Tca2[$P_{ii}$+1][$p_{zi}$+1][$p_{fi}$+1][y][c].

$$I_{img2}[y][c] = \sum_{i=0}^{1}\sum_{j=0}^{1}\sum_{k=0}^{1} T_{ca2}[p_{ii}+i][p_{zi}+j][p_{fi}+k][y][c] \cdot \{(1-i)+(-1)^{i+1} \cdot p_{if}\} \cdot$$

$$\{(1-j)+(-1)^{j+1} \cdot p_{zf}\} \cdot \{(1-k)+(-1)^{k+1} \cdot p_{ff}\}$$

A center pixel coordinates C(h0, w0) on the image formed by pixel arrangement of the correction target image signal is calculated by the image height calculating unit 212 (Step S923). The center pixel coordinate C is used to calculate an image height yr for each process target pixel P(m, n) to be described later. The center pixel coordinate C(h0, w0) is a position of the optical axis which is obtainable corresponding to the concentric aberration component from the image. This corresponds to the position of the lens optical axis on the image forming face of the imaging device, for example, in an ideal state where the installation error is not considered. As the pixel arrangement in this case, for example, a Bayer arrangement is generally known.

As the simplest example as the calculation process of the center pixel coordinate C(h0, w0), C(h/4, w/4) can be acquired where a vertical size of the screen formed by all colors constituting the correction target image signal and the horizontal size thereof is w.

However, in practice, it may be set to a position where the lens optical axis is moved on the image forming face of the imaging device by conditions in design in the optical lens unit 120. In this case, it is preferable to calculate the center pixel coordinate C(h0, w0) to which the amount of deviation of the lens optical axis is reflected. Since the position of the lens optical axis in this case is fixed, for example, the value of the center pixel coordinate C(h0, w0) may be stored and read, instead of performing the calculation process of Step S923. When the anti-vibration function is provided as in the video camera 100 of the embodiment of the present disclosure, it is preferable to dynamically calculate the value of the center pixel coordinate C(h0, w0), according to the position of the lens optical axis with respect to the image changed according to the anti-vibration control. Accordingly, it is possible to perform the correction of chromatic aberration of magnification with higher precision, irrespective of the position change in the lens optical axis caused by the anti-vibration control.

Subsequently, the image height calculating unit 212 calculates a distance corresponding to a 100% image height (100% image height correspondence distance) r10 (Step S924). A 100% image height indicates an image height farthest away from the center on the screen formed by the pixel arrangement of the correction target image signal. Accordingly, the 100% image height correspondence distance r10 is, for example, the direct distance from an intersection of diagonal lines of the screen based on a rectangle to one top. However, herein, the 100% image height correspondence distance r10 is a distance in the color screen formed of color pixels of only R or B that is the later process target. For example, when the pixel arrangement is the Bayer arrangement, the color screen (R screen) formed of only the R pixels has a height of h/2 and a width of w/2. Similarly, the color screen (B screen) formed of only the B pixels also has a height of h/2 and a width of w/2. Accordingly, both the 100% image height correspondence distance of the R screen and the B screen is represented by the following formula. In the following formula, "sqrt" represents the calculation of a square root.

$$\mathrm{sqrt}((h/4)^2+(w/4)^2))$$

Subsequently, for example, the color pixel selecting unit 211 substitutes the variable c representing the process target color with "0" (Step S925). In the embodiment of the present disclosure, the process target color corresponding to the variable c of "0" is R (red), and the process target color corresponding to "1" is B (blue).

Then, the color pixel selecting unit 211 extracts a subsample image of the process target color indicated by the current variable c from the correction target image signal (Step S926). That is, the image signal formed of only the pixels of the process target color indicated by the variable c is extracted.

Then, the color pixel selecting unit 211 sets an initial value in a group of the variable (m, n) representing the coordinate of the process target pixel P of the pixels constituting the subsample image of the process target color (Step S927). The data representing the coordinate (m, n) of the process target pixel P is transmitted to, for example, the image height calculating unit 212.

For example, the image height calculating unit 212 calculates a radial distance r of the process target pixel coordinate P(m, n) received from the color pixel selecting unit 211 (Step S928), and converts the calculated radial distance r into the image height value yr (Step S929). First, for example, the radial distance r may be acquired by the following formula using the coordinate values of the process target pixel P(m, n) and the center pixel coordinate (h0, w0) calculated in Step S923.

$$r=\mathrm{sqrt}((m-h0)^2+(n-w0)^2)$$

Then, the image height value $y_r$ corresponding to the process target pixel P(m, n) may be acquired by the following formula. In the following formula, the image height value corresponding to the 100% image height is ny−1. The r10 represents the 100% image height correspondence distance calculated in Step S924.

$$y_r=(r/r10)\times(ny-1)$$

The image height value $y_r$ calculated by the above formula is formed of an integer portion (i) and a decimal portion (f), and thus the image height value $y_r$ is represented by the following formula.

$$y_r=y_{ri}+y_{rf}$$

Subsequently, a process of calculating an amount of concentric aberration correction M corresponding to the process target pixel P is performed by the concentric aberration correction amount calculating unit 213 (Step S930). For this reason, first, the concentric aberration correction amount calculating unit 213 receives an input of the process target color information representing the current variable c from the color pixel selecting unit 211. The image height value $y_r$ calculated in Step S929 is input from the image height calculating unit 212. The concentric aberration correction amount calculating unit 213 selects the following two amounts of correction from the amount of concentric aberration correction Timg2 calculated in Step S922 on the basis of the current variable c and the integer portion $y_{ri}$ of the image height value $y_r$. That is, the amount of correction designated by $\mathrm{Timg2}[y_{ri}][c]$ and the amount of correction designated by $\mathrm{Timg2}[y_{ri}+1][c]$ are selected.

Then, the concentric aberration correction amount calculating unit 213 calculates the amount of concentric aberration correction M with respect to the process target pixel P using the amounts of concentric aberration correction $\mathrm{Timg2}[y_{ri}][c]$ and $\mathrm{Timg2}[y_{ri}+1][c]$ and the image height $y_r$. The amount of concentric aberration correction M may be also acquired by, for example, calculation for linear interpolation based on the following formula. The amount of concentric aberration correction M is correction magnification.

$$M = \sum_{i=0}^{1} T_{img2}[y_{ri}+i][c] \cdot \{(1-i)+(-1)^{i+1} \cdot y_{rf}\}$$

Then, the color deviation pixel value calculating unit 214 calculates a pixel value of the color deviation pixel corresponding to the concentric aberration (Step S931). The pixel value of the color deviation pixel is calculated, and first, the color deviation pixel value calculating unit 214 calculates the coordinate of the color deviation pixel. For this reason, for example, the color deviation pixel value calculating unit 214 receives an input of the amount of concentric aberration correction M calculated in Step S930. The color deviation pixel value calculating unit 214 acquires the coordinate value of a color deviation pixel pd (m1, n1) by the following formulas.

$$m1=(m-h0) \times M+h0$$

$$n1=(n-w0) \times M+w0$$

Then, the color deviation pixel value calculating unit 214 calculates the pixel value of the color deviation pixel Pd (m1, n1), and outputs the pixel value as a correction pixel value V (Step S932). Each coordinate value of the color deviation pixel Pd (m1, n1) includes a decimal portion as can be known from the amount of concentric aberration correction M included in the above formulas including the decimal portion. The pixel value correcting unit 215 calculates the correction pixel value V that is the pixel value of the color deviation pixel Pd (m1, n1) by the interpolation process using a pixel value of a predetermined pixel positioned in the vicinity of the color deviation pixel Pd (m1, n1). The pixel value correcting unit 215 sets the calculated correction pixel value V as the pixel value of the current process target pixel P (m, n) (Step S933).

When the process up to here is performed, for example, the color pixel selecting unit 211 performs an update about the combination value of the variable (m, n) representing the process target pixel P (Step S934). Accordingly, the process target pixel P is changed. Then, the color pixel selecting unit 211 determines whether or not the current variable (m, n) is a combination of invalid values (Step S935). For example, when the non-processed pixel remains in the process target color corresponding to the current variable c, the variable (m, n) after the update in Step S935 has combination of valid values corresponding to any of the non-processed pixels. On the other hand, the variable (m, n) updated in Step S934 after completion of the process of all the color pixels in the current process target color is a combination of invalid values which does not correspond to any color pixel in the current process target color. In Step S935, when it is determined that it is not a combination of the invalid values, the non-processed color pixel remains and the process returns to Step S928. Meanwhile, in Step S935, when it is determined that it is a combination of the invalid values, the following process is performed by the pixel value correcting unit 215.

That is, in Step S935, when it is determined that it is the combination of the invalid values, it is a state where the correction pixel value V is set for all the pixels in the current process target color. The pixel value correcting unit 215 receives an input of the sub-sample image based on any process target color of R and B represented by the current variable c from the color pixel selecting unit 211. The pixel values of the pixels constituting the sub-sample image are rewritten by the correction pixel value V set for the pixels (Step S936). The chromatic aberration of magnification of the signal of the sub-sample image obtained by rewriting the pixel values as described above is corrected, and is the signal component corresponding to R or B in the aberration correction image signal.

When the process of Step S936 is completed, for example, the color pixel selecting unit 211 increases the variable c (Step S937). When the variable c is changed from "0" to "1" by this process, the process target color is changed, for example, from R to B, the process target color information output by the color pixel selecting unit 211 is also changed from R to a value representing B.

Then, the color pixel selecting unit 211 determines whether or not the current variable c is larger than the maximum value (Step S938). When it is determined that the variable c is smaller than the maximum value, the process returns to Step S926. Accordingly, the process is transferred from the correction of chromatic aberration of magnification on the R light as a target to the process of correction of chromatic aberration of magnification, for example, on the B light as a process target color. As a result of the performed process of Step S938, again, when it is determined that the variable c is larger than the maximum value in Step S938, it means that the correction of chromatic aberration of magnification corresponding to, for example, a 1-frame image is corrected. Accordingly, the color signals corresponding to R and B obtained by rewriting the pixel value, and the color signal of G output as is from the color pixel selecting unit 211 are output from the concentric aberration correcting unit 210. The color signals of R, B, and G are aberration correction image signals. That is, the color signal of G as reference, and the color signals of R and B in which the color deviation caused by the concentric aberration component occurring on the color signal of G is corrected, are output. In the first embodiment of the present disclosure, the color deviation caused by the uniform aberration component is corrected by driving the anti-vibration lens group 132.

As described above, in the first embodiment of the present disclosure, the correction of the uniform aberration component is performed by the lens control, and the correction of the concentric aberration is performed by the image process, thereby correcting the chromatic aberration of magnification.

In the first embodiment, the concentric aberration correction table 240 and the uniform aberration correction table 620 are generated and stored. As shown in FIG. 15, the concentric aberration correction table 240 is a 5-dimensional table, but the parameter related to the screen position is only the image height y. The uniform aberration component does not depend on the pixel position. Accordingly, as shown in FIG. 8, it is a 4-dimensional table formed of the parameters of the optical system and the combination of the horizontal components and the vertical components of aberration. On the other hand, for example, in the related art, the correction data in which the correction values for each combination of parameters of the optical system are corrected to be provided further for each pixel is used. In comparison with such correction data, in the embodiment of the present disclosure, the data size is drastically reduced even when the concentric aberration correction table 240 and the uniform aberration correction table 620 are joined together. In addition, it is possible to further reduce the amount of calculation in the correction process according to the reduction of the data size.

In the uniform aberration correction table 620, the measurement is performed for each product to cope with, for example, individual variations in the lens, but the combination pattern of the limited number of representative iris values i, zoom positions z, and focus positions f at the time of measurement is used. For example, in measurement, in the case of the chart image 400 shown in FIG. 10A, it is satisfactory only to measure the amount of color deviation of the screen center or the part of the lines L1 and L2. Further, in the amount of works to such an extent, the increase in amount of works that is a factor of interference with mass productivity may be little even when the measurement is performed on individual products.

A configuration of correcting the uniform aberration by the image signal process is also possible, as well as the concentric aberration. However, the correction of aberration based on the image signal process may deteriorate image quality. In the embodiment of the present disclosure, by shifting the lens to perform the correction of uniform aberration, only the concentric aberration is corrected by the image signal process. Accordingly, in the embodiment of the present disclosure, the deterioration in image quality is suppressed as compared with the case of correcting both the concentric aberration and the uniform aberration by the image signal process.

In the description, the uniform aberration correction data 621 representing the amount of shift of the anti-vibration lens group 132 for correcting the uniform aberration is stored in the uniform aberration correction table 620, but the uniform aberration correction data 621 may be acquired using the amount of uniform aberration as described with reference to FIG. 9. Although not shown, it is conceivable to store data representing the amount of uniform aberration, instead of the uniform aberration correction data 621, as a structure of the uniform aberration correction table 620. In this case, first, the amount of uniform aberration corresponding to the iris value i, zoom position z, and focus position f represented by the lens control information is acquired. Then, the amount of shift is acquired from the acquired amount of uniform aberration. For example, the amount of shift corresponding to the amount of uniform aberration may be acquired by multiplying the amount of uniform aberration by a coefficient that is a reciprocal number of uniform aberration sensitivity.

2. Second Embodiment

Example of Configuration of Uniform Aberration Correcting Unit

Subsequently, a second embodiment of the present disclosure will be described. In the concentric aberration correction in the first embodiment, the amount of correction is acquired using the previously stored concentric aberration correction table 240 to perform the correction. On the other hand, in the second embodiment, in the concentric aberration correction, the amount of correction is acquired on the basis of the image signal obtainable by capturing an image and the correction is performed. The uniform aberration correction is the same as that of the first embodiment. That is, the uniform aberration correction is performed by driving the anti-vibration lens group 132 by on the basis of the amount of aberration correction shift SFT2 acquired using the uniform aberration correction table 620.

Figure 18:
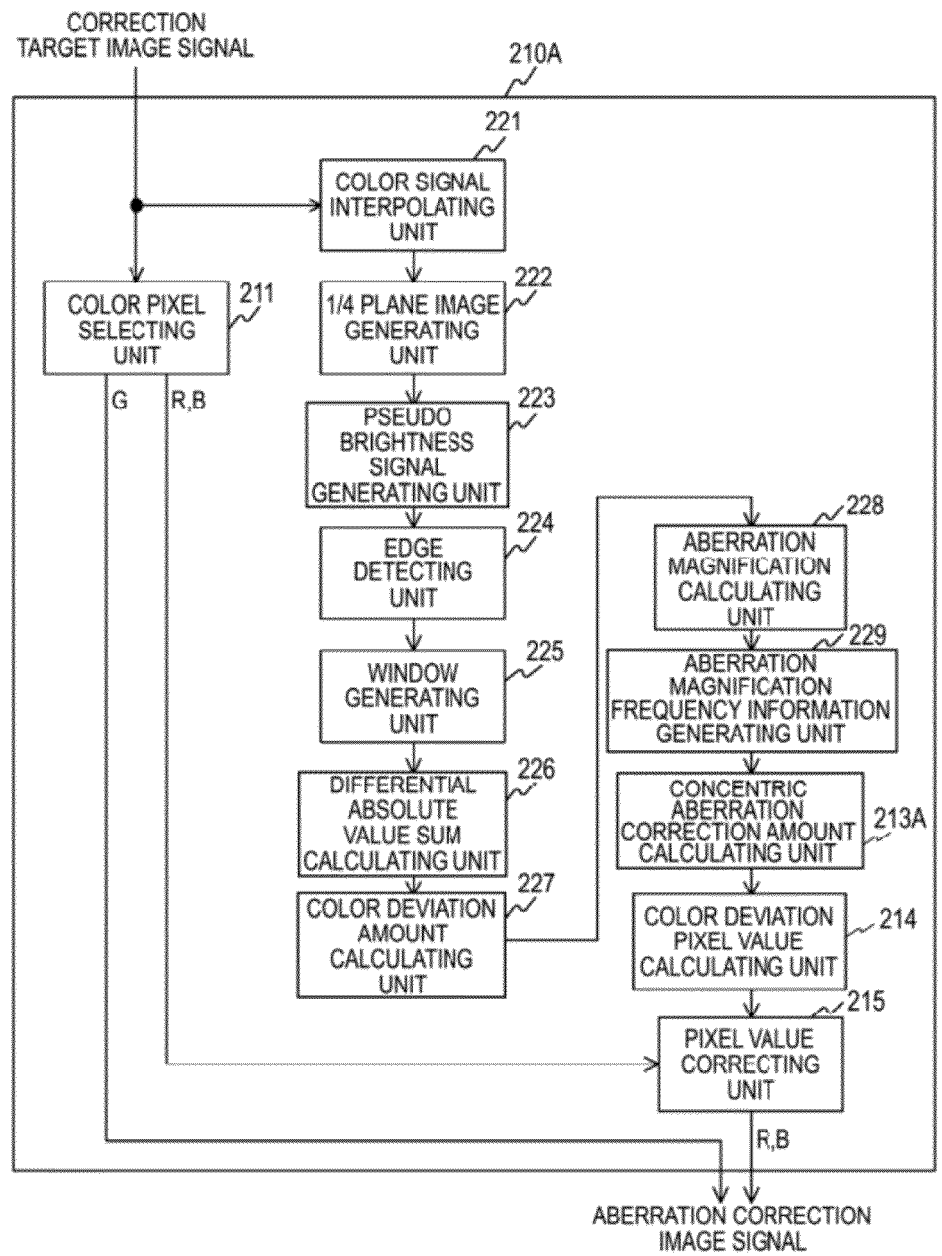
FIG. 18 is a diagram illustrating an example of a configuration of a concentric aberration correcting unit of a second embodiment of the present disclosure.

FIG. 18 shows an example of a configuration of a concentric aberration correcting unit 210A of the second embodiment. The concentric aberration correcting unit 210A is provided, for example, instead of the concentric aberration correcting unit 210 shown in FIG. 13. In FIG. 18, the same reference numerals and signs are given to the same parts as the FIG. 14, and the description there is omitted.

The concentric aberration correcting unit 210A shown in FIG. 18 is provided with a color pixel selecting unit 211, a color signal interpolating unit 221, a ¼ plane image generating unit 222, a pseudo brightness signal generating unit 223, an edge detecting unit 224, a window generating unit 225, a differential absolute value sum calculating unit 226, a color deviation amount calculating unit 227, an aberration magnification calculating unit 228, an aberration magnification frequency information generating unit 229, a concentric aberration correction amount calculating unit 213A, a color deviation pixel value calculating unit 214, and a pixel value correcting unit 215.

In the following description of FIG. 18, as an example, the correction is performed on the R signal as a process target. The concentric aberration correcting unit 210A performs a correction process of chromatic aberration of magnification on the R signal to be described later as a process target, and performs the correction process on the B signal.

The color signal interpolating unit 221 is a unit of receiving an input of the correction target image signal and performing a process of interpolating a G signal of a position for each R pixel of the correction target image signal. As the interpolation process, a bilinear interpolation method may be employed as will be described later.

The ¼ plane image generating unit 222 is a unit generating a ¼ plane image. In the Bayer arrangement, the G pixels of the pixels constituting the whole image area occupies by ½, and each of the R pixels and the B pixels occupy by ¼. After performing the process of generating the interpolation G signal corresponding to the R pixel position, it is possible to obtain the interpolation G signal based on the ¼ number of interpolation G pixels with respect to the number of pixels constituting the whole image area. The ¼ plane image generating unit 222 generates an image signal formed of only the interpolation G pixels. This becomes the ¼ plane image corresponding to the interpolation G signal. Similarly, a ¼ plane image corresponding to the R signal formed of only the R pixels is generated.

The pseudo brightness signal generating unit 223 is a unit generating a pseudo brightness signal using the two ¼ plane images generated above. For example, when the ¼ plane image corresponding to the interpolation G signal and the ¼ plane image corresponding to the R signal are used, a process of calculating the average value of the pixel value of the interpolation G pixel and the pixel value of the R pixel at the same position is performed at the whole pixel positions in the ¼ plane image. It is possible to obtain the pseudo brightness signal by the calculated average value for each pixel position. The generation of the pseudo brightness signal is performed for the next edge detecting process. It is preferable to use the brightness signal excluding the color information in the edge detection, but the RAW image data is formed of only the color signals of R, G, and B and does not include the brightness signal component. For this reason, the pseudo brightness signal is generated as described above.

The edge detecting unit 224 is a unit receiving an input of the pseudo brightness signal and detecting the edge generated according to the concentric aberration. It is known that the color deviation caused by the chromatic aberration of magnification significantly occurs at the edge part of the image. That is, in the second embodiment of the present disclosure, the concentric aberration is detected by detecting the edge of the captured image, and the edge detecting unit 224 performs the edge detection corresponding to the detection of the concentric aberration component, for the concentric aberration correction. The direction of the edge detected by the edge detecting unit 224 is taken along the radial direction from the screen center.

In the case of the video camera 100 of the second embodiment, the uniform aberration has been already corrected by the lens control, and thus the center of the concentric aberration in the captured image coincides with the screen center. Accordingly, when detecting the edge, as described above, it is preferable to detect the radial direction based on the screen center as reference, and it is possible to stably obtain the detection result since the uniform aberration is corrected. At the time of the edge detection, it is detects whether the detected edge is the rising edge or the falling edge as the kind of change directions of the pixel values. An example of a method of the edge detecting process will be described later.

The window generating unit 225 is a unit set a window for the interpolation G signal and the R signal considering the position of the detected edge detected by the edge detecting unit 224 as the center. Such a window is, for example, a partial image area formed by a predetermined number of horizontal pixels and vertical pixels with respect to the ¼ plane image generated by the ¼ plane image generating unit 222. The window of the interpolation G signal and the window of the R signal may have the same size.

The differential absolute value sum calculating unit 226 is a unit calculating a differential absolute value sum for each shifted position while shifting the positional relation of two windows set as described above. As for the shift direction of the window, the window is shifted in the same direction as the direction of the edge that is a source of the window generation. The direction of the edge detected corresponding to the concentric aberration is the radial direction. Accordingly, in this case, the window is shifted along the radial direction based on the screen center as reference. The window of the interpolation G signal is fixed and the window of the R signal is moved, to acquire the amount of color deviation of the R light with respect to the G light using the G signal as a reference signal. The amount of shift is an example, but may be in the range of about 5 pixels along the up and down direction or the left and right direction.

A differential absolute value of the interpolation G pixel and the R pixel positioned at the same coordinate for the shifted position is acquired, and all the differential absolute values acquired for each coordinate are added. Accordingly, it is possible to obtain the differential absolute sum corresponding to one edge. The differential absolute value sum is referred to as SAD (Sum of Absolute Difference). Sum of squared difference (SSD) may be acquired. The window setting performed by the window generating unit 225, and the calculation of the differential absolute value sum obtained by the differential absolute value sum calculating unit 226 are performed for each of the detected edges.

The color deviation amount calculating unit 227 is a unit calculating the amount of color deviation corresponding to each image part of the detected edge using the calculated differential absolute value sum. The calculated amount of color deviation is the amount of color deviation of the R signal with respect to the G signal as a reference signal. In the embodiment of the present disclosure, the amount of color deviation based on a sub-pixel unit smaller than a pixel unit is calculated by performing, for example, the interpolation calculation. The color deviation amount calculating unit 227 classifies the rising edge and the falling edge to calculate the amount of color deviation of the R pixel with respect to the interpolation G pixel in the radial direction.

The aberration magnification calculating unit 228 is a unit converting the amount of color deviation corresponding to the concentric aberration component calculated by the color deviation amount calculating unit 227 into the aberration magnification. The aberration magnification is a magnification value in a state where the calculated amount of color deviation of the R signal can be obtained after a state with no color deviation with respect to the G interpolation signal is 1 magnification. For example, the aberration magnification may be calculated by a ratio of the image height corresponding to the G pixel that is reference and the image height corresponding to the color deviation determined according to the calculated amount of color deviation.

The aberration magnification frequency information generating unit 229 is a unit generating a histogram with respect to the plurality of aberration magnification calculated corresponding to each edge detected for the R signal by the aberration magnification calculating unit 228. That is, the aberration magnification frequency information generating unit 229 generates information (aberration magnification frequency information) representing distribution about appearance frequency of the aberration magnification. The aberration magnification is calculated corresponding to each detected edge, and thus corresponds to any of the rising edge and the falling edge. The histogram of the aberration magnification is generated for each of the aberration magnification corresponding to the rising edge and the aberration magnification corresponding to the falling edge.

The concentric aberration correction amount calculating unit 213A is a unit calculating the amount of concentric aberration correction on the basis of the aberration magnification frequency information generated as described above. For this reason, first, the aberration magnification value employed in actual correction is calculated on the basis of the aberration magnification frequency information. For example, it is preferable that the calculated aberration magnification value is considered as the amount of concentric aberration correction.

The color deviation pixel value calculating unit 214 calculates the pixel value of the color deviation pixel of the R signal based on the concentric aberration component, for each R pixel, according to the input of the amount of concentric aberration correction. The pixel value correcting unit 215 performs a process rewriting the R pixels constituting the R signal into the pixel value of the color deviation pixel calculated corresponding to each of the R pixels. The rewriting of the pixel values corresponds to the correction of concentric aberration.

The correction corresponding to the concentric aberration component for the R signal component is performed by the completion of the rewriting of the pixel values. The units of the concentric aberration correcting unit 210A also performs the processes described above on the B signal, and outputs the B signal after the concentric aberration correction. The aberration correction image signal including the R signal and B signal after the concentric aberration correction output as described above is a signal in which the concentric aberration is corrected. The correction of the chromatic aberration of magnification is performed together with the uniform aberration correction which is normally performed by the lens control.

[Example of Process Sequence of Concentric Aberration Correction Unit]

Figure 19:
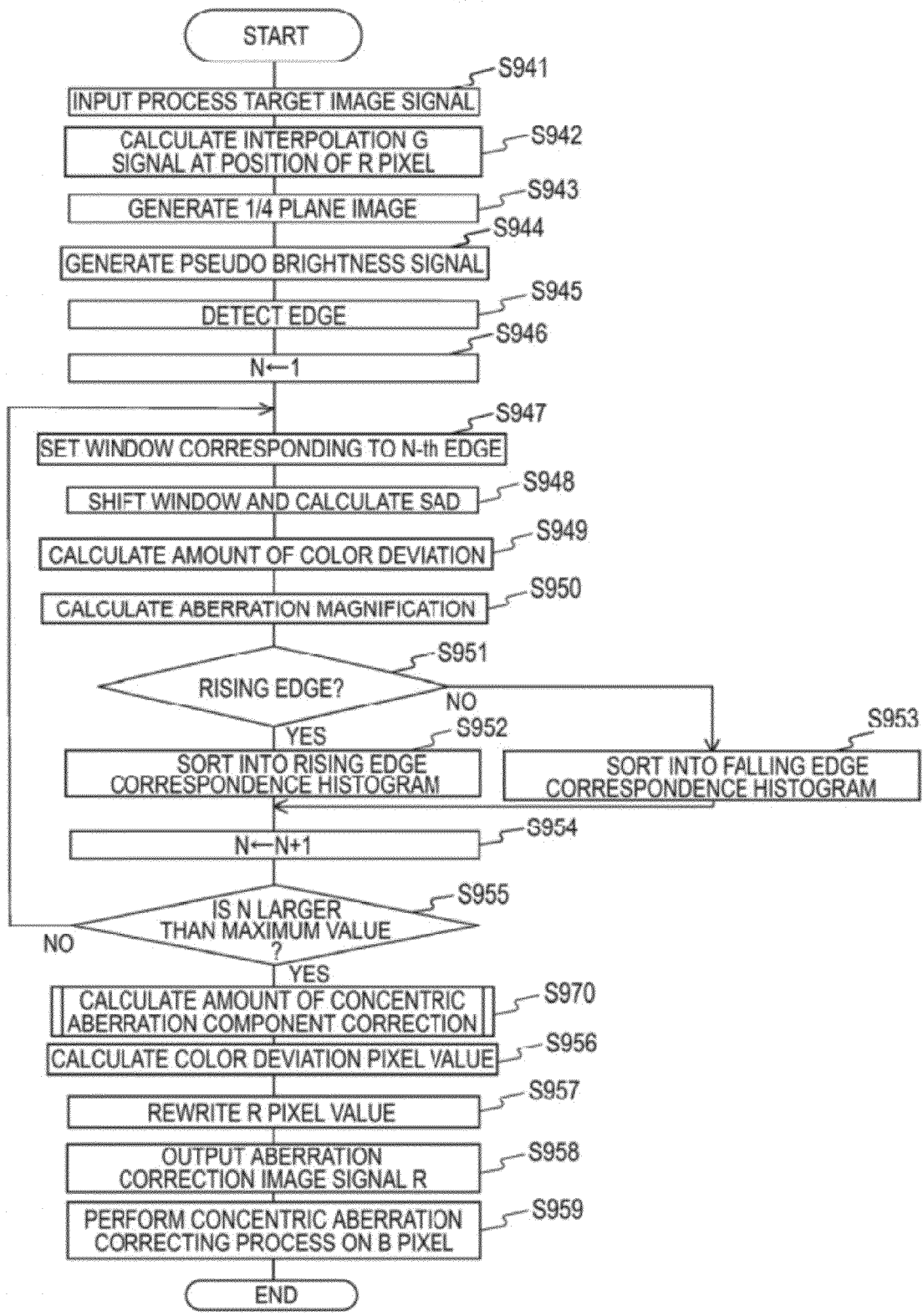
FIG. 19 is a diagram illustrating an example of process sequence performed by the concentric aberration correcting unit.

FIG. 19 shows an example of process sequence for the correction of the chromatic aberration of magnification performed by the concentric aberration correcting unit 210A. The processes of the steps shown in FIG. 19 are appropriately performed by the units of the concentric aberration correcting unit 210A. For example, the CPU 111 or the DSP executes a program to realize the processes as the steps shown in FIG. 19. In addition, the processes may be configured by hardware. In the processes shown in FIG. 19, first, a correction process is performed on the R signal of the correction target image signal, and subsequently, a correction process is performed on the B signal of the correction target image signal.

In FIG. 19, first, the color signal interpolating unit 221 receives an input of the process target pixel signal of, for example, a 1-frame image (Step S941), and generates the interpolation G signal corresponding to the position of the R pixel of the input process target pixel signal (Step S942).

Figure 21:
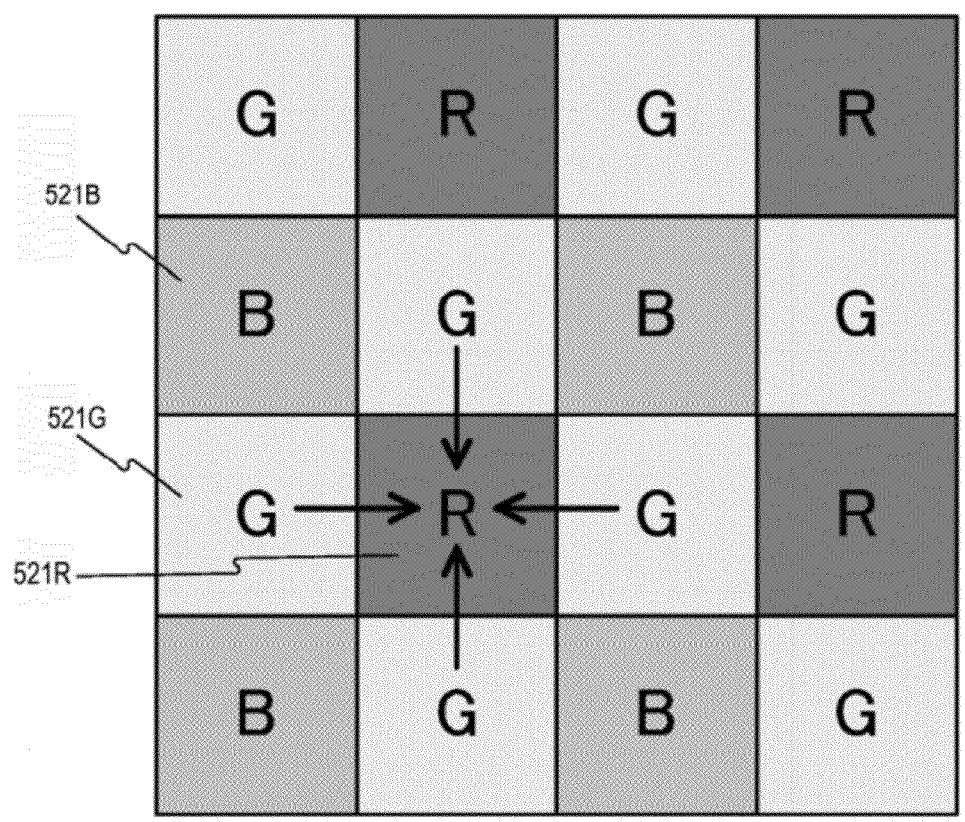
FIG. 21 is a diagram illustrating an example of an interpolation G signal calculating process performed by a color signal interpolating unit of the second embodiment of the present disclosure.

A specific example of the interpolation G signal generating process in Step S942 will be described with reference to FIG. 21. FIG. 21 schematically shows the correction target image signal input by the color signal interpolating unit 221, corresponding to a pixel arrangement pattern of R, G, and B of the imaging device. The pixel arrangement pattern is based on the Bayer arrangement. In the Bayer arrangement, an R pixels 521R, a G pixels 521G, and a B pixels 521B that are color pixels corresponding to colors of R, G, and B are arranged in a predetermined arrangement rule by a pixel number ratio of 1:2:1. The interpolation G signal corresponding to the position of the R pixel is generated, as shown in FIG. 21, an addition average of four G pixels 521G adjacent to the up, down, left, and right sides of one R pixel 521R is calculated. As for the interpolation G signal, the addition average value is a pixel value of the G pixel corresponding to the position of one R pixel. That is, in the embodiment, the interpolation G signal is generated by the bilinear interpolation. The generation of the interpolation G signal based on the interpolation process is performed for each R pixel position in the whole image area. Even when the G signal corresponding to the position of the B pixel 521B is interpolated, similarly, the process of acquiring the G interpolation pixel value by the addition average of the G pixel values of four G pixels 521G adjacent to up, down, left, and right sides of one B pixel 521B is performed for each B pixel in the whole image area.

Then, the ¼ plane image generating unit 222 receives an input of the R signal of the correction target image signal generated by the color signal interpolating unit 221 and an input of the interpolation G signal generated by the color signal interpolating unit 221. The ¼ plane image generating unit 222 generates a ¼ plane image formed of the input R signal and a ¼ plane image formed of the interpolation G signal (Step S943).

Then, the pseudo brightness signal generating unit 223 generates a pseudo brightness signal from the ¼ plane image formed of the R signal and the ¼ plane image formed of the interpolation G signal (Step S944). As for the pseudo brightness signal, the calculation of the following formula is performed, in which a pixel value of one R pixel of the ¼ plane image formed of the R signal is Vr, and a pixel value of the interpolation G pixel at the same position as the R pixel in the ¼ plane image formed of the interpolation G signal is Vg, for example, as previously described.

$$(Vr+Vg)/2$$

The above formula is to calculate the average value of the pixel value Vr of the R pixel and the pixel value Vg of the interpolation G pixel. The average value calculated as described above represents a brightness value of the pixel position. The calculation of the brightness value is performed on all the pixels constituting the ¼ plane image. The signal formed of the brightness value obtainable as described above is a pseudo brightness signal.

The pseudo brightness signal generated in Step S944 is supplied to the edge detecting unit 224. The edge detecting unit 224 performs an edge detecting process corresponding to the concentric aberration on the supplied pseudo brightness signal (Step S945).

Figure 22:
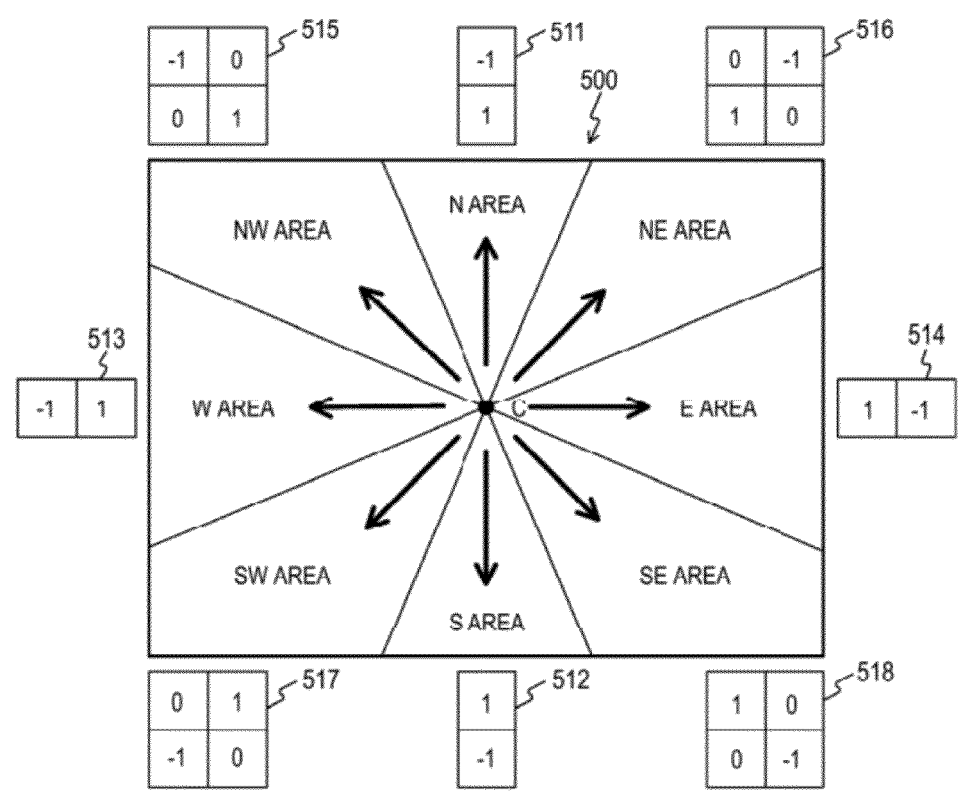
FIG. 22 is a diagram illustrating an example of an edge detecting process performed by an edge detecting unit of the second embodiment of the present disclosure.

An example of a method of edge detection corresponding to the concentric aberration component, which is performed by the edge detecting unit 224, will be described with reference to FIG. 22. FIG. 22 shows an image face 500 formed by the pseudo brightness signal. The edge detecting unit 224 divides the image face 500 into eight areas of an N area, an NE area, an E area, an SE area, an S area, an SW area, a W area, and an NW area by division lines taken along the radial direction from the base point of the coordinate C of the pixel at the center position. Further, the edge in the radial direction (image height direction) is detected for each area. For this reason, it is preferable to set kernels 511, 516, 514, 518, 512, 517, 513, and 515 corresponding to N areas, NE area, E area, SE area, S area, SW area, W area, and NW area of the eight, respectively. A coefficient pattern of each kernel is to detect the edge in the radial direction from the image center C.

Since the concentric aberration is aberration occurring in the image height direction, that is, the radial direction, it is possible to detect the edge using at least any one area among the eight areas. The image face may be divided into areas more than eight to detect the edge. In the embodiment of the present disclosure, the edge detection is performed, for example, in eight directions, considering that the amount of correction is calculated with high precision and the amount of calculation does not increase over the permissible range.

At the time of edge detection as Step S945, the edge detecting unit 224 detects whether the detected edge is the rising edge or the falling edge as the kind of change directions of the pixel values, for each detected edge. The rising edge is an edge changed from a low brightness state to a high brightness state according to the detection direction of the edge. The falling edge is an edge changed from the high brightness state to the low brightness state according to the detection direction of the edge.

For example, in the N area, the edge detection direction is an upper direction from the center C of the screen. When the edge is detected by the kernel 511 along the edge detection direction, an output of a filter is a positive value at the rising edge and is a negative value at the falling edge. Accordingly, it is possible to determine whether the edge is the rising edge or the falling edge, according to whether the value of the filter output at the time of detecting the edge is positive or negative. Similarly, for the areas other than the N area, the edge detecting unit 224 determines whether the edge is the rising edge or the falling edge for each detected edge. The filter for edge detection may a filter other than the filter based on the kernel shown in FIG. 22, and for example, various configurations or algorithms which have been known may be employed.

In Step S945, one or more edge is detected corresponding to, for example, each image part where the change in brightness is equal to or more than a predetermined change. The subsequent processes of Step S946 to Step S955 are processes performed corresponding to each edge detected in Step S945.

First, the window generating unit 225 substitutes a variable N corresponding to the number given to the detected edge by 1 that is an initial value (Step S946), and sets a window corresponding to the N-th edge for each of the R signal and the interpolation G signal (Step S947). That is, the window with a predetermined size in which the N-th edge detected position is the center is set for the ¼ plane image of the R signal generated in Step S943. Similarly, the window with the same size is set for the same position of the ¼ plane image of the interpolation G signal generated in Step S943.

Then, the differential absolute value sum calculating unit 226 fixes the set window of the interpolation G signal, and moves (shifts) the window of the R signal in a range of a preset movement amount. While performing the shift, a differential absolute value sum of the pixel values of the interpolation G signal and the R signal at the same position as described with reference to FIG. 14 is calculated (Step S948) The shift direction of the window of the R signal in Step S948 is the same radial direction as the detection direction of the N-th edge based on the image center C as reference.

Figure 23:
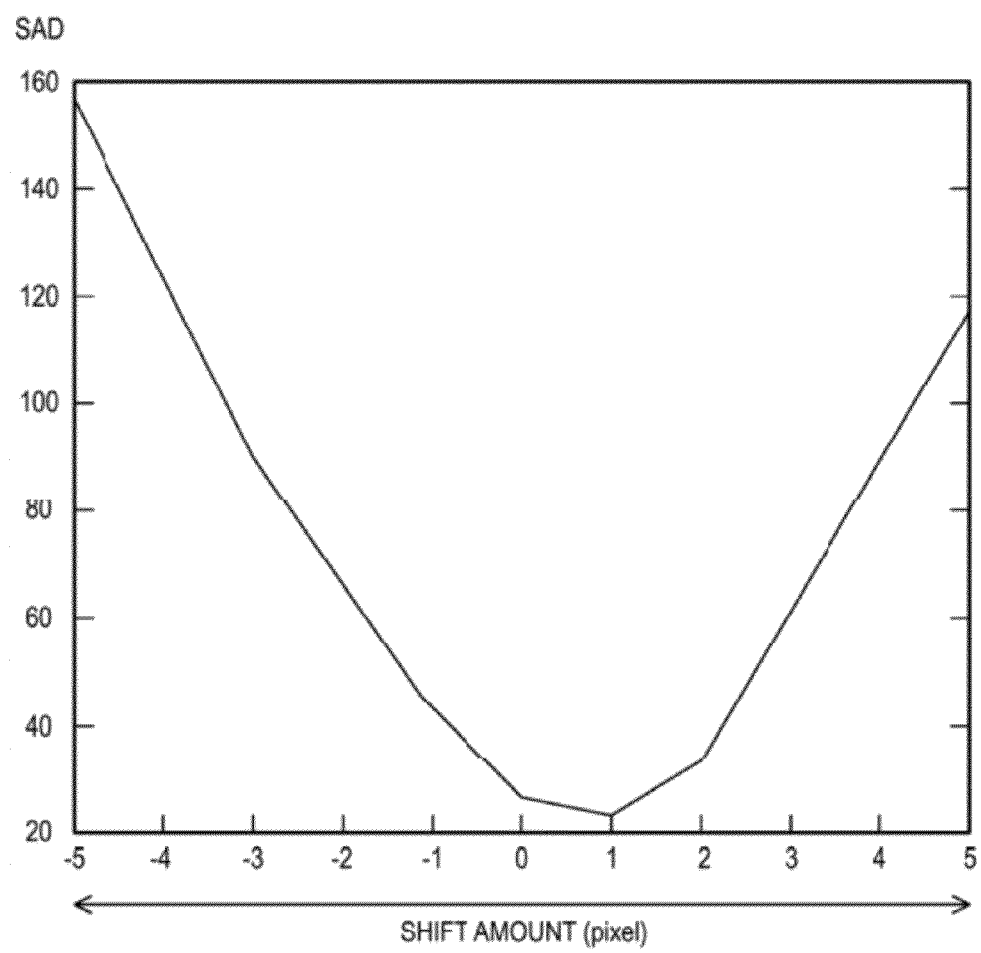
FIG. 23 is a diagram illustrating an example of a calculation result of a differential absolute value sum performed by a differential absolute value sum calculating unit of the second embodiment of the present disclosure.

FIG. 23 shows relation between the differential absolute value sum (SAD value) calculated corresponding to one edge in Step S948 and the shift amount of the window. For example, in FIG. 23, the differential absolute value sum is the minimum for the shift amount of "+1", and the differential absolute value sum increases according to the change in the value of the shift amount from "+1". The window of the interpolation G pixel and the window of the R pixel have correlation in which it gets higher as the differential absolute value sum gets smaller and gets lower as the differential absolute value sum gets larger. The shift amount corresponding to the minimum differential absolute value sum corresponds to the amount of color deviation of the R signal with respect to the interpolation G signal. In the example of FIG. 23, the differential absolute value sum has become the lowest when the window of the R pixel is shifted by the shift amount of "+1" pixel with respect to the window of the interpolation G pixel. That is, in this case, the amount of color deviation of the R signal with respect to the interpolation G signal corresponds to the shift amount of "+1" pixel.

The window setting set by the window generating unit 225, and the calculation process of the differential absolute value sum performed by the differential absolute value sum calculating unit 226 are an example of a method of a block matching process. In the embodiment of the present disclosure, the correlation between the interpolation G signal and the R signal may be calculated by, for example, the other block matching methods.

Subsequently, the color deviation amount calculating unit 227 calculates the amount of color deviation corresponding to the N-th edge from the differential absolute value sum calculated in Step S948 (Step S949). As described above, in this case, for example, the amount of color deviation is calculated even for a sub-pixel unit smaller than a pixel unit, by the interpolation calculation. The aberration magnification calculating unit 228 calculates the aberration magnification from the amount of color deviation calculated in Step S949 (Step S950).

Then, the aberration magnification frequency information generating unit 229 determines whether or not the N-th edge is detected as the rising edge (Step S951). In the case of the determination as the rising edge, the aberration magnification frequency information generating unit 229 registers the aberration magnification calculated corresponding to the N-th edge in the rising edge correspondence histogram (Step S952). That is, the histogram has a bin corresponding to each aberration magnification. In Step S952, a degree of the bin corresponding to the aberration magnification calculated corresponding to the N-th edge is increased. Meanwhile, when it is determined that it is not the rising edge in Step S951, the aberration magnification frequency information generating unit 229 registers the aberration magnification calculated corresponding to the N-th edge in the falling edge correspondence histogram (Step S953).

Then, for example, the window generating unit 225 increases the variable N (Step S954), and determines whether or not the variable N is the maximum value (Step S955). The processes of Step S947 to S954 are repeated until it is determined that the variable N is the maximum value in Step S955.

Figure 24:
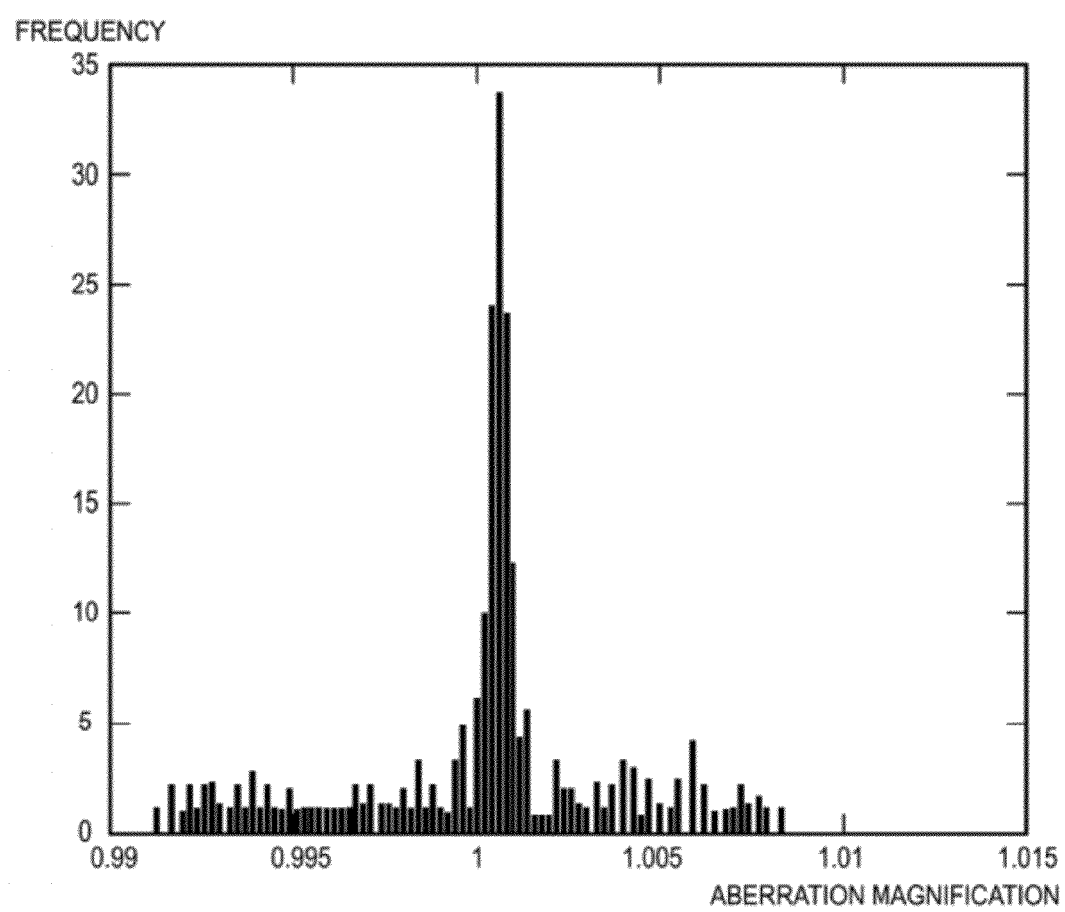
FIG. 24 is a diagram illustrating an example of a histogram generated by an aberration magnification frequency information generating unit of the second embodiment of the present disclosure.

In the step of determining that the variable N is the maximum value in Step S955, the rising edge correspondence histogram and the falling edge correspondence histogram, in which statistics of the appearance frequency of the aberration magnification of all detected rising edges and falling edges are taken, are formed. FIG. 24 shows an example of the rising edge correspondence histogram or falling edge correspondence histogram obtainable in this step. As described above, the rising edge correspondence histogram and the falling edge correspondence histogram are represented by the degree of the appearance frequency of the aberration magnification.

Then, the concentric aberration correction amount calculating unit 213A calculates the amount of concentric aberration correction (Step S970). The information of the appearance frequency of the aberration magnification corresponding to the rising edge represented by the rising edge correspondence histogram is used for the calculation of the amount of concentric aberration correction. In addition, the information of the appearance frequency of the aberration magnification corresponding to the falling edge represented by the falling edge correspondence histogram is used. An example of process sequence of the calculation of the amount of concentric aberration correction as Step S970 will be described later.

For example, the rising edge correspondence histogram and the falling edge correspondence histogram corresponding to Step S952 and Step S953 may be divisionally formed for ring-state areas in which the image height are substantially the same. Accordingly, the amount of concentric aberration correction is calculated for each ring-state area. Therefore, since the amount of concentric aberration correction corresponding to the image height is acquired, it is possible to perform the aberration correction with higher precision.

Then, the color deviation pixel value calculating unit 214 calculates the pixel value (correction pixel value) of the color deviation pixel corresponding to the amount of concentric aberration correction calculated in Step S970 is calculated for each R pixel (Step S956). The pixel value correcting unit 215 rewrites the pixel value of each R pixel by the calculated correction pixel value (Step S957). Accordingly, the R signal is a signal in which the concentric aberration correction is performed. For example, the pixel value correcting unit 215 outputs the R signal in which the concentric aberration is corrected, as the R component in the aberration correction image signal (Step S958).

Subsequently, the chromatic aberration of magnification is performed on the B signal of the process target image signal as the correction process target by the process sequence from Step S931 to Step 959 (Step S959). By performing the processes described above, the correction of chromatic aberration of magnification for, for example, one frame image is completed.

[Necessity of Edge Change Direction Detection]

As understood from the above description, in the second embodiment of the present disclosure, the change direction of the edge is detected at the time of edge detection. That is, it is detected whether the rising edge or the falling edge. The change direction of the edge is used for the calculation of the amount of concentric aberration correction. The reason for using the detection result of the change direction of the edge in the concentric aberration correction of the second embodiment is as follows.

Figure 25:
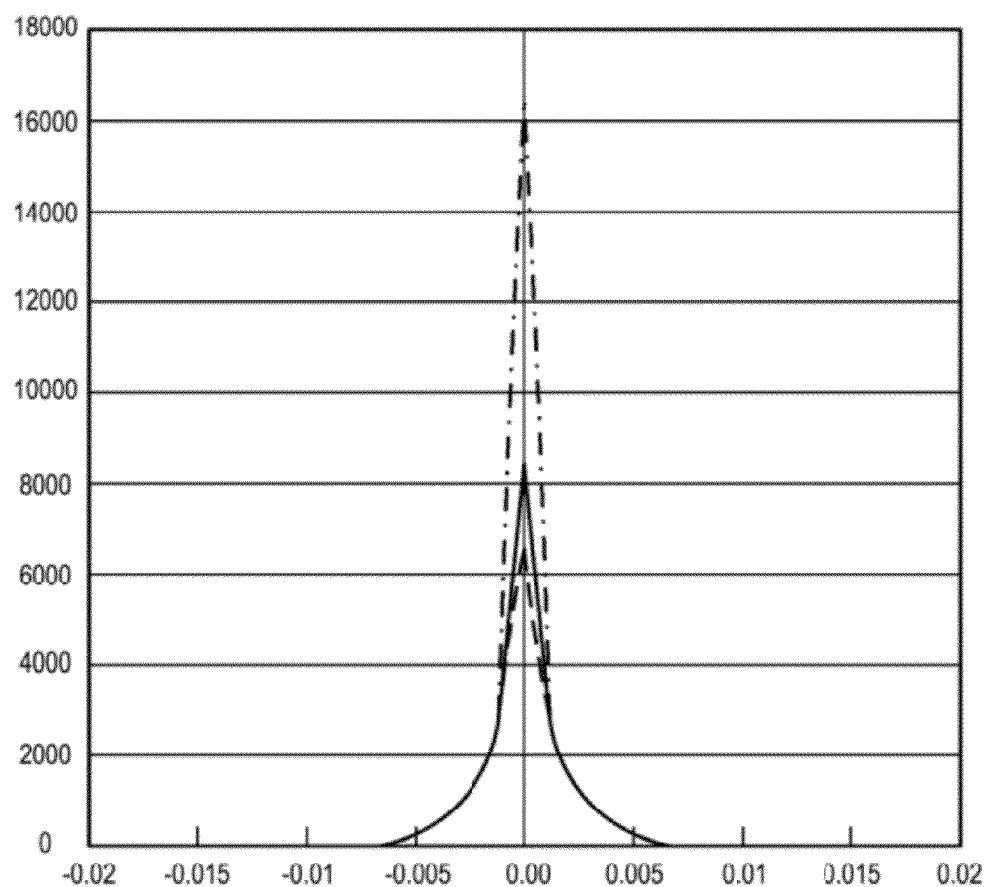
FIG. 25 is a diagram illustrating an example of line image intensity distribution on an optical axis.
Figure 26:
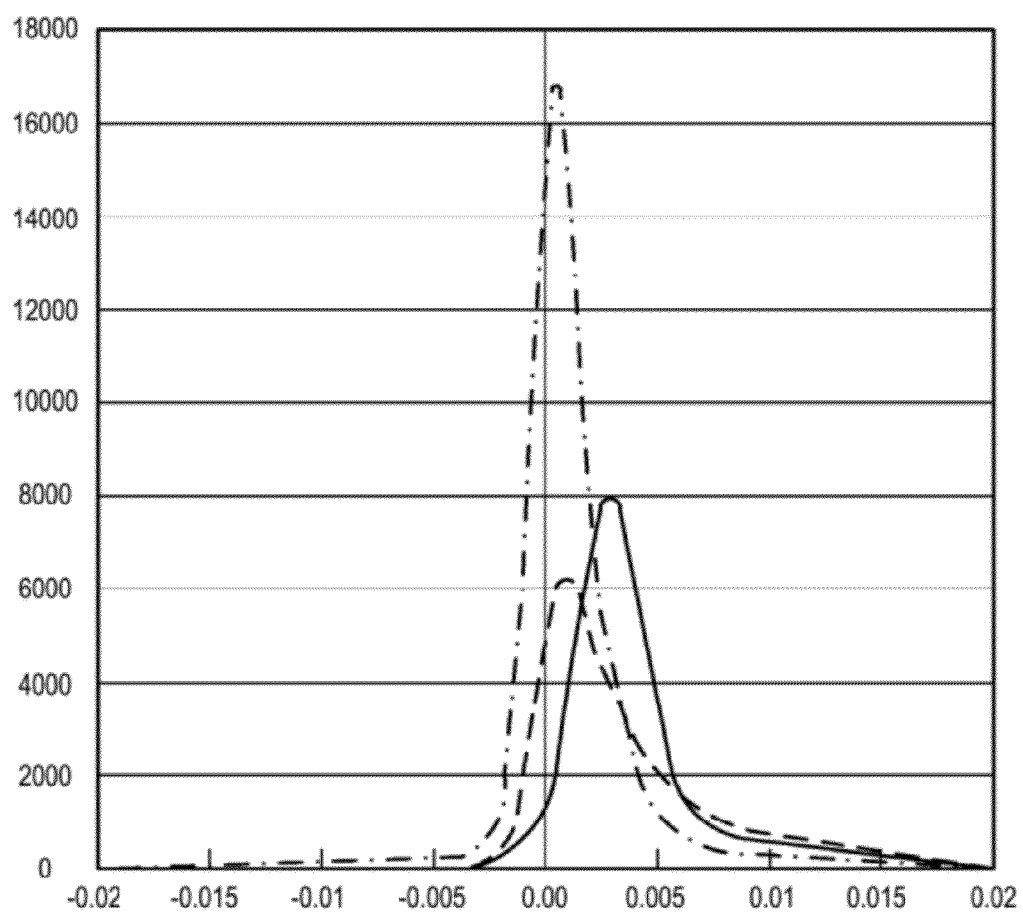
FIG. 26 is a diagram illustrating an example of line image intensity distribution at a position other than that on the optical axis.

FIG. 25 and FIG. 26 show a line spread function (LSF). FIG. 25 shows a line spread obtainable on the image center position (image height "0") corresponding to the optical axis of the lens, and FIG. 26 shows a line spread at an image height of a predetermined value based on an absolute value equal to or more than 0 away from the image center position at a predetermined distance. The horizontal axis is an image height, and the vertical axis is a light intensity. The value of the image height of the horizontal axis represents the image height direction corresponding to a predetermined radial direction by a positive value, and represents the image height direction corresponding to a radial direction of point symmetry by a negative value. The solid line represents the R component, the chain line represents the G component, and the broken line represents the B component.

In FIG. 25, the peaks of the line spread of the colors of R, G, and B coincides with the image height "0". The spread shape is substantially symmetry on the left and the right with respect to the image height "0". On the other hand, in FIG. 26, there are gaps in the image heights represented by the peaks of line spread of the colors of R, G, and B. This corresponds to the concentric aberration in the chromatic aberration of magnification. In the spread shape, the skirt side further spreads than the case of FIG. 25, and there is no symmetry for the peaks. In FIG. 25, a shape in which the skirt part with the higher image height is further widely spread than that with the lower image height on peak is shown.

In the example shown in FIG. 26, the skirt shape with the high image height on the peaks of the spread shape is related to characteristics of the falling edge, and the skirt shape with the low image height is related to characteristics of the rising edge. Accordingly, when the line spread is asymmetry as the image height increases as described above, the amount of color deviation occurring due to the concentric aberration for the rising edge and the falling edge in the image is different.

For example, in the related art, it is not detected whether the rising edge or the falling edge, and one histogram taking statistics of aberration magnification for all detected edges is created. In this, in practice, since the amount of color deviation is different between the rising edge and the falling edge, two peaks of a degree corresponding to the rising edge and the falling edge are shown in the histogram. In this case, for example, the amount of correction is acquired by the aberration magnification corresponding to any one peak is acquired. As a result, the aberration correction is performed only on any one edge of the rising edge and the falling edge, and thus the sufficient aberration correction is not performed on the other edge. It is confirmed that a visually sufficient correction effect may not be obtained from the image corrected as described above.

In the embodiment of the present disclosure, for example, at the time of correcting the concentric aberration, the rising edge and the falling edge are distinguished for the detected edges, and the histograms are individually formed according to both edges. Accordingly, it is possible to accurately obtain the aberration magnification based on the rising edge and the falling edge, that is, the amount of concentric aberration correction.

[Example of Calculation of Amount of Concentric Aberration Correction]

The process of calculating the amount of concentric aberration correction as Step S970 in FIG. 19 uses the statistic result of the histogram obtainable corresponding to each of the rising edge and the falling edge as described above. There may be several processes of calculating the amount of concentric aberration correction. Herein, four examples are described.

First, as a first example, aberration magnification (rising edge correspondence maximum frequency aberration magnification) corresponding to the maximum frequency in the rising edge correspondence histogram is specified. Similarly, aberration magnification (falling edge correspondence maximum frequency aberration magnification) corresponding to the maximum frequency in the falling edge correspondence histogram is specified. A simple average of the maximum aberration magnification is calculated. The amount of correction is calculated using the calculated value. It is preferable that each of the rising edge correspondence aberration magnification and the falling edge correspondence aberration magnification may be determined by the aberration magnification corresponding to the maximum frequency in the rising edge correspondence histogram and the falling edge correspondence histogram.

As a second example, a weighted average of the rising edge correspondence maximum frequency aberration magnification and the falling edge correspondence maximum frequency aberration magnification is calculated, and the amount of correction is acquired using the value of the weighted average. For example, a weight coefficient used in the calculation of the weighted average may be set as follows. First, one representative image height is determined, and dot intensity distribution of the optical lens unit 120 is measured in this image height. Alternatively, dot intensity distribution determined as specifications of the optical lens unit 120 is prepared instead of measurement. A ratio of right and left areas about a boundary of the peak in the shape of the dot intensity distribution is acquired. On the basis of the ratio of the areas, the weight coefficient of the rising edge correspondence maximum frequency aberration magnification and the falling edge correspondence maximum frequency aberration magnification is calculated. For example, in practice, it is conceivable that combination of weight coefficients is changed while imaging a chart image with a predetermined pattern, and the weight coefficient when the image after correction is most satisfactory is employed.

Figure 27A:
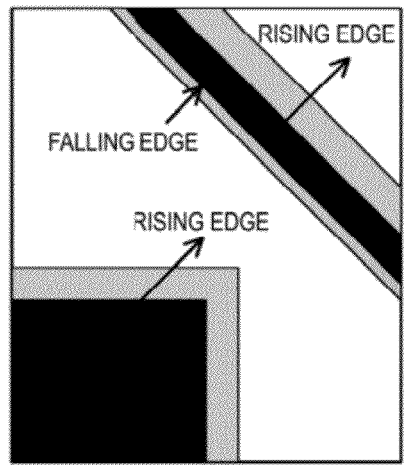
FIGS. 27A to 27D are diagrams illustrating an example of a correction result of a rising edge and a falling edge of an image.

An effect of the concentric aberration correction based on the second example will be described with reference to FIGS. 27A to 27D. FIG. 27A shows a part of an image obtainable by an image signal before concentric aberration correction. In the image, for example, the black part is actually blue, and the other white part is actually white. A part where the edge is blurred by the color deviation caused by the concentric aberration is represented by hatching. The part where the color deviation occurs is, for example, actually yellow. In the example of FIG. 27A, a case where the rising edge part is further blurred than the falling edge part is shown.

Figure 27B:
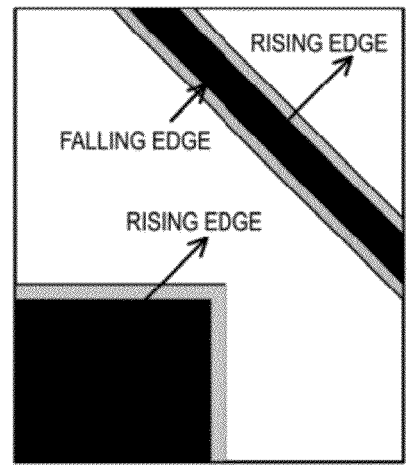
Figure 27C:
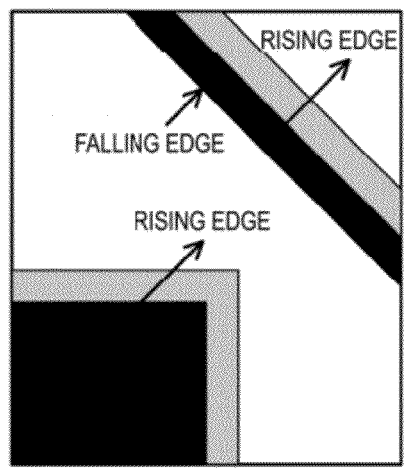

FIG. 27B shows an image when the concentric aberration correction is performed on the image shown in FIG. 27A on the basis of only the rising edge correspondence maximum frequency aberration magnification. FIG. 27C shows an image obtainable by performing the concentric aberration correction on the image shown in FIG. 27A, for example, on the basis of only the falling edge correspondence maximum frequency aberration magnification.

That is, FIGS. 27B and 27C show the result of performing concentric aberration correction according to only any one of the rising edge correspondence maximum frequency aberration magnification and the falling edge correspondence maximum frequency aberration magnification, without acquiring the weighted average, as the second example.

FIGS. 27B and 27C also correspond to the result of the concentric aberration correction in the configuration in which the rising edge and the falling edge are not divisionally detected and the statistics of the aberration magnification of the detected edge are taken by one histogram, described above as the related art. That is, when the correction is performed by the aberration magnification corresponding to the rising edge of two peaks shown in the histogram, the result shown in FIG. 27B is obtained. Meanwhile, when the correction is performed by the aberration magnification corresponding to the peak of the falling edge, the result shown in FIG. 27C is obtained.

Figure 27D:
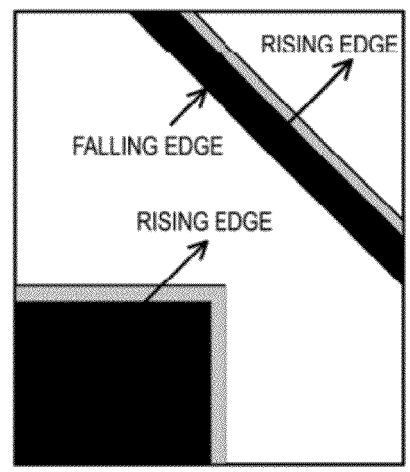

FIG. 27D shows an image obtainable by performing the concentric aberration correction on the basis of the weighted average of the rising edge correspondence maximum frequency aberration magnification and the fall edge correspondence maximum frequency aberration magnification.

As understood from such drawings, in FIG. 27B, only the color deviation at the rising edge part is corrected, and the color deviation at the falling edge part is as is. Meanwhile, in FIG. 27C, only the color deviation at the falling edge part is corrected, and the color deviation at the rising edge part is as is. That is, when the rising edge and the falling edge are not distinguished as the related art, the correction effect leans, it is difficult to obtain a sufficient correction effect. On the other hand, in FIG. 27D corresponding to the embodiment of the present disclosure, the color deviation is corrected on both the rising edge part and the falling edge part by a degree corresponding to a weighting coefficient. That is, it is possible to obtain an overall high correction effect.

Next, as a third example, reliability (edge reliability) in the rising edge and the falling edge is acquired. Maximum frequency aberration magnification corresponding to the side with high edge reliability is employed. For example, there are many cases where any one of the rising edge and the falling edge is clear, and the other is little clear according to image content. For example, as the edge gets clearer, the reliability thereof gets higher.

For example, the edge reliability may be acquired on the basis of the differential absolute value sum calculated in Step S948 shown in FIG. 19. For example, in the drawing in which the relation between the shift position and the differential absolute value sum shown in FIG. 21, one extreme value corresponding to the minimum value can be obtained. However, in practice, a result in which the edge is not clear and a plurality of extreme values corresponding to the minimum value appear may be obtained. When the differential absolute value sum is calculated in Step S948, the number of extreme values corresponding to the minimum value is determined to give a score corresponding to the determined number of extreme values. For example, the score is the maximum value when the number of extreme values corresponding to the minimum value is only one, and then, the score gets smaller as the number of extreme values gets larger. Whenever Step S948 is repeatedly performed, the score is added each of the rising edge and the falling edge. Accordingly, in the step of calculating the color deviation for all the edges, the total score corresponding to each of the rising edge and the falling edge is obtained. The total score is the edge reliability, and basically, in the rising edge and the falling edge, when the total score is high, the edge reliability is high.

Figure 20:
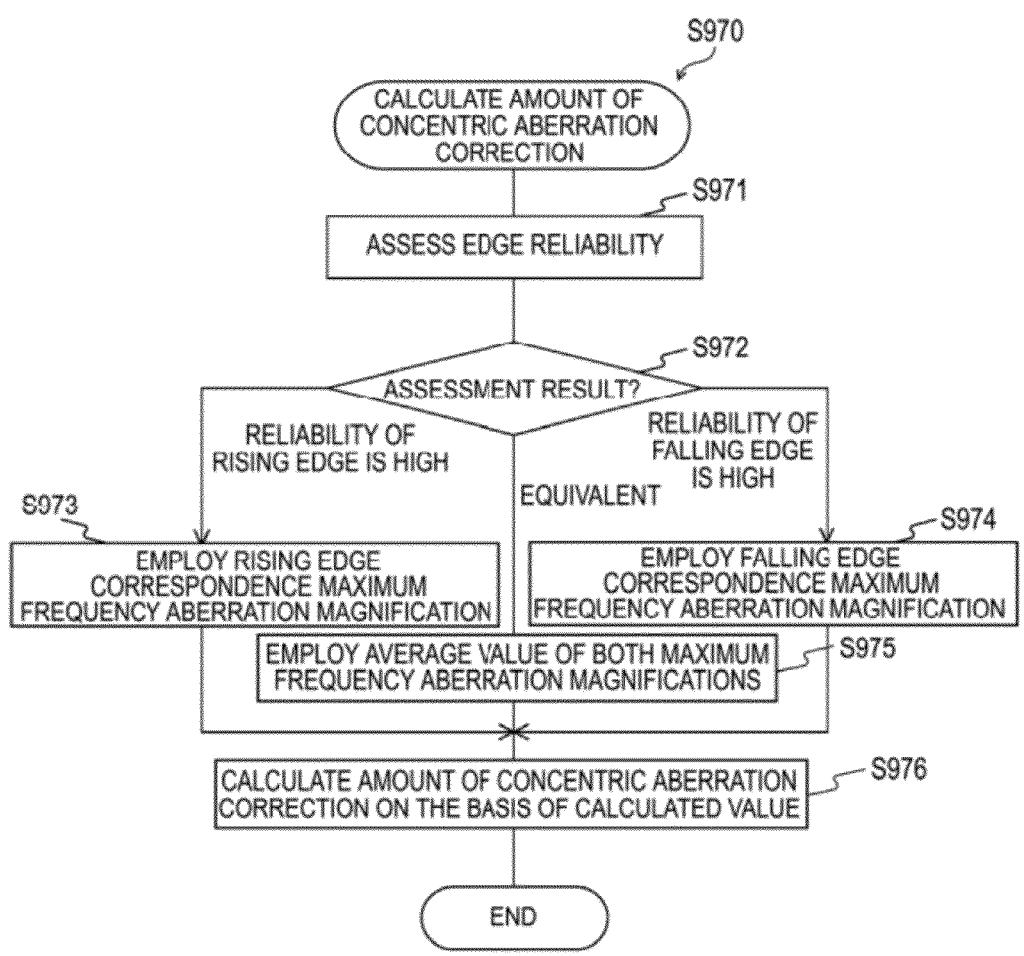
FIG. 20 is a diagram illustrating an example of process sequence for calculation of an amount of concentric aberration correction performed by the concentric aberration correcting unit.

The flowchart shown in FIG. 20 is the process of the calculation of the amount of concentric aberration correction of Step S970, and shows an example of sequence when using the edge reliability acquired as described above. First, the concentric aberration correction amount calculating unit 213A performs assessment about the edge reliability (total score) according to the rising edge and the falling edge acquired as described above (Step S971). The assessment of the edge reliability is to determine whether or not the edge reliability of the rising edge and the edge reliability of the falling edge are equivalent, otherwise which side is higher.

As a specific process for assessment as Step S971, for example, the following is conceivable. For example, the total score of the rising edge is A, the total score of the falling edge is B, and a difference value C is calculated by calculation based on (C=A−B). An absolute value of the difference value C and a predetermined threshold value D are compared. When the difference value C is less than the threshold value D, the assessment result in which reliabilities of both are equivalent is output. Meanwhile, when the difference value C is equal to or more than the threshold value D, and is a positive value, the assessment result in which the reliability of the rising edge is high is output. When the difference value C is equal to or more than the threshold value D, and is a negative value, the assessment result in which the reliability of the falling edge is high is output.

Then, the concentric aberration correction amount calculating unit 213A determines the assessment result output in Step S971 (Step S972). In Step S972, it is determined as the assessment result in which the reliability of the rising edge is high. In this case, the concentric aberration correction amount calculating unit 213A employs the rising edge correspondence maximum frequency aberration magnification as the aberration magnification used in the calculation of the amount of correction (Step S973). Meanwhile, in Step S972, when it is determined that the reliability of the falling edge is high, the falling edge correspondence maximum frequency aberration magnification is employed as the aberration magnification used in the calculation of the amount of correction (Step S974).

In Step S972, when it is determined that the assessment result is the equivalent reliability, the concentric aberration correction amount calculating unit 213A calculates the average value of the rising edge correspondence maximum frequency aberration magnification and the falling edge correspondence maximum frequency aberration magnification. The calculated average value is employed as the aberration magnification used in the calculation of the amount of correction (Step S975). In the calculation process of the average value, the simple average of the first example may be acquired, and the weighted average of the second example may be acquired. The concentric aberration correction amount calculating unit 213A calculates the amount of concentric aberration correction using the aberration magnification employed by any of Step S973, Step S974, and Step S975 (Step S976).

As a fourth example, as for the pixel of the image area where the rising edge is detected, the amount of concentric aberration correction is calculated by employing the rising edge correspondence maximum frequency aberration magnification. Meanwhile, as for the pixel of the image area where the falling edge is detected, it is conceivable that the amount of concentric aberration correction is calculated by employing the falling edge correspondence maximum frequency aberration magnification.

In the second embodiment, the correction process of the concentric aberration without using the histogram may be performed according to the actually acquired degree of the correction effect. As an example, it is conceivable that the correction is performed by the amount of correction acquired from the average value of the amounts of color deviation of the rising edge or the falling edge. In addition, it is conceivable that the correction is performed by the amount of correction acquired from the average value of all the amounts of color deviation of the detected edges.

3. Third Embodiment

Subsequently, a third embodiment of the present disclosure will be described. The video camera 100 of the third embodiment is configured to perform correction of chromatic aberration of magnification by combining the optical lens unit 120 in which the chromatic aberration is corrected, and the uniform aberration correction based on the lens control shown in FIG. 7. In the third embodiment, the configuration of correcting the concentric aberration by the image process may not be provided, like the concentric aberration correcting units 210 and 210A shown in FIG. 14 and FIG. 18.

The correction of chromatic aberration of magnification by the optical lens unit 120 itself may be performed using a lens formed of a material with small difference in refractive index according to wavelengths of light. In addition, it may be performed by combining lenses with different refractive indexes. As a lens in which the chromatic aberration of magnification is corrected by combining the lenses with different refractive indexes, an achromatic lens has been known.

The chromatic aberration of magnification as characteristics of the lens causes concentric color deviation in which the lens optical axis is the center. That is, the chromatic aberration of magnification corresponds to the concentric aberration in the embodiments of the present disclosure. Accordingly, when the optical lens unit 120 in which the chromatic aberration is corrected as described above is provided, first, the concentric aberration component in the chromatic aberration of magnification is corrected.

However, even when the concentric aberration component is corrected as described above, and when the optical lens unit 120 is assembled, eccentricity or inclination of the lens occurs by the installation error. The uniform aberration occurs according to the installation error. In the third embodiment, the uniform aberration occurring as described above is corrected by the configuration shown in FIG. 7 in the same manner as the first and second embodiments. Accordingly, the chromatic aberration of magnification is corrected.

As described above, in the third embodiment, the chromatic aberration of magnification is corrected by the concentric aberration correction based on the optical lens unit 120 itself and the uniform aberration correction based on the driving of the anti-vibration lens group 132. In the case of the configuration, the concentric aberration correction based on the image process may not be performed. The aberration correction based on the image process may cause deterioration of image quality, but in the third embodiment, such deterioration of image quality does not occur.

It is assumed that the optical lens unit 120 shown in FIG. 1 is fixedly mounted on the main body of the camera 100, but for example, an exchangeable lens may be attachable to and detachable from the main body of the video camera 100. It costs to produce the lens in which the chromatic aberration of magnification is corrected. For this reason, there are many cases where the lens in which the chromatic aberration of magnification is corrected is employed for the exchangeable lens requiring high performance in the lens itself. The configuration of the third embodiment is effective even when the optical lens unit 120 is the exchangeable lens. Even when the chromatic aberration of magnification of the optical lens unit 120 itself is corrected, for example, there is a case where an error in precision exists in a mechanism portion mounted on the main body of the video camera 100. In this case, eccentricity or inclination occurs in the mounted step, and thus the uniform aberration occurs. According to the third embodiment, such uniform aberration is corrected. As a result, it is possible to obtain the captured image in which the chromatic aberration of magnification is corrected.

4. Modified Example

Next, a modified example of the embodiments of the present disclosure will be described. In the modified example, the lens for uniform aberration correction is not driven to be dynamically shifted, but the uniform aberration is corrected by shifting the lens in the following manner.

In the production process of the lens optical system, a process of adjusting a position of a lens, which is called center adjustment, may be performed to increases of resolution of the lens optical system. When the center adjustment is performed, a specific lens of lenses constituting the lens optical system servers as a center adjustment lens. In the process of the center adjustment, first, a position where an MTF (Modulation Transfer Function) is the maximum is specified while moving the center adjustment lens in a direction perpendicular to the optical axis. Then, the center adjustment lens is fixed at the specified position. Accordingly, the resolution of the lens optical system is set to be an optimal state.

The center adjustment lens is shifted along a direction perpendicular to the optical axis as described above. From this viewpoint, it is possible to correct the uniform aberration by the center adjustment lens. As the modified example of the embodiments of the present disclosure, the position of the center adjustment lens where the MTF and the uniform aberration correction are optimal together is specified at the time of the center adjustment process. The center adjustment lens is fixed at the position. Accordingly, in the process of the center adjustment, it is possible to correct the uniform aberration with the original adjustment of resolution.

In the configuration of the modified example, the configuration of correcting the uniform aberration by driving the anti-vibration lens group 132 shown in FIG. 7 may be omitted. The correction of the centric aberration is performed by the concentric aberration correcting unit 210 or 210A shown in FIG. 14 or FIG. 18.

In the above description, the configuration of the correction of chromatic aberration of magnification as the embodiments of the present disclosure is applied to the imaging device such as the video camera 100, but it is conceivable to configure it as an application program of, for example, a personal computer.

The embodiments of the present disclosure describe an example for embodying the present disclosure, and the items in the embodiments of the present disclosure correspond to the specific items in the appended claims, as described in the embodiments of the present disclosure. Similarly, the specific items in the appended claims correspond to the items in the embodiments to which the same terms as those are given. However, the present disclosure is not limited to the embodiments, and may be variously modified within the scope of the concept of the present disclosure.

The process sequence described in the embodiments of the present disclosure may be recognized as a method having a series of sequences thereof, and may be recognized as a program for causing a computer to execute the series of sequences or a recording medium for storing the program. For example, the recording medium may be a CD (Compact Disc), an MD (Mini Disc), a DVD (Digital Versatile Disc), a memory card, a Blu-ray disc (registered trademark), and the like.

The present disclosure contains subject matter related to that disclosed in Japanese Priority Patent Application JP 2010-184674 filed in the Japan Patent Office on Aug. 20, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
 a shift lens that is driven to be shifted;
 a uniform aberration correction data storing unit that stores uniform aberration correction data for correcting uniform aberration that is a component of chromatic aberration of magnification in which a direction of color deviation and an amount of color deviation uniformly occur over the entire image;
 a shift amount calculating unit that calculates an amount of aberration correction shift of the shift lens for correcting uniform aberration using the uniform aberration correction data;
 a shift lens driving unit that drives the shift lens to be shifted according to an amount of driving shift based on the amount of aberration correction shift;
 a concentric aberration correction amount calculating unit that calculates an amount of concentric aberration correction for correcting concentric aberration that is a component of chromatic aberration of magnification causing a concentric color deviation from the center of the image, with respect to a process target pixel of an input image signal; and a pixel value correcting unit that corrects a pixel value of the process target pixel on the basis of the calculated amount of concentric aberration correction.

2. The imaging apparatus according to claim 1, further comprising:

an anti-vibration control unit that generates an amount of anti-vibration shift of the shift lens for canceling vibration of the captured image corresponding to movement of the imaging apparatus; and an addition unit that adds the amount of anti-vibration aberration shift to the amount of aberration correction shift and outputs the added value as the amount of driving shift.

3. The imaging apparatus according to claim 1, wherein the uniform aberration correction data storing unit stores the uniform aberration correction data corresponding to each uniform aberration condition completed from combination of predetermined lens control information representing a control state for a predetermined movable portion in a lens unit including the shift lens, and wherein the shift amount calculating unit selects the uniform aberration correction data corresponding to the uniform aberration condition completed from the combination of the current lens control information, from the uniform aberration correction data, and calculates the amount of aberration correction shift on the basis of the selected uniform aberration correction data.

4. The imaging apparatus according to claim 3, wherein the uniform aberration correction data represents an amount of uniform aberration condition correspondence shift of the shift lens for correcting uniform aberration occurring under the uniform aberration condition, and wherein the shift amount calculating unit calculates the amount of aberration correction shift on the basis of the uniform aberration condition correspondence shift indicated by the selected uniform aberration correction data.

5. The imaging apparatus according to claim 4, wherein the amount of uniform aberration condition correspondence shift is calculated on the basis of sensitivity about the uniform aberration of the lens calculated by simulation based on characteristics of the lens and an amount of color deviation based on the uniform aberration measured using the captured image.

6. The imaging apparatus according to claim 1, further comprising a concentric aberration correction data storing unit that stores concentric aberration correction data representing an amount of correction corresponding to each concentric aberration condition at least including combination of a light color and an image height, wherein the concentric aberration correction amount calculating unit selects the concentric aberration correction data corresponding to the concentric aberration condition for the process target pixel, from the concentric aberration correction data, and calculates the amount of concentric aberration correction using the selected concentric aberration correction data.

7. The imaging apparatus according to claim 1, further comprising an edge detecting unit that detects an edge corresponding to the concentric aberration from the input image signal, wherein the concentric aberration correction amount calculating unit calculates the concentric aberration correction amount for the process target image on the basis of the amount of color deviation generated by the concentric aberration in each edge detected by the edge detecting unit.

8. An aberration correcting method comprising:

calculating an amount of aberration correction shift of a shift lens for correcting uniform aberration using uniform aberration correction data for correcting uniform aberration that is a component of chromatic aberration of magnification in which a direction of color deviation and an amount of color deviation uniformly occur over the entire image;

driving the shift lens to be shifted according to an amount of driving shift based on the amount of aberration correction shift;

calculating an amount of concentric aberration correction for correcting concentric aberration that is a component of chromatic aberration of magnification causing a concentric color deviation from the center of the image, with respect to a process target pixel of an input image signal; and correcting a pixel value of the process target pixel on the basis of the calculated amount of concentric aberration correction.

9. A non-transitory computer-readable medium including a program for causing a computer to execute:

calculating an amount of aberration correction shift of a shift lens for correcting uniform aberration using uniform aberration correction data for correcting uniform aberration that is a component of chromatic aberration of magnification in which a direction of color deviation and an amount of color deviation uniformly occur over the entire image;

driving the shift lens to be shifted according to an amount of driving shift based on the amount of aberration correction shift;

calculating an amount of concentric aberration correction for correcting concentric aberration that is a component of chromatic aberration of magnification causing a concentric color deviation from the center of the image, with respect to a process target pixel of an input image signal; and correcting a pixel value of the process target pixel on the basis of the calculated amount of concentric aberration correction.

10. An imaging apparatus comprising:

circuitry configured to:

calculate an amount of aberration correction shift of a shift lens for correcting uniform aberration using uniform aberration correction data for correcting uniform aberration that is a component of chromatic aberration of magnification in which a direction of color deviation and an amount of color deviation uniformly occur over an entire image;

drive the shift lens to be shifted according to an amount of driving shift based on the amount of aberration correction shift;

calculate an amount of concentric aberration correction for correcting concentric aberration that is a component of chromatic aberration of magnification causing a concentric color deviation from the center of the image, with respect to a process target pixel of an input image signal; and correct a pixel value of the process target pixel on the basis of the calculated amount of concentric aberration correction.

* * * * *